(12) United States Patent
Jasmin et al.

(10) Patent No.: US 12,435,906 B1
(45) Date of Patent: Oct. 7, 2025

(54) RAIL-LESS SOLAR PANEL DEVICES AND SYSTEM FOR ROOFS AND THE LIKE AND METHODS FOR MOUNTING SAME

(71) Applicant: Sunmodo Corporation, Vancouver, WA (US)

(72) Inventors: Roland Jasmin, Vancouver, WA (US); Jun Liu, Camas, WA (US); Steve Mumma, Vancouver, WA (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 19/241,169

(22) Filed: Jun. 17, 2025

Related U.S. Application Data

(62) Division of application No. 18/058,731, filed on Nov. 23, 2022, now Pat. No. 12,339,040.

(51) Int. Cl.
*F24S 25/67* (2018.01)
*F24S 25/37* (2018.01)
(Continued)

(52) U.S. Cl.
CPC ............ *F24S 25/67* (2018.05); *F24S 25/37* (2018.05); *F24S 25/60* (2018.05);
(Continued)

(58) Field of Classification Search
CPC .......... H02S 20/23; H02S 20/24; H02S 30/10; F24S 25/37; F24S 25/60; F24S 25/67
(Continued)

(56) References Cited

U.S. PATENT DOCUMENTS

| 1,473,504 A | 11/1923 | Neely |
| 1,568,122 A | 1/1926 | Zifferer |

(Continued)

FOREIGN PATENT DOCUMENTS

| CH | 713372 B1 | 8/2021 |
| CN | 103280473 A | 9/2013 |

(Continued)

OTHER PUBLICATIONS

Composition Mount with Leading Edge T-Clamp and Integrated Grounding Installation Manual, Sep. 2017, Sol Attach, LLC, New Braunfels, Texas.
(Continued)

*Primary Examiner* — James M Ference
(74) *Attorney, Agent, or Firm* — Stone Creek Services LLC; Alan M Flum

(57) ABSTRACT

Discussed are solar panel systems as well as devices and methods for mounting the solar panel systems to roofs and building structures. Catch clamp, mid clamp, and optionally end clamp assemblies can be preinstalled to the solar panels at the job site before placing and securing the resulting solar panel assemblies to the building structure such as a roof. After an installer places and secures a first solar panel assembly to the building structure, they can install each subsequent solar panel assemblies by attaching the leading edge of the subsequent solar panel assembly to the trailing edge of the previous solar panel assembly using a catch and catch receiver, hook and slot, tab and slot, or similar mechanism.

6 Claims, 49 Drawing Sheets

(51) Int. Cl.
*F24S 25/60* (2018.01)
*F24S 25/00* (2018.01)
*F24S 25/20* (2018.01)

(52) U.S. Cl.
CPC .... *F24S 2025/014* (2018.05); *F24S 2025/018* (2018.05); *F24S 25/20* (2018.05); *F24S 2025/6002* (2018.05); *F24S 2025/6003* (2018.05); *F24S 2025/806* (2018.05)

(58) Field of Classification Search
USPC ........................................................ 52/173.3
See application file for complete search history.

(56) References Cited

U.S. PATENT DOCUMENTS

| | | | |
|---|---|---|---|
| 6,105,317 A | 8/2000 | Tomiuchi | |
| 6,959,517 B2 | 11/2005 | Poddany | |
| 7,487,771 B1 | 2/2009 | Eiffert | |
| 7,592,537 B1 | 9/2009 | West | |
| 7,915,519 B2 | 3/2011 | Kobayashi | |
| 7,956,280 B2 | 6/2011 | Kobayashi | |
| 8,266,846 B2 | 9/2012 | Schoell | |
| 8,344,239 B2* | 1/2013 | Plaisted | F24S 25/636 |
| | | | 136/251 |
| 8,418,688 B2 | 4/2013 | King | |
| 8,453,394 B2 | 6/2013 | Kobayashi | |
| 8,480,330 B2 | 7/2013 | Urban et al. | |
| 8,495,839 B2 | 7/2013 | Tsuzuki | |
| 8,505,864 B1 | 8/2013 | Taylor | |
| 8,590,223 B2 | 11/2013 | Kilgore et al. | |
| 8,683,761 B2 | 4/2014 | Danning | |
| 8,713,881 B2 | 5/2014 | DuPont | |
| 8,752,338 B2* | 6/2014 | Schaefer | H01R 4/64 |
| | | | 52/173.3 |
| 8,806,813 B2 | 8/2014 | Plaisted et al. | |
| 8,806,815 B1 | 8/2014 | Liu | |
| 8,839,575 B1 | 9/2014 | Liu | |
| 8,875,401 B2 | 11/2014 | Jolley | |
| 8,935,893 B2* | 1/2015 | Liu | F24S 25/61 |
| | | | 52/173.3 |
| 8,984,818 B2 | 3/2015 | McPheeters | |
| 9,010,041 B2 | 4/2015 | Danning | |
| 9,057,545 B2 | 6/2015 | Stapleton | |
| 9,080,792 B2 | 7/2015 | Patton et al. | |
| 9,136,411 B2 | 9/2015 | Jolley | |
| 9,166,522 B1 | 10/2015 | Zvanut | |
| 9,175,881 B2* | 11/2015 | Schrock | F16B 7/182 |
| 9,193,014 B2 | 11/2015 | Danning | |
| 9,249,925 B2 | 2/2016 | Roensch et al. | |
| 9,273,708 B2 | 3/2016 | Urban et al. | |
| 9,314,904 B2 | 4/2016 | Veloso et al. | |
| 9,397,605 B2 | 7/2016 | Stapleton | |
| 9,455,662 B2 | 9/2016 | Meine | |
| 9,473,066 B2* | 10/2016 | Stephan | F24S 25/61 |
| 9,599,280 B2 | 3/2017 | West et al. | |
| 9,628,018 B2 | 4/2017 | Stapleton | |
| 9,647,433 B2 | 5/2017 | Meine et al. | |
| 9,712,106 B2 | 7/2017 | Wentworth | |
| 9,831,818 B2 | 11/2017 | West | |
| 9,853,597 B2 | 12/2017 | West | |
| 9,893,677 B1 | 2/2018 | Liu | |
| 10,033,328 B2 | 7/2018 | Wildes et al. | |
| 10,036,577 B2 | 7/2018 | Mascolo et al. | |
| 10,270,385 B2 | 4/2019 | Xie | |
| 10,277,161 B2 | 4/2019 | Tan et al. | |
| 10,312,855 B2 | 6/2019 | Lester et al. | |
| 10,361,653 B2 | 7/2019 | Truthseeker | |
| 10,381,974 B2 | 8/2019 | McPheeters | |
| 10,536,108 B2 | 1/2020 | Goldberg | |
| 10,622,935 B1 | 4/2020 | Liu | |
| 10,749,459 B1 | 8/2020 | Liu | |
| 10,797,634 B1 | 10/2020 | Jasmin | |
| 11,005,414 B2 | 5/2021 | McDonald et al. | |
| 11,012,023 B2* | 5/2021 | Stearns | H02S 20/23 |
| 11,146,207 B2 | 10/2021 | Stapleton | |
| 11,251,743 B2* | 2/2022 | Schuit | H02S 20/23 |
| 11,274,855 B2 | 3/2022 | Harris et al. | |
| 11,296,648 B1 | 4/2022 | Jasmin et al. | |
| 11,309,831 B2 | 4/2022 | Crook et al. | |
| 11,486,434 B2 | 11/2022 | Kovacs et al. | |
| 11,757,400 B1* | 9/2023 | Jasmin | H02S 20/23 |
| | | | 248/237 |
| 11,863,119 B2 | 1/2024 | Lin | |
| 12,149,200 B1 | 11/2024 | Jasmin et al. | |
| 12,231,076 B1 | 2/2025 | Jasmin et al. | |
| 12,249,949 B1* | 3/2025 | Jasmin | H02S 20/23 |
| 12,286,994 B1 | 4/2025 | Liu et al. | |
| 12,368,405 B1 | 7/2025 | Jasmin et al. | |
| 2004/0221524 A1 | 11/2004 | Poddany | |
| 2010/0154784 A1 | 6/2010 | King | |
| 2010/0206301 A1 | 8/2010 | Aftanas | |
| 2010/0284737 A1 | 11/2010 | McPheeters | |
| 2011/0024582 A1 | 2/2011 | Gies et al. | |
| 2011/0138585 A1* | 6/2011 | Kmita | F24S 25/636 |
| | | | 24/522 |
| 2012/0234378 A1 | 9/2012 | West | |
| 2012/0273029 A1 | 11/2012 | Bragagna | |
| 2012/0298188 A1 | 11/2012 | West | |
| 2012/0298817 A1 | 11/2012 | West | |
| 2013/0111713 A1* | 5/2013 | McPheeters | F16B 2/12 |
| | | | 24/569 |
| 2013/0118107 A1 | 5/2013 | Maday et al. | |
| 2013/0340358 A1 | 12/2013 | Danning | |
| 2013/0340379 A1 | 12/2013 | Danning | |
| 2013/0340380 A1 | 12/2013 | Danning | |
| 2013/0340381 A1 | 12/2013 | Danning | |
| 2013/0340810 A1 | 12/2013 | Danning | |
| 2013/0340811 A1 | 12/2013 | Danning | |
| 2014/0353435 A1 | 12/2014 | Liu | |
| 2015/0040967 A1 | 2/2015 | West | |
| 2015/0101997 A1 | 4/2015 | Liu | |
| 2015/0280638 A1* | 10/2015 | Stephan | H02S 20/00 |
| | | | 52/173.3 |
| 2015/0288320 A1* | 10/2015 | Stearns | F24S 25/60 |
| | | | 52/173.3 |
| 2015/0372635 A1 | 12/2015 | Praca | |
| 2016/0111995 A1 | 4/2016 | Nayar | |
| 2016/0142006 A1* | 5/2016 | Meine | F24S 25/61 |
| | | | 174/535 |
| 2016/0268965 A1 | 9/2016 | Stearns et al. | |
| 2017/0102167 A1 | 4/2017 | Stephan et al. | |
| 2017/0237386 A1* | 8/2017 | Stephan | F16B 2/065 |
| | | | 248/316.6 |
| 2017/0366131 A1 | 12/2017 | Stearns et al. | |
| 2018/0019701 A1 | 1/2018 | McPheeters | |
| 2018/0026576 A1 | 1/2018 | Danning | |
| 2019/0006983 A1 | 1/2019 | Goldberg | |
| 2020/0252023 A1* | 8/2020 | Stearns | F24S 25/632 |
| 2020/0266757 A1 | 8/2020 | Goldberg et al. | |
| 2020/0313604 A1 | 10/2020 | Harris | |
| 2020/0389122 A1 | 12/2020 | Stephan et al. | |
| 2021/0242826 A1 | 8/2021 | Basarich et al. | |
| 2022/0094299 A1 | 3/2022 | Wang et al. | |
| 2023/0170840 A1* | 6/2023 | Stearns | H02S 30/00 |
| | | | 52/173.3 |
| 2023/0216441 A1 | 7/2023 | Neal et al. | |
| 2024/0120874 A1* | 4/2024 | Stearns | F24S 25/61 |
| 2024/0167730 A1* | 5/2024 | Jasmin | F24S 25/632 |

FOREIGN PATENT DOCUMENTS

| | | |
|---|---|---|
| CN | 203562992 U | 4/2014 |
| CN | 203942481 U | 11/2014 |
| CN | 112165299 A | 1/2021 |
| CN | 113179083 A | 7/2021 |
| DE | 202014004487 U1 | 10/2015 |
| WO | 2010074701 A1 | 7/2010 |
| WO | 2013163667 A1 | 11/2013 |
| WO | 2017027758 A1 | 2/2017 |
| WO | 2020162746 A1 | 8/2020 |

(56) References Cited

FOREIGN PATENT DOCUMENTS

OTHER PUBLICATIONS

Evaluation of Installation Time for SMASHmount by SMASHsolar, Apr. 2017, National Renewable Energy Laboratory (NREL), Golden, Colorado.

Kelly Pickerel, New mounting system provides quick way to install frameless panels on residential roofs, Dec. 15, 2016, Solar Power World, downloaded from the Internet from https://www.solarpowerworldonline.com/2016/12/new-mounting-system-provides-quick-way-install-bifacial-panels-residential-roofs/ on Jul. 31, 2022.

Lumeta Lynx 72, Version LYNX72_Data_Sheet_0318_Prelim, Mar. 2018, Lumeta Solar, Emeryville, California.

Kelly Pickerel, Monarc Solar launches pre-assembled, pre-wired solar array, Jul. 20, 2015, Solar Power World, downloaded from the Internet from https://www.solarpowerworldonline.com/2015/07/monarc-solar-launches-pre-assembled-pre-wired-solar-array/ on Jul. 31, 2022.

Module Level Power Electronics Bracket, Nov. 2018, Pegasus Solar, downloaded from the Internet from https://www.pegasussolar.com/wp-content/uploads/2018/11/Pegasus-Universal-MLPE-Data-Sheet-2.14.18.pdf on Jul. 21, 2022.

Universal MLPE Bracket, AL Blk, Pegasus Solar, Nov. 2018, downloaded from the Internet from https://www.pegasussolar.com/wp-content/uploads/2018/11/PSUA-MO-Universal-MLPE-Bracket-AL-Blk.pdf on Jul. 22, 2022.

Solar's Fastest Attachment Nanomount, Feb. 2020, Sunmodo Corporation, Vancouver, Washington.

SMR Cut Sheet, D1022 -V001, Sep. 2020, Sunmodo Corporation, Vancouver, Washington.

Solar's Fastest Attachment NanoMount Rafter or Deck, NanoMount One Sheet, Feb. 2021 Revision, Sunmodo Corporation, Vancouver, Washington.

SnapNrack Solar Mounting Solutions, Ultra Rail Residential Roof Mount System Installation Manual, v. 3.2, Jan. 2021, pp. 52-55, SnapNRack, Inc., San Luis Obispo, California (a division of Sunrun, Inc.).

GridFlex Installation Guide, Unirac Cod-Compliant Installation Manual, Document No. PUB19JAN2022, Publication Date: Jan. 2022, Unirac, Inc., Albuquerque, New Mexico.

Extended European Search Report, European Patent Application No. EP 23169417, Applicant: Sunmodo Corporation, Date of Action: Jan. 29, 2024, European Patent Office, Munich, Germany.

European Examination Report, European Patent Application No. EP 23169417, Applicant: Sunmodo Corporation, Date of Action: Jul. 9, 2024, European Patent Office, Munich, Germany.

European Examination Report, European Patent Application No. EP 23169417, Applicant: Sunmodo Corporation, Date of Action: Feb. 18, 2025, European Patent Office, Munich, Germany.

\* cited by examiner

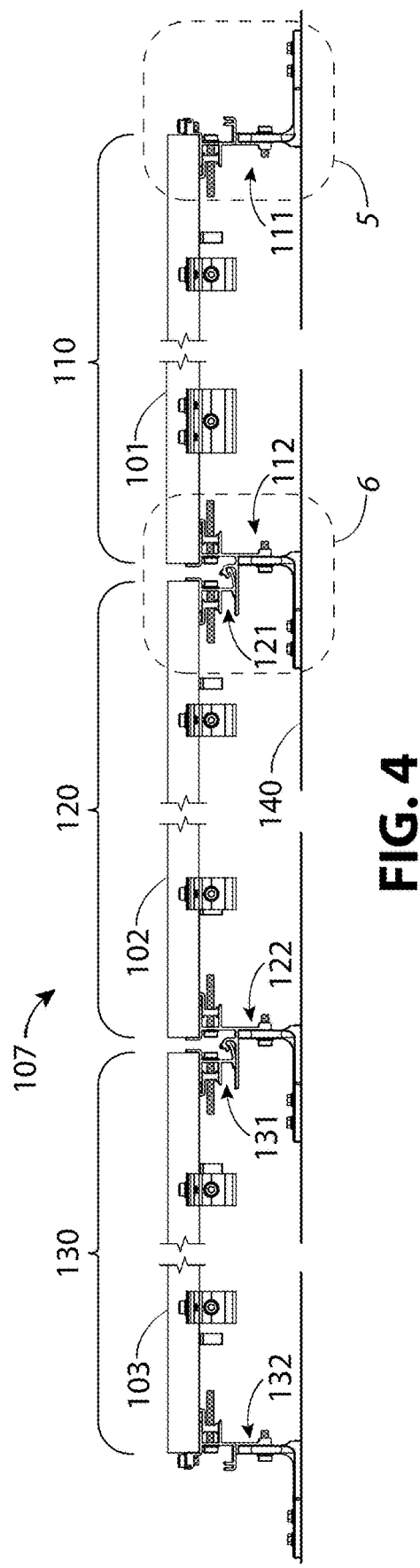
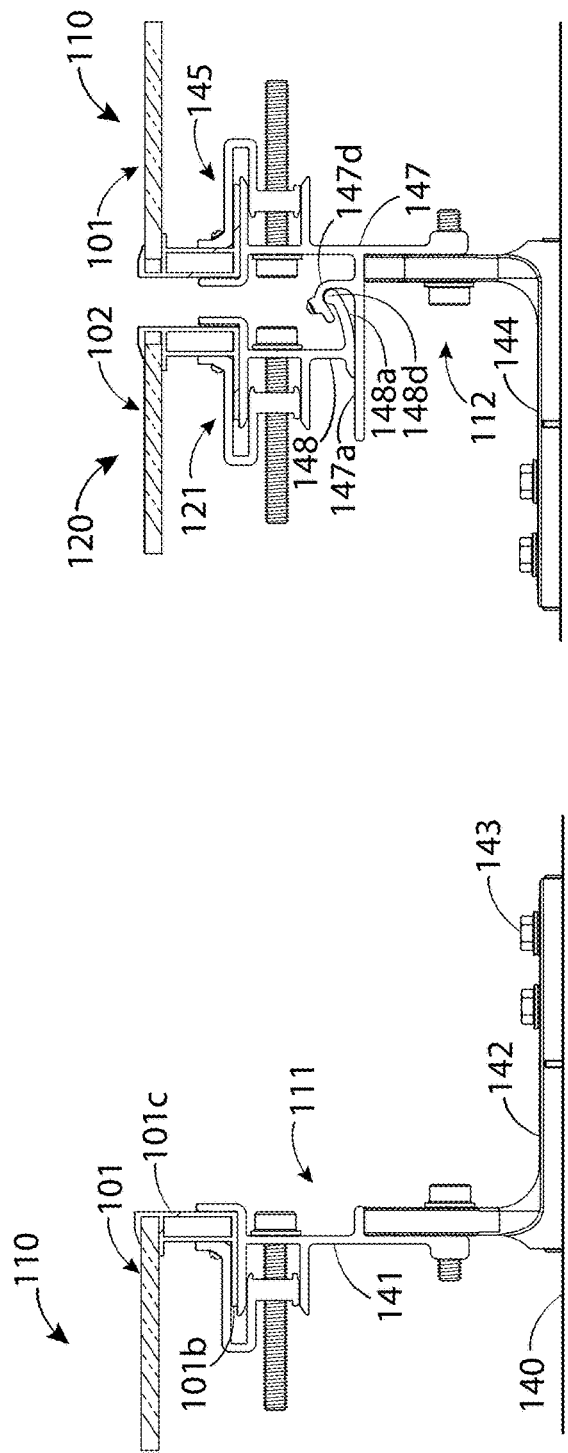
FIG. 4
FIG. 5
FIG. 6

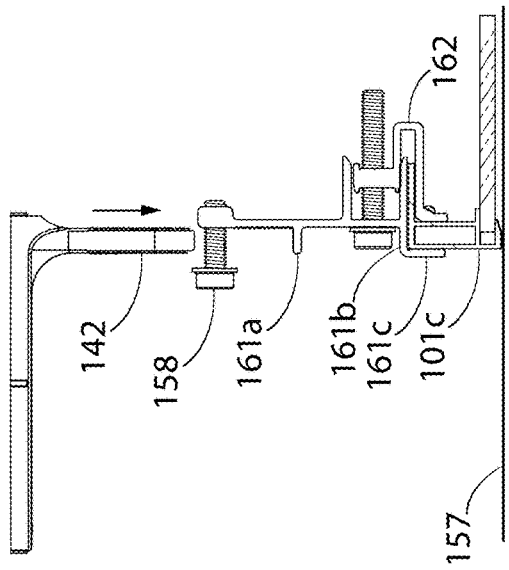
FIG. 45
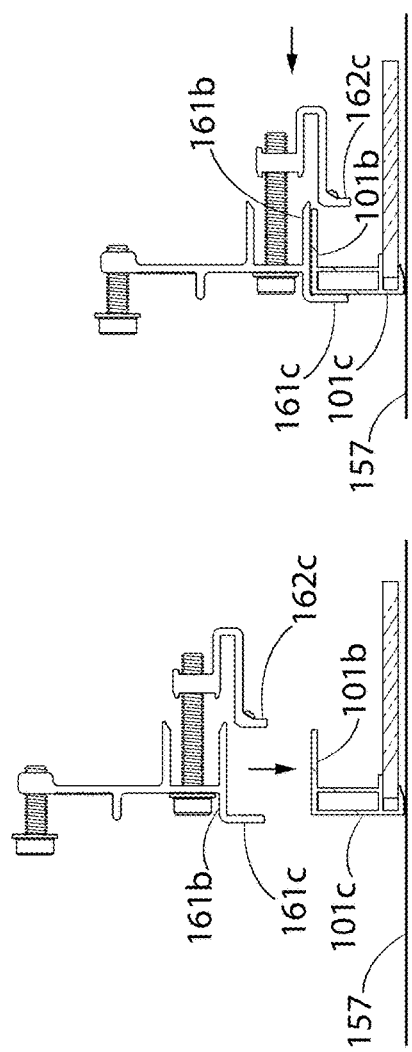
FIG. 44
FIG. 43
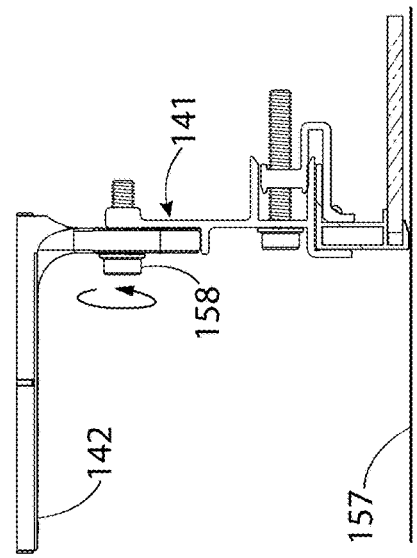
FIG. 46

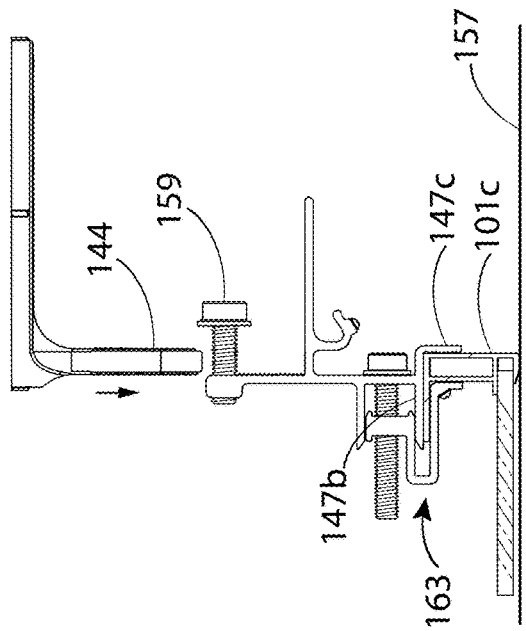
FIG. 47
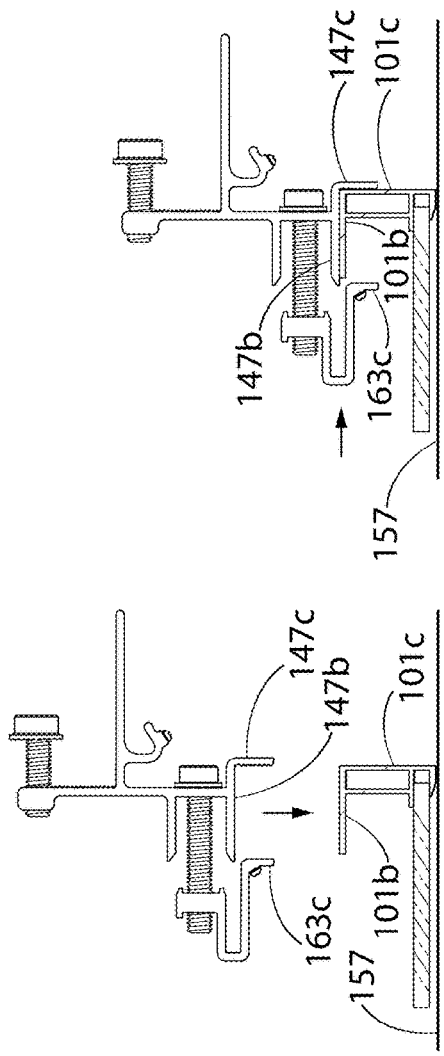
FIG. 48
FIG. 49
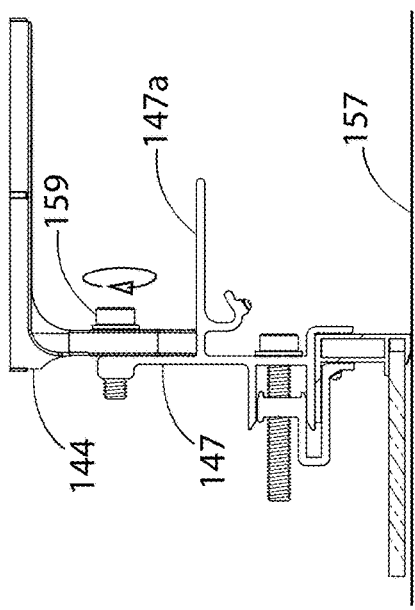
FIG. 50

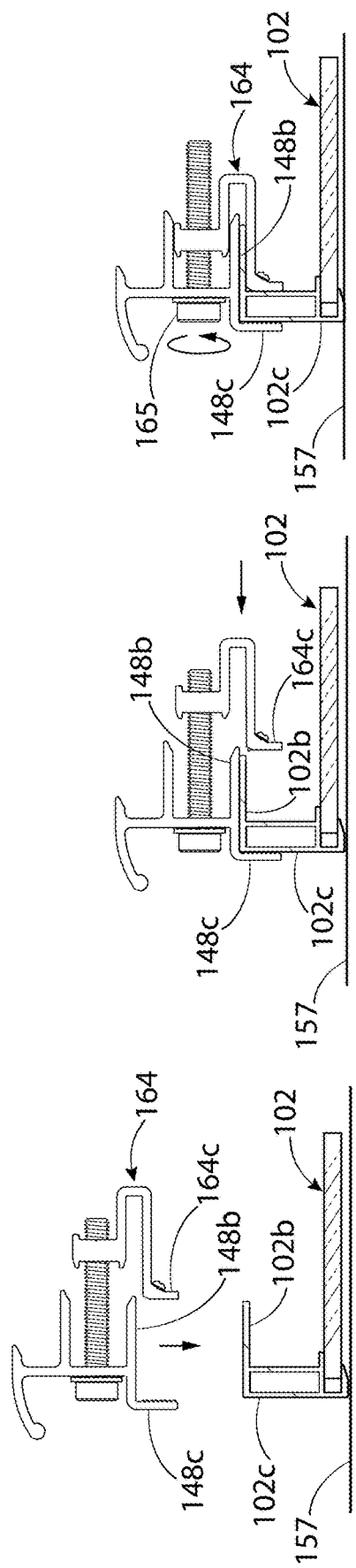

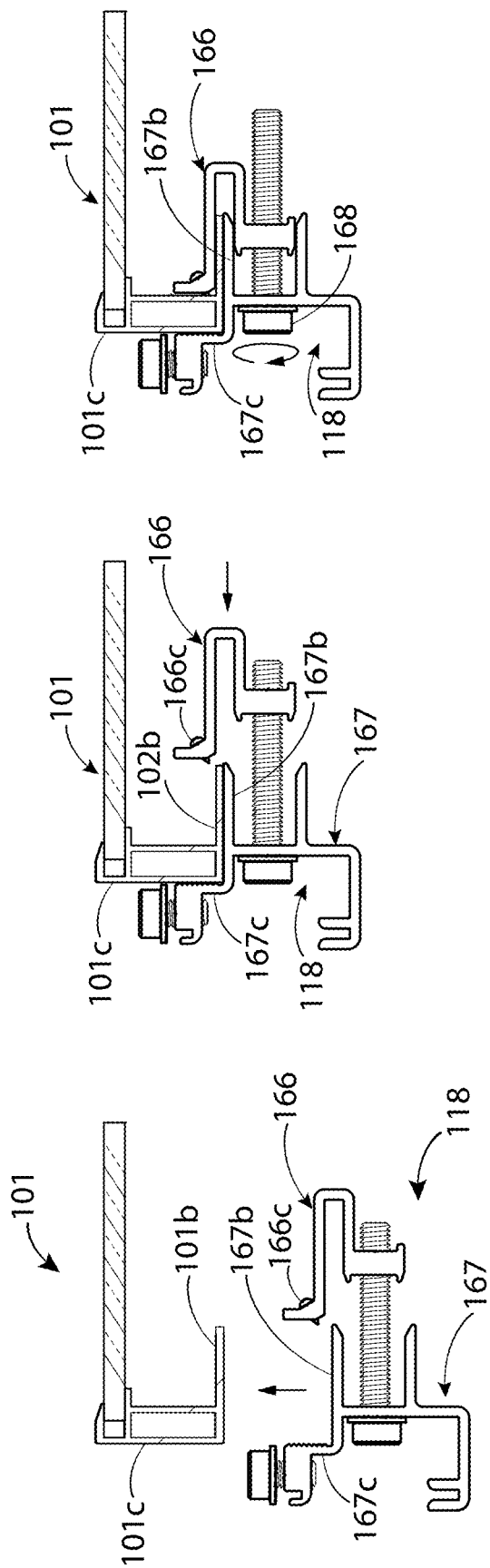

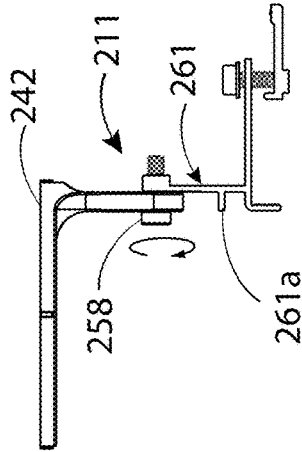
FIG. 83
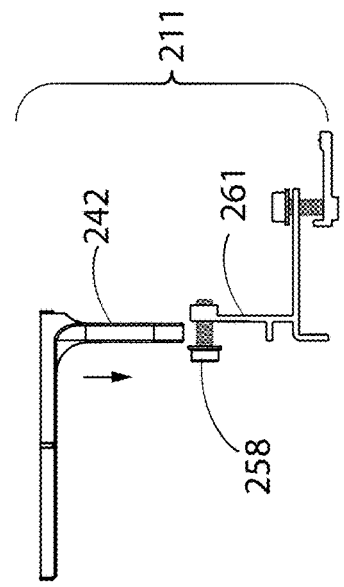
FIG. 85
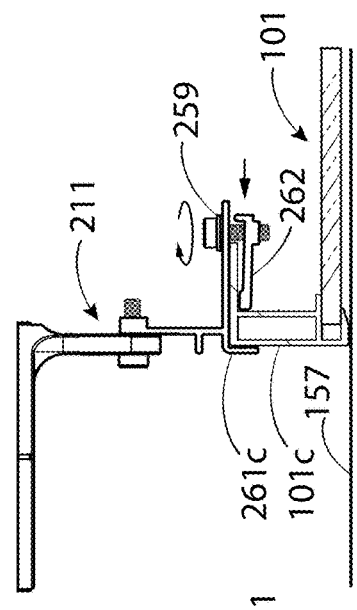
FIG. 84
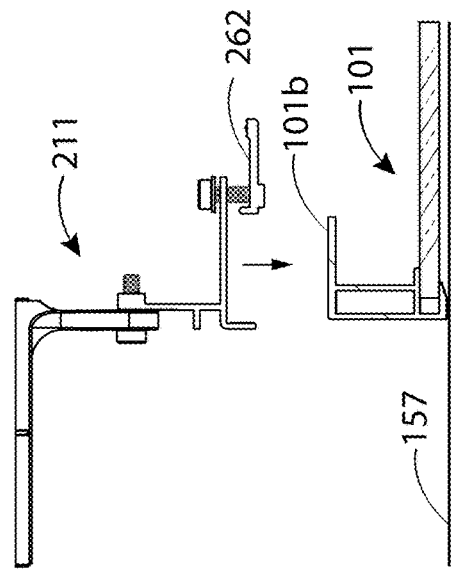
FIG. 86
FIG. 87

RAIL-LESS SOLAR PANEL DEVICES AND SYSTEM FOR ROOFS AND THE LIKE AND METHODS FOR MOUNTING SAME

CROSS-REFERENCES

This is a divisional application of U.S. patent application Ser. No. 18/058,731, filed on Nov. 23, 2022. U.S. patent application Ser. No. 18/058,731, is hereby incorporated by reference.

BACKGROUND

This disclosure relates to a rail-less solar panel system and methods for mounting the solar panel system to building structures such as roofs.

Solar photovoltaic panels, or simply "solar panels" in this disclosure, are installed on various types of residential and commercial roofs. These roofs can be found on building roof tops or on shade structures such as awnings and carports.

Residential and commercial solar panel assemblies or solar panel arrays come in a variety sizes and configurations. For example, a 20-kW residential array using 480 W solar panels would require forty-two solar panels. A 1000 kW (1 MW) commercial system using 480 W solar panels would require over 2000 solar panels. Both large commercial systems and small residential systems typically require a mounting system or a "racking system" to secure the solar panel array to a roof or building structure. Racking systems for roofs can generally be divided into two types: rail-based and rail-less. Rail-based racking systems typically include mounting brackets, solar panel clamps, fasteners, rails, and flashing. Rail-less systems can also include mounting brackets, solar panel clamps, fasteners, and flashing, but eliminate the rails.

In a rail-less system, the installer typically plans and measures where to place the brackets. The installer then secures the brackets along with flashing or other waterproofing material to the roof with roof fasteners such as lag bolts or deck screws. The solar panel is then attached to the brackets using solar panel clamps. Solar panel clamps that clamp to the top of the solar panel frame are called over-the-panel clamps. These are also referred to as solar panel top clamps. Solar panel clamps that clamp the inside lip or flange (i.e., the return flange) of the bottom of the solar panel frame are known as under-the-panel clamps. These are also referred to as solar panel bottom clamps. Solar panel top clamps and bottom clamps that clamp to the outside perimeter of a solar panel array are known as end clamps. Solar panel top clamps or bottom clamps that clamp between solar panels (i.e., to two solar panels) are known as mid clamps.

SUMMARY

The inventor observed that rail-less solar panel arrays are prone to installation errors and require a higher level of training as compared to rail-based systems, because of the installation complexity. The inventor set out to create a rail-less solar panel system that was simple to install and reduced installation time and error.

The inventor created a rail-less solar panel system where an installer secures components such as catch clamp, mid clamp, and optionally end clamp assemblies to solar panels before placing and securing the resulting solar panel assemblies to a building structure. The building structure is typically a roof. These components can be preinstalled to the solar panel on a work surface at the job site such as a driveway, work bench, the ground, the roof, in a work truck or van, or against a wall. The components can be structured so the installer can secure them to the solar panels while the solar panels are face down on the work surface. With the first solar panel assembly to the building structure, the installer installs subsequent solar panel assemblies by attaching the leading edge of the subsequent solar panel assembly to the trailing edge of the previous solar panel assembly using a catch and catch receiver, hook and slot, tab and slot, or similar mechanism.

The solar panel assemblies are typically installed in columns, with subsequent columns positioned and installed adjacent to previously installed columns. The first solar panel assembly within a column includes mid clamp assemblies secured to the solar panel's trailing edge and mid clamp or end clamp assemblies secured to the solar panel's leading edge. Each subsequent solar panel assembly within a column, except for the last, includes catch clamp assemblies secured to their solar panel's leading edge and mid clamp assemblies secured to their solar panel's trialing edge. The final solar panel assembly within a column can optionally include end clamp assemblies in place of the mid clamp assemblies on their solar panel's trailing edge.

Catch clamp assembles can include a catch, hook, or tab mechanism that engages and secures to catch receivers, hook-receiving slots, tab-receiving slots, or similar mechanisms in the mid clamp assemblies. Catch clamp assemblies secured on the leading edge of an uninstalled solar panel assembly can engage and secure to mid clamp assemblies attached to the trailing edge of an installed solar panel assembly.

Catch clamp assemblies can include a seating platform structured as a hook arm with an open end and a generally curve-shaped seating surface. The open end can be a ball hook catch, a hook, or a tab. This hook arm engages a hook receiver in a mid clamp assembly that is attached to the trailing edge of an installed solar panel. The hook receiver of the mid clamp assembly can have a generally concave-shaped interior shaped to receive a ball hook catch. It can alternatively be a tab-receiving slot, a hook receiving slot, or other mechanism capable of receiving the open end. The hook arm of the catch clamp assembly can have a generally curve-shaped lower surface that engages a panel hook platform associated with the hook receiver. The curve-shaped lower surface is typically convex with respect to the panel hook platform (i.e., downward-facing generally convex shape). This allows the catch clamp and its solar panel assembly to rotate or pivot as the open end engages the hook receiver in the mid clamp assembly. Once the catch clamp is engaged and secured with the catch receiver, the installer can fasten the solar panel mounting clamps attached to the trailing edge of the solar panel assembly to the building surface using threaded fasteners such as deck screws or lag bolts with sealing washers.

The installer can preassemble and install additional solar panel assemblies in a similar way. The installer will pre-assemble catch clamp assemblies on the leading edge and mid clamp assemblies on the trailing edge of the additional solar panel. The exception being, where the last solar panel assembly in the column end clamp assemblies can optionally be secured to the trailing edge. The installer then secures the resulting solar panel assembly to the previous solar panel assembly by engaging the catch clamp assemblies with the catch receivers and panel hook platforms mounted to the trailing edge of the previous solar panel assembly. With the catch clamp assemblies secured to the catch receivers, and the feet of the solar panel assembly touching the building surface, the installer then secures the solar panel assembly by fastening the feet of the solar panel mounting bracket assembly to the building surface.

Solar panel manufacturers typically include holes or apertures drilled through the bottom, or return flange, of the solar panel frame. Some of these apertures are for mounting while others are for drainage. For a given solar panel model, the mounting apertures are consistently positioned from panel to panel. Observing this, the inventor envisions that the solar panel installer can optionally align the solar panel mounting clamp assemblies and the solar panel catch clamp assemblies to the manufacturer-provided mounting holes to assure consistent placement of these components without measurement.

The described assembly methods and devices have several advantages. They reduce installation time and complexity as compared with typical rail-based and rail-less systems. The installer can attach catch clamp, mid clamp, and end clamp assemblies to solar panels and attach the resulting solar panel assembly to the building structure without complicated measurements and without pre-placement of solar panel mounting brackets on the building structure. Installation error is reduced. Other rail-less systems typically require the installer to secure the mounting brackets to the roof first before attaching their respective solar panels. If there is a mistake in placement, the mounting brackets would have to be removed, the consequent hole filled, and the mounting brackets reinstalled in the correct location. In contrast, the solar panel assemblies of this disclosure, have their solar panel clamp assemblies pre-attached to the solar panel before attaching the solar panel assembly to the roof.

These examples and advantages discussed in this Summary are representative but not all-inclusive. The inventive concept is not limited to the examples given or the discussed advantages. The Detailed Description, drawings, and claims reveal additional features and advantages.

BRIEF DESCRIPTION OF DRAWINGS

FIG. 4 illustrates, in left side view, the solar panel assembly of FIG. 3.

FIG. 5 illustrates an enlarged view of part of FIG. 4, with the solar panel cutaway to show the relationship between the end clamp assembly and the solar panel frame.

FIG. 6 illustrates an enlarged view of part of FIG. 4, with the solar panel cutaway to show the relation between the mid clamp assembly, the catch clamp assembly, and the solar panel frame.

FIGS. 43-46 illustrate an alternate sequence of attaching a solar panel end clamp assembly to a solar panel resting face down on a work surface.

FIGS. 47-50 illustrate an alternate sequence of attaching a solar panel mid clamp assembly to a solar panel resting face down on a work surface.

FIGS. 51-53 illustrates a sequence of attaching a catch clamp assembly to a solar panel resting face down on a work surface.

FIGS. 54-56 illustrate a sequence of attaching a skirt clamp assembly to a solar panel after the solar panel is mounted to the building surface.

FIGS. 83-87 illustrate a sequence of attaching the solar panel end clamp assembly of FIGS. 74-76 to a solar panel resting face down on a work surface.

DETAILED DESCRIPTION

Figure 1:
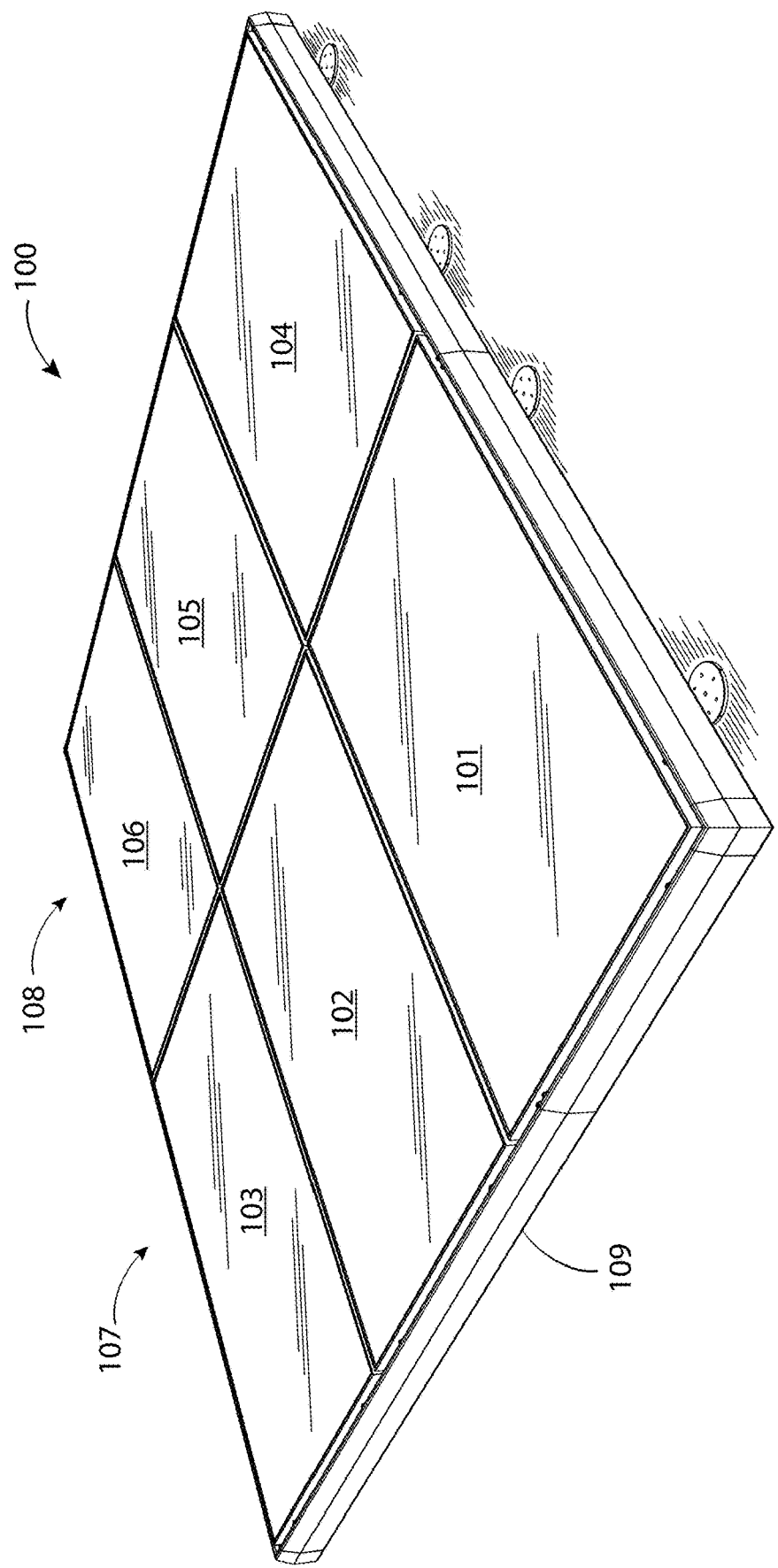
FIG. 1 illustrates, in front and top perspective view, a solar panel array, arranged in landscape orientation, using solar panel clamp assemblies and other devices of this disclosure.

When describing the figures, the terms "top," "bottom," "front," "side," "left," and "right" are relative terms. Specific dimensions are intended to help the reader understand the scale of the discussed material. Dimensions given are typical and the claims are not limited to the recited dimensions. Ordinals such as "first," "second," or "third," are used in this Detailed Description and in the claims to differentiate between similarly-named parts and do not imply a particular order, preference, or importance. "Optional" or "optionally" is used throughout this disclosure to describe features or structures that are optional. Not using the word "optional" or "optionally" to describe a feature or structure does not imply that the feature or structure is not optional. Finally, the word "or" is used in the ordinary sense to mean an "inclusive or," unless preceded by a qualifier, such as the word "either," that signals an "exclusive or."

The Detailed Description is organized in these sections: Definitions, System Overview, Assembly Method, Components, and Conclusion.

Definitions

Return Flange: As defined in this disclosure, a return flange is the lower lip portion of a solar panel frame that projects inward underneath the solar panel.

Manufacturer-Provided Mounting Holes: As defined in this disclosure, manufacturer-provided mounting holes are mounting holes pre-drilled or pre-punched by the manufacturer of the solar panel in the return flange of the solar panel frame.

Solar Panel Bottom Clamp: As defined in this disclosure, a solar panel bottom clamp is a device secured to the return flange or the inside frame of the solar panel.

Solar Panel Clamp Assembly: As defined in this disclosure, a solar panel clamp assembly is a device directly securable to a solar panel and directly securable to a building structure. A solar panel clamp assembly can be a mid clamp assembly or an end clamp assembly.

Mid Clamp Assembly: As defined in this disclosure, a mid clamp assembly is a device directly securable to two adjacent solar panels and directly securable to a building structure. A mid clamp assembly can function as an end clamp assembly.

End Clamp Assembly: As defined in this disclosure, an end clamp assembly is a device directly securable to one solar panel, but not two adjacent solar panels, and directly securable to a building structure.

Catch Clamp Assembly: As defined in this disclosure, a catch clamp assembly is a device that is directly securable to a solar panel and is removably securable to a mid clamp assembly that is secured to a directly adjacent solar panel.

System Overview

The system includes solar panel assemblies arranged in an array of rows and columns. Unlike other rail-less solar panel systems, the installer preassemblies catch clamp, mid clamp, and optionally end clamp assemblies to solar panels before the installer places and secures the resulting solar panel assemblies to a building structure or roof. After the installer places and secures the first solar panel assembly to the building structure, the installer installs subsequent solar panel assemblies by attaching the leading edge of the subsequent solar panel assembly to the trailing edge of the previous solar panel assembly using a catch and catch receiver, hook and slot, tab and slot, or similar mechanism. FIGS. 9-53 describe this process in more detail. FIGS. 54-58 describe the process of attaching an optional skirt assembly. FIGS. 59-73 discuss examples of the components: the catch clamp, mid clamp, end clamp, and skirt clamp assemblies. FIGS. 74-82 discuss alternative end clamp, mid clamp, and catch clamp assemblies. FIGS. 83-92 discuss assembly sequences for the alternative assemblies.

Figure 2:
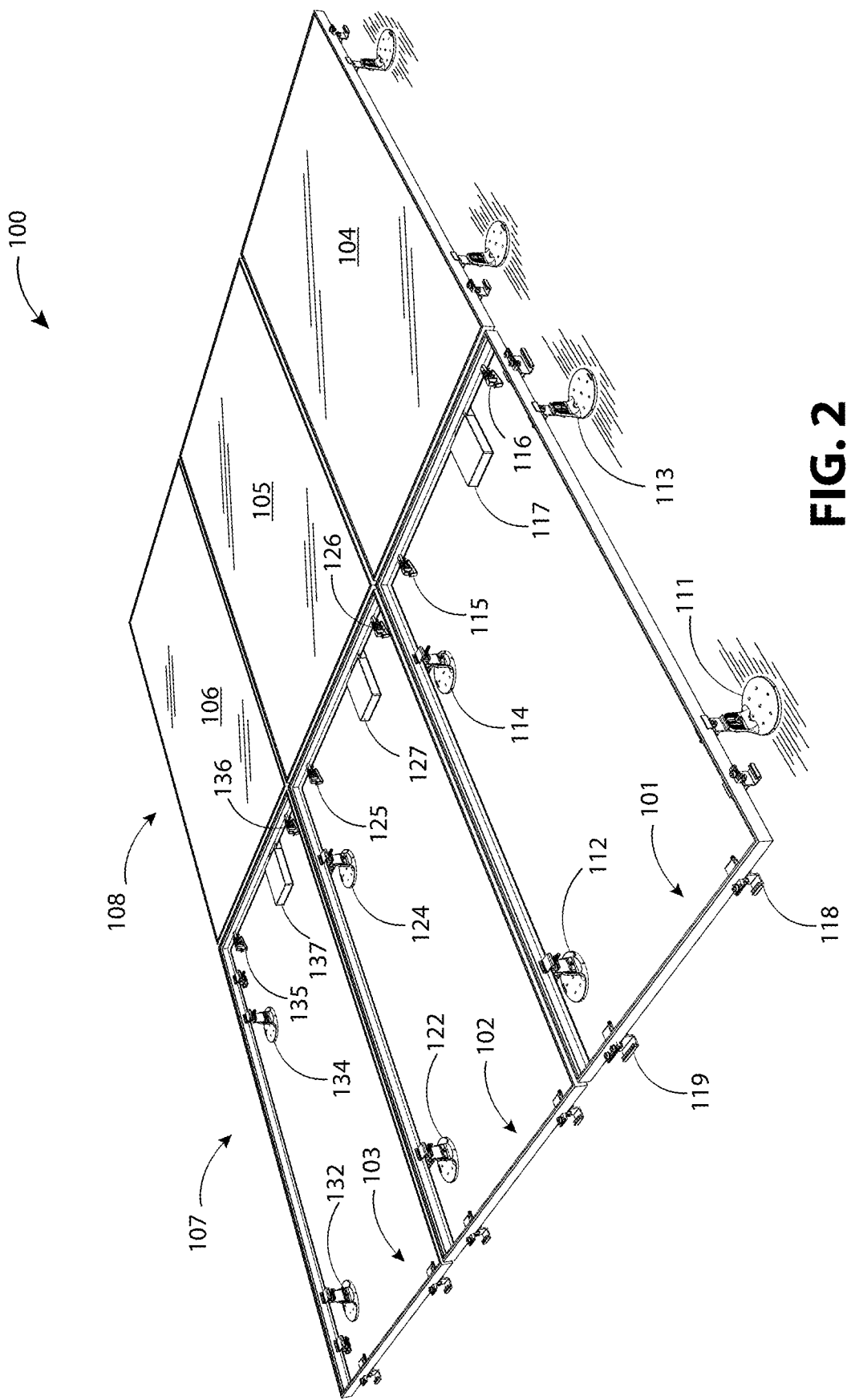
FIG. 2 illustrates, in front and top perspective view, the solar panel array of FIG. 1, with solar cell removed from their frames on three of the solar panels and the skirts removed from the solar panel array, to show solar panel clamp assemblies and other devices attached to the solar panel frame.

FIGS. 1-8 illustrate an overview of a finished solar panel array that uses methods and components described in this disclosure. FIGS. 1 and 2 shows a simplified array of solar panels, solar panel array 100, arranged in three rows and in two columns. The first solar panel 101, the second solar panel 102, and the third solar panel 103 are arranged in column 107. Solar panels 104, 105, 106 are arranged in column 108. FIG. 1 shows an optional skirt assembly, skirt assembly 109, that surrounds the perimeter of the solar panel array 100. The skirt assembly 109 helps to create a unified appearance.

Figure 14:
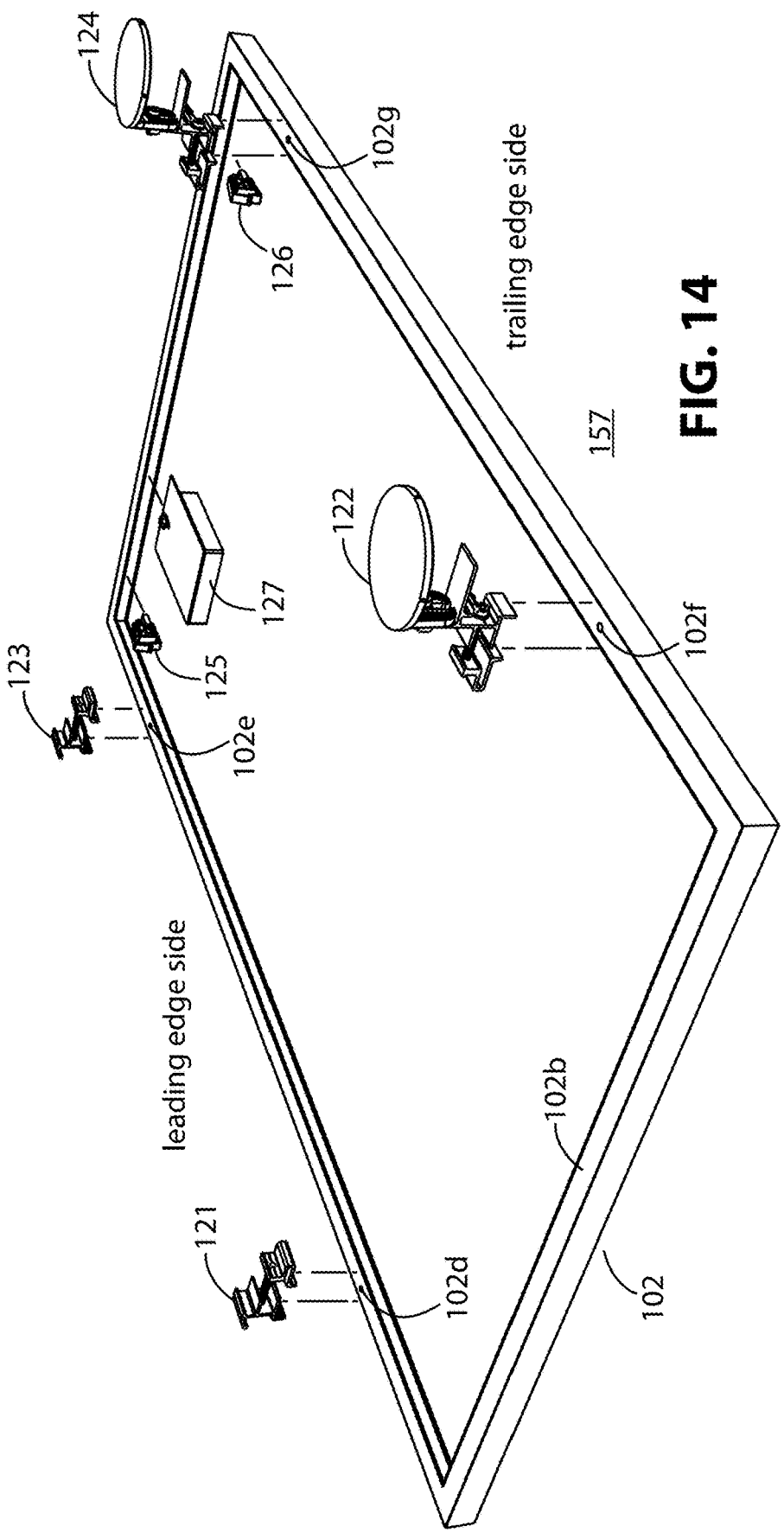
FIGS. 14 and 15 illustrate, in perspective view, a sequence for attaching solar panel mounting clamps, catch clamps, and accessories to the second solar panel frame using the methods of FIGS. 10, 11, 22, and 32.
Figure 15:
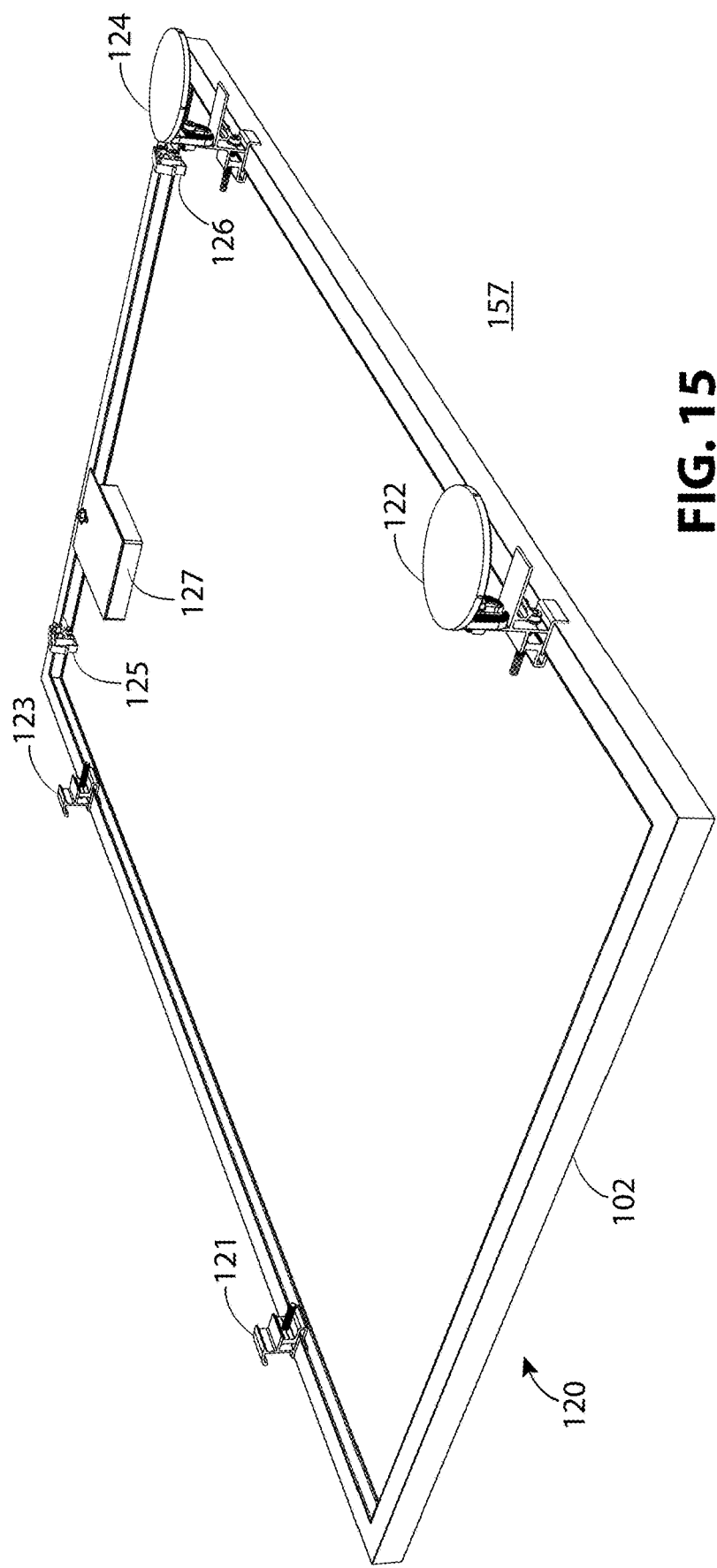
Figure 16:
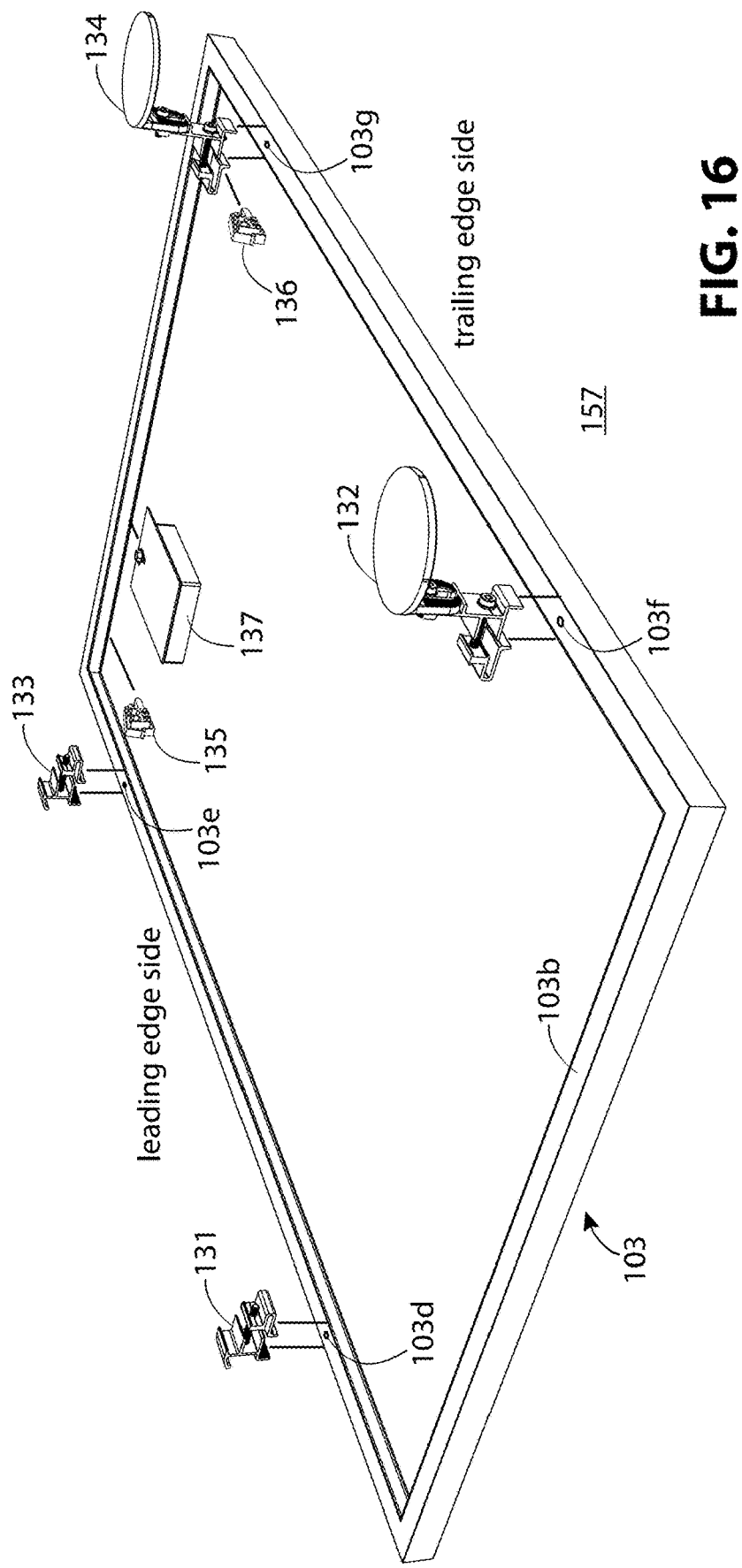
FIGS. 16 and 17 illustrate, in perspective view, a sequence for attaching solar panel mounting clamps, catch clamps, and accessories to the third solar panel frame using the methods of FIGS. 10, 11, 22, and 32.
Figure 17:
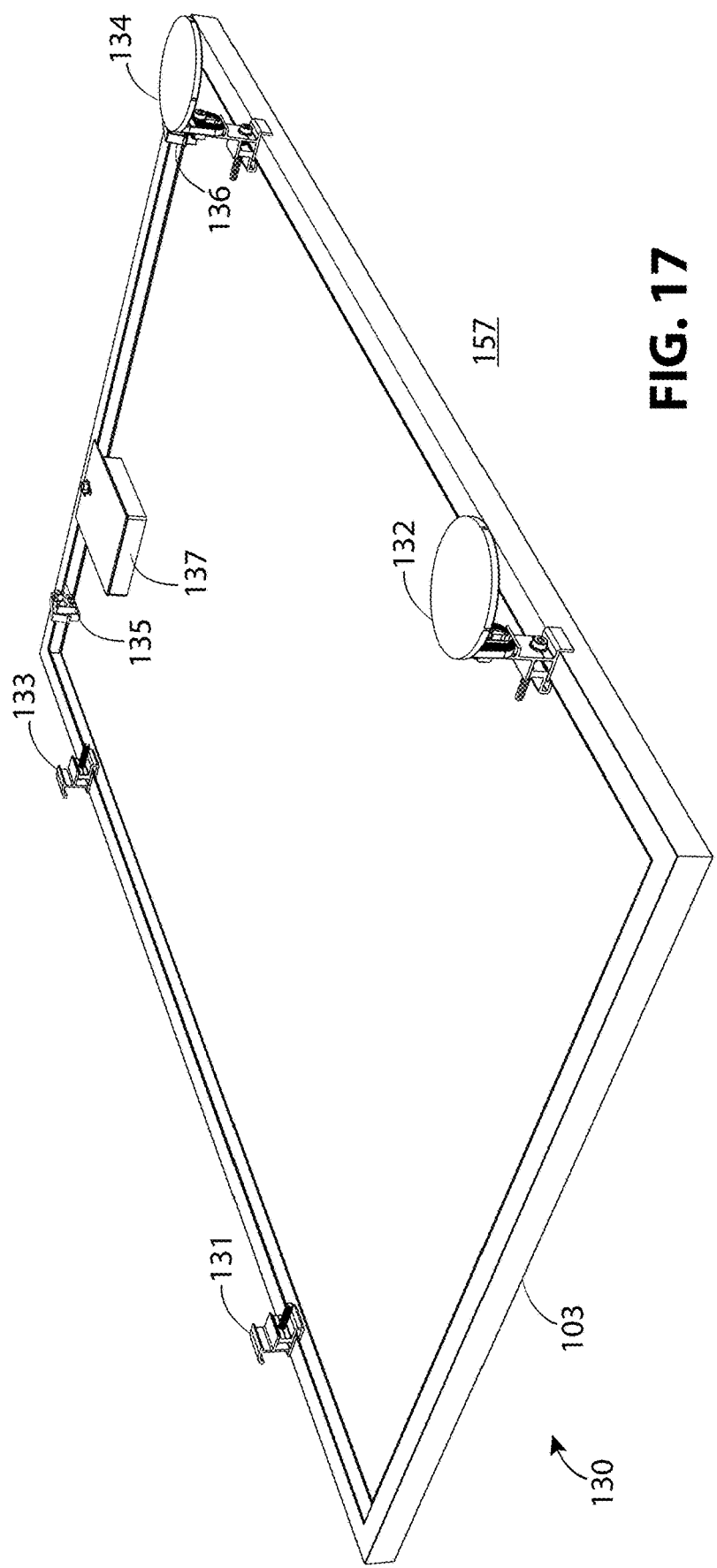

FIG. 2 shows the solar panel array 100 with the skirt assembly 109 of FIG. 1 removed to reveal skirt bracket assemblies used to secure the skirt assemblies to the solar panel frames. For example, FIG. 2 shows instances of skirt bracket assembly 118 and skirt splice assembly 119. FIG. 2 also shows the solar cells and their associated glass and substrates removed from the first solar panel 101, the second solar panel 102, and the third solar panel 103 from their respective frames to reveal solar panel mounting assemblies and accessories hidden beneath. FIG. 2 shows solar panel clamp assemblies secured to the first solar panel 101. These solar panel clamp assemblies are illustrated as the end clamp assemblies 111, 113 and the mid clamp assemblies 112, 114. Solar panel clamp assemblies, i.e., the mid clamp assemblies 122, 124 are shown attached to the trailing edge of the second solar panel 102. Catch clamp assemblies 121, 123 are secured to the leading edge of the second solar panel 102. These catch clamp assemblies are hidden from view but are shown in FIGS. 14 and 15. Referring to FIG. 2, solar panel clamp assemblies, i.e., end clamp assemblies 132, 134, are shown secured to the trailing edge of the third solar panel 103. Catch clamp assemblies 131, 133 are secured to the leading edge of the solar panel frame. They are hidden from view, but are shown in FIGS. 16 and 17. FIG. 2 also illustrates optional accessories. These optional accessories include wire management clips 115, 116, and module level power electronics (MLPE), i.e., the MLPE 117, attached to the first solar panel 101. They also include wire management clips 125, 126, and the MLPE 127 attached to the second solar panel 102. And include wire management clips 135, 136, and the MLPE 137 attached to the third solar panel 103.

Figure 3:
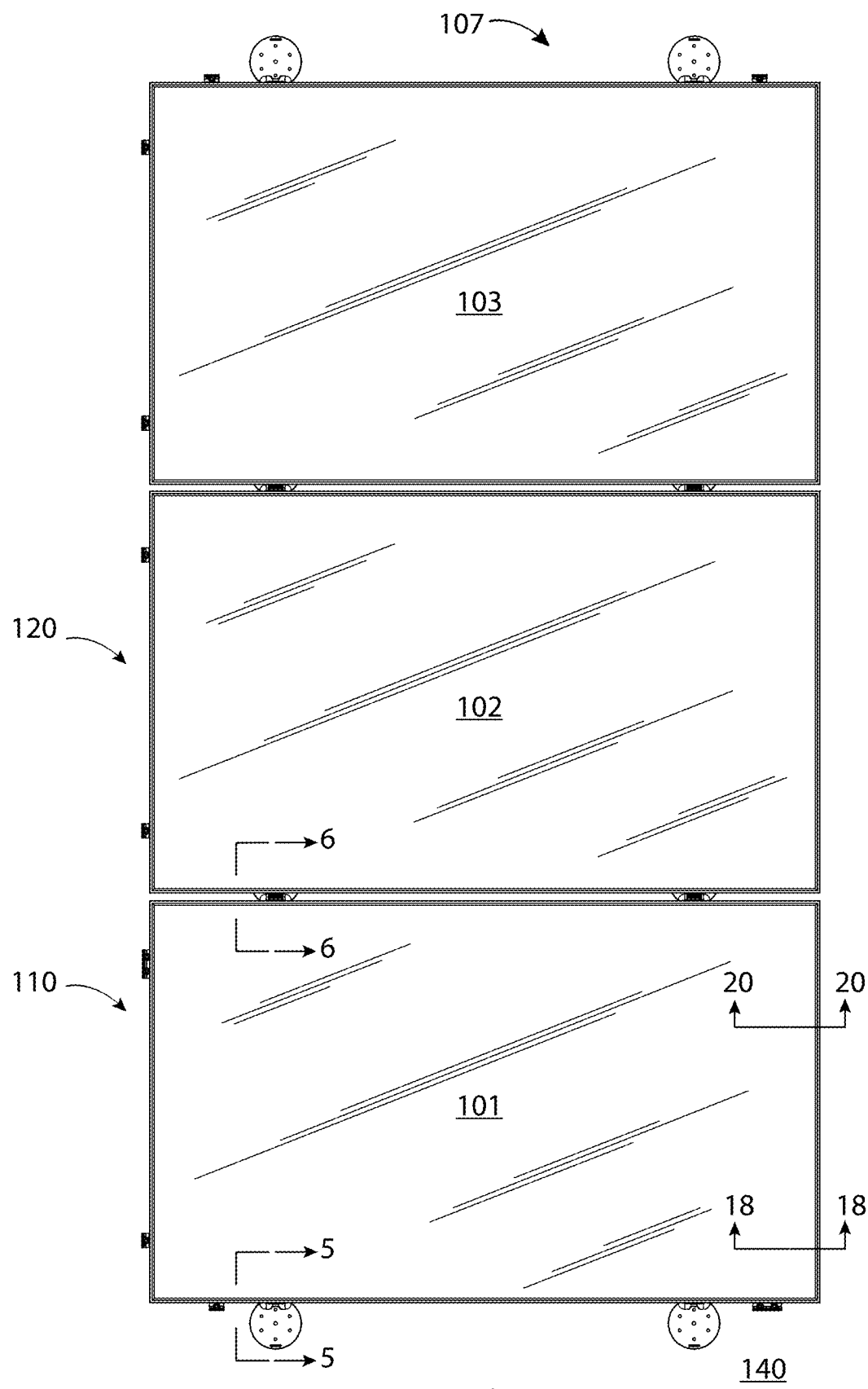
FIG. 3 shows, in top view, a column of the solar panel array of FIG. 1, after solar panels are attached to the building structure surface.

The solar panel array is typically assembled column by column. FIG. 3 shows column 107 of the solar panel array 100 of FIG. 1, with the first solar panel 101, the second solar panel 102, and the third solar panel 103 after they are attached to the building structure surface, for example, roof 140. FIG. 4 illustrates a side view of column 107. Referring to FIG. 4, column 107 includes the first solar panel assembly 110, second solar panel assembly 120, and third solar panel assembly 130. These solar panel assemblies are preassembled on the job site by an installer, for example, on the ground or on the building structure, before they are secured to one another and to the roof 140. First solar panel assembly 110 includes the first solar panel 101, end clamp assembly 111, and mid clamp assembly 112. The end clamp assembly 111 is secured to the leading edge of the first solar panel 101. The mid clamp assembly 112 is secured to the trialing edge of the first solar panel 101. The second solar panel assembly 120 includes the second solar panel 102, the catch clamp assembly 121, and the mid clamp assembly 122. The catch clamp assembly 121 is secured to the leading edge of the second solar panel 102. The mid clamp assembly 122 is secured to the trialing edge of second solar panel 102. The third solar panel assembly 130 includes the third solar panel 103, the catch clamp assembly 131, and the end clamp assembly 132. The catch clamp assembly 131 is secured to the leading edge of the third solar panel 103. The end clamp assembly 132 is secured to the trialing edge of the third solar panel 103. The installer can substitute a mid clamp assembly for the end clamp assembly 132 to extend the column with more rows. Column 107 could optionally end with a mid clamp assembly in place of the end clamp assembly 132.

FIG. 5 shows an enlarged part of FIG. 4 taken in cross section along section lines 5-5 from FIG. 3. FIG. 6 shows an enlarged part of FIG. 4 taken along section lines 6-6 from FIG. 3. Referring to FIG. 5, the end clamp assembly 111 includes an end clamp bracket assembly 141 and an L-foot 142. The end clamp assembly 111 secures the first solar panel 101 by clamping the inside and the outside of the solar panel frame 101c and extends over and under the return flange 101b. The end clamp bracket assembly 141 is secured to the L-foot 142. The L-foot 142 is secured to the roof 140, by multiple instances of threaded fastener 143. The threaded fastener 143 can be a deck screw, lag bolt, or any threaded fastener capable of securing the L-foot 142 to the roof 140 and have enough holding strength to keep the first solar panel assembly 110 secured to the roof 140 under expected environmental conditions such as rain and wind storms.

Referring to FIG. 6, the mid clamp assembly 112 includes an L-foot 144 and a mid clamp bracket assembly 145. The mid clamp assembly 112 is secured to the trailing edge of the first solar panel 101. The mid clamp bracket assembly 145 includes a mid clamp bracket 147. The mid clamp bracket includes a panel hook platform 147a and a hook receiver 147d to capture, receive, and secure an open end of a seating platform of a catch clamp assembly. The hook receiver 147d, as illustrated, includes a generally concave-shaped interior with an end portion that extends toward the panel hook platform 147a. The hook receiver 147d is so shaped to create a rotational stop for the open end 148d. The seating platform is structured as a hook arm 148a that includes an open end 148d and a generally curve-shaped seating surface and can be a downward-facing generally convex shape to allow it to pivot against the panel hook platform 147a. In this example, the catch clamp assembly 121 is secured to the leading edge of the second solar panel 102. The hook arm 148a extends from the panel hook bracket 148 of the catch clamp assembly 121. The open end 148d, can be a ball hook catch as illustrated. The open end 148d of the hook arm 148a engages the hook receiver 147d of the mid clamp bracket assembly 145, securing the second solar panel assembly 120 to the first solar panel assembly 110. This is described in more detail in the discussion of the assembly process. The catch clamp assembly, the mid clamp assembly, and the end clamp assembly will be discussed in greater detail in FIGS. 59-61, FIGS. 62-64, and FIGS. 65-67, respectively.

Referring to FIG. 1, for simplicity, the solar panel array 100 is illustrated with six solar panels. The disclosed solar panel assembly can include more solar panels along with associated end clamp mounting assemblies, mid clamp mounting assemblies, and catch clamp assemblies. As discussed in the Background, a 1 MW (1000 kW) commercial system could include 2000 solar panels. The devices and assembly methods described in this Detailed Description are scalable to even larger systems. An installer can extend the length of a column within the array as required. For example, referring to FIG. 3, starting with the first solar panel assembly 110 as the leading edge of column 107, the installer can extend column 107 by adding instances of the second solar panel assembly 120 without limit.

Figure 7:
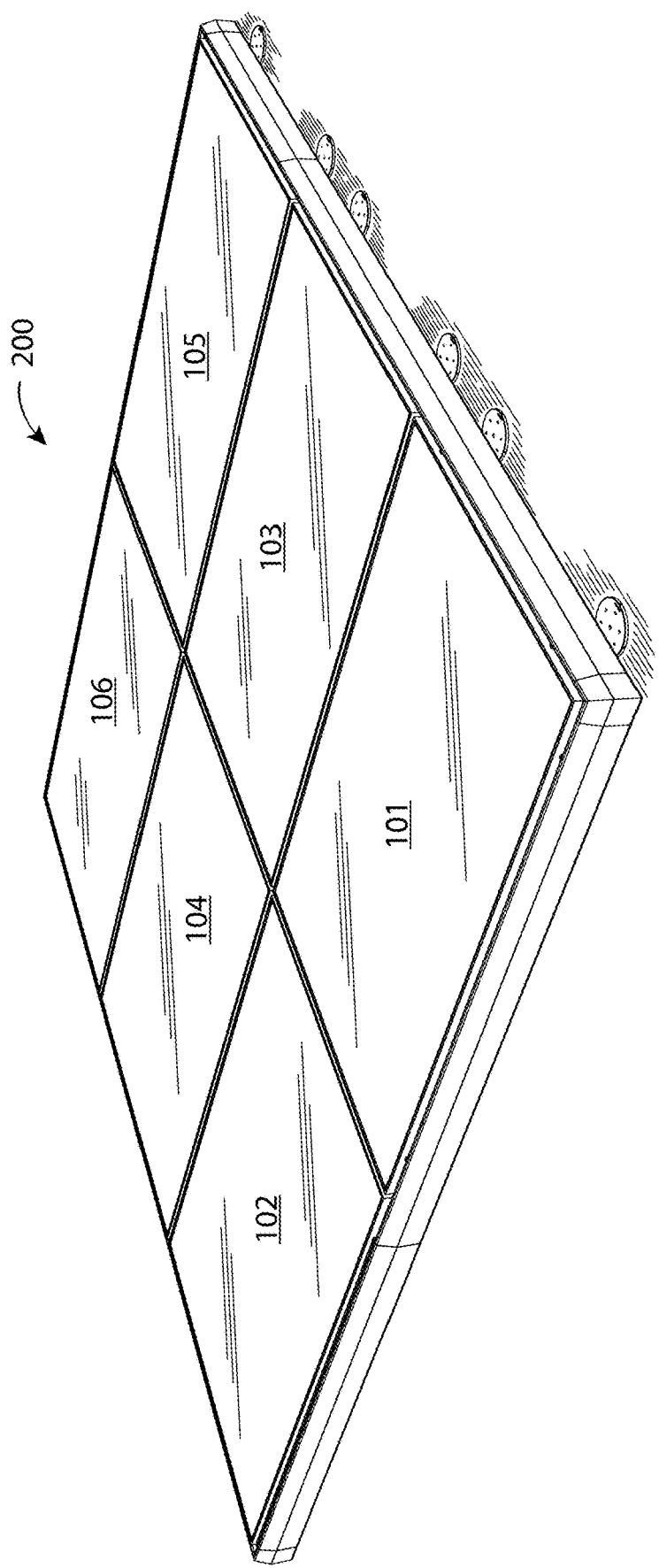
FIG. 7 illustrates, in front and top perspective view, a solar panel array, arranged in portrait orientation, using solar panel clamp assemblies and other devices of this disclosure.
Figure 8:
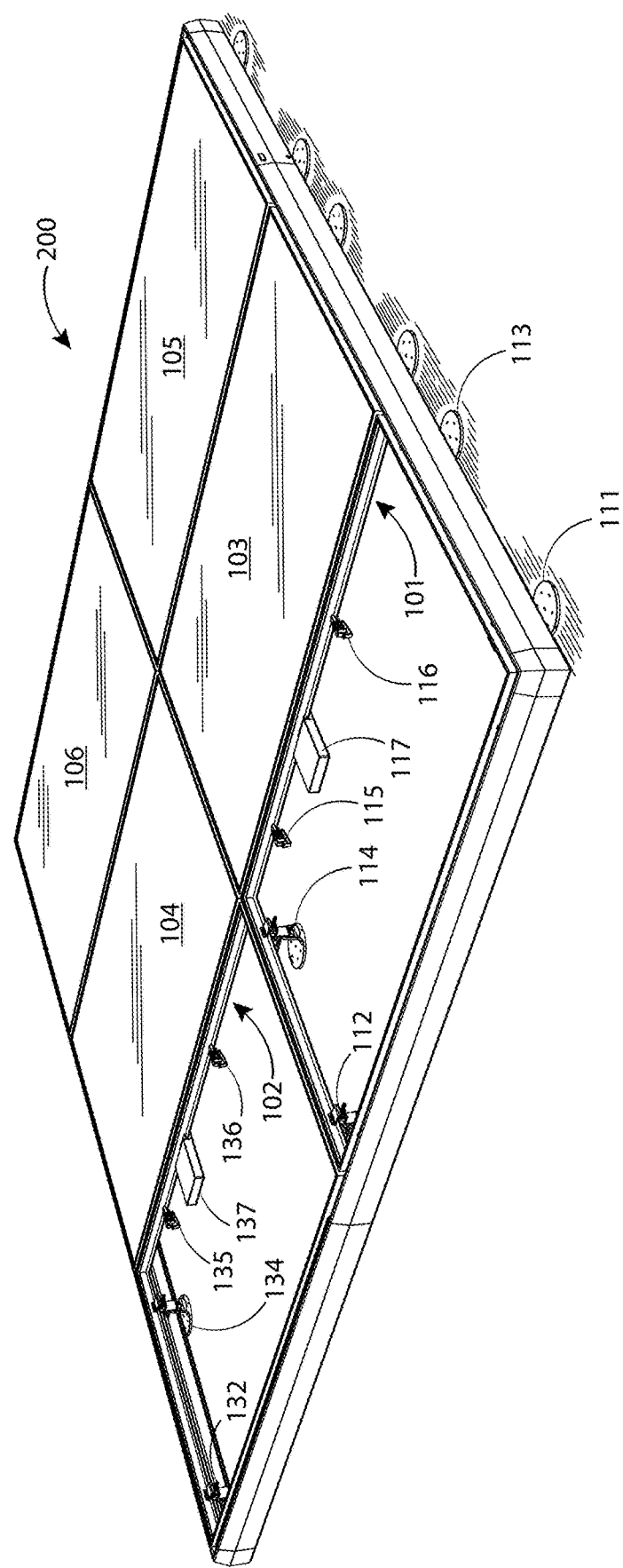
FIG. 8 illustrates, in front and top perspective view, the solar panel array of FIG. 7, with solar cell removed from their frames of two of the solar panels to show solar panel clamp assemblies and other devices attached to the solar panel frame.

An advantage of the systems, devices, and methods described in this disclosure is the installer can mount solar panels in landscape or portrait orientation. In either orientation, the assembly procedure is similar. The solar panel array 100 in FIGS. 1 and 2 is an example of landscape orientation. The width of the columns 107, 108 extends along the long sides of their respective solar panels. The mid clamp, end clamp, and catch clamp assemblies are attached along these long sides. FIGS. 7 and 8 illustrate the solar panel array 200 that includes the first solar panel 101, the second solar panel 102, the third solar panel 103, and solar panels 104, 105,106 arranged in portrait orientation as three columns and two rows. In FIG. 8, the solar cells and their glass cover and substrates are removed from the first solar panel 101 and the second solar panel 102 to reveal solar panel mounting assemblies and accessories hidden from view. Referring to FIG. 8, the end clamp assemblies 111, 113 are secured to the leading edge of the first solar panel 101. The mid clamp assemblies 112, 114 are secured to the trailing edge of the first solar panel 101. The end clamp assemblies 132, 134 are secured to the trailing edge of the second solar panel 102. The catch clamp assemblies secured to the leading edge of the second solar panel 102 are hidden from view. The leading and trailing edges are along the widthwise sides of the solar panels. FIG. 8 also shows optional accessories: These optional accessories include the wire management clips 115, 116 and the MLPE 117 secured to the first solar panel 101 and the wire management clips 135, 136, and the MLPE 137 secured to the second solar panel 102.

EXAMPLES

FIGS. 9-53 show examples of the assembly process of a column of the solar panel array 100 of FIG. 1. For simplicity, the process shows how to assemble a three-panel column. Using the procedure that follows, an installer can extend the number of panels in a column and the number of columns in an array without limit.

Figure 9:
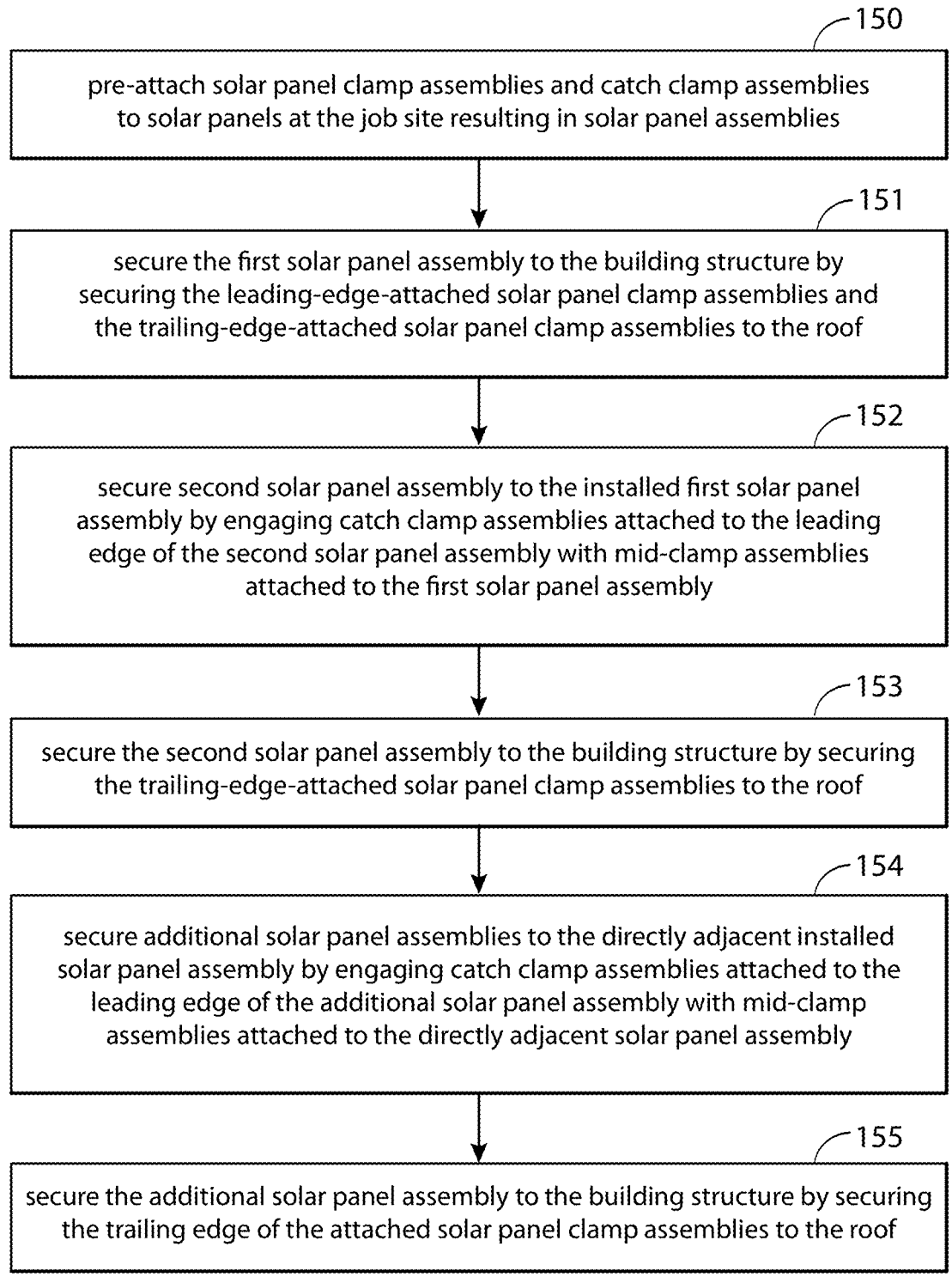
FIG. 9 illustrates a flow chart showing a method for pre-assembling solar panel assemblies and securing the resulting solar panel assemblies to a building structure.

FIG. 9 illustrates an overview of the assembly method. In step 150, the installer pre-attaches, at the job site, solar panel clamp assemblies, catch clamp assemblies, and optionally solar panel accessories to their respective solar panels. The solar panel clamp assemblies, catch clamp assemblies, and solar panel accessories can be preassembled to the solar panel on the ground, a work surface, or on the building surface, such as a roof. In this example, the first solar panel assembly in a column is located on the leading edge of the column. This solar panel assembly can include a solar panel with end clamp and mid clamp assemblies secured to the solar panel's leading edge and trailing edge, respectively. The second and subsequent solar panel assemblies include a solar panel, catch clamp and mid clamp assemblies attached to the solar panel's leading edge and trailing edge, respectively. The last solar panel assembly in the column, i.e., the solar panel assembly on the column's trailing edge, can include end clamp assemblies instead of mid clamp assemblies on the solar panel's trailing edge.

Figure 10:
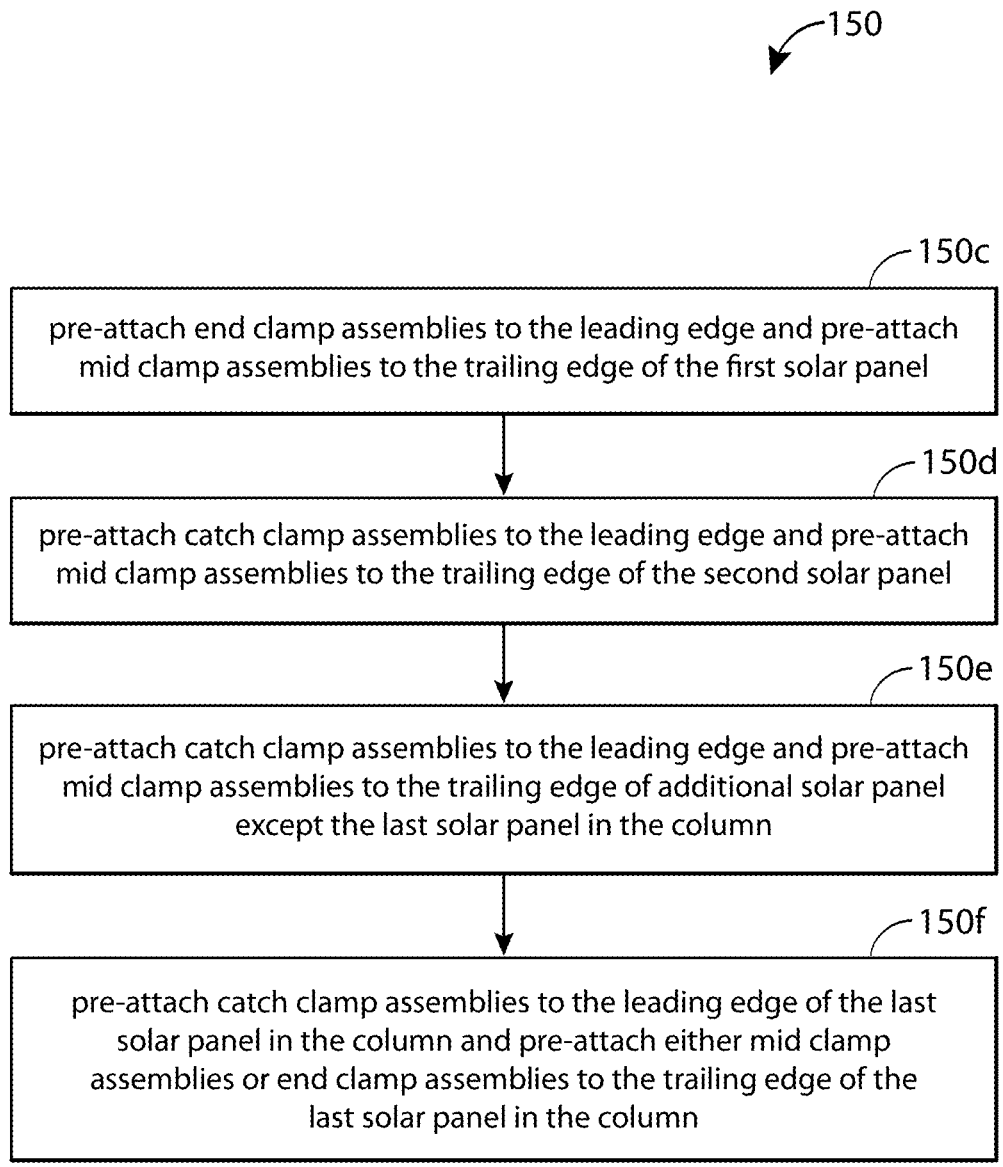
FIG. 10 illustrates a flow chart showing in more detail the step of pre-attaching solar panel clamp assemblies to solar panels resulting in solar panel assemblies.

FIG. 10 illustrates step 150 in more detail. In step 150c, the installer pre-attaches end clamp assemblies and mid clamp assemblies to the first solar panel's leading edge and trailing edge, respectively. In step 150d, the installer pre-attaches catch clamp and mid clamp assemblies to the second solar panel's leading edge and trailing edge, respectively. In step 150e, the installer similarly pre-attaches catch clamp and mid clamp assemblies to the leading edge and trailing edge of additional solar panels in the column except the final solar panel. In step 150f, the installer pre-attaches catch clamp assemblies to the last solar panel's leading edge and can attach mid clamp assemblies or end clamp assemblies to the last solar panel's trailing edge.

Figure 11:
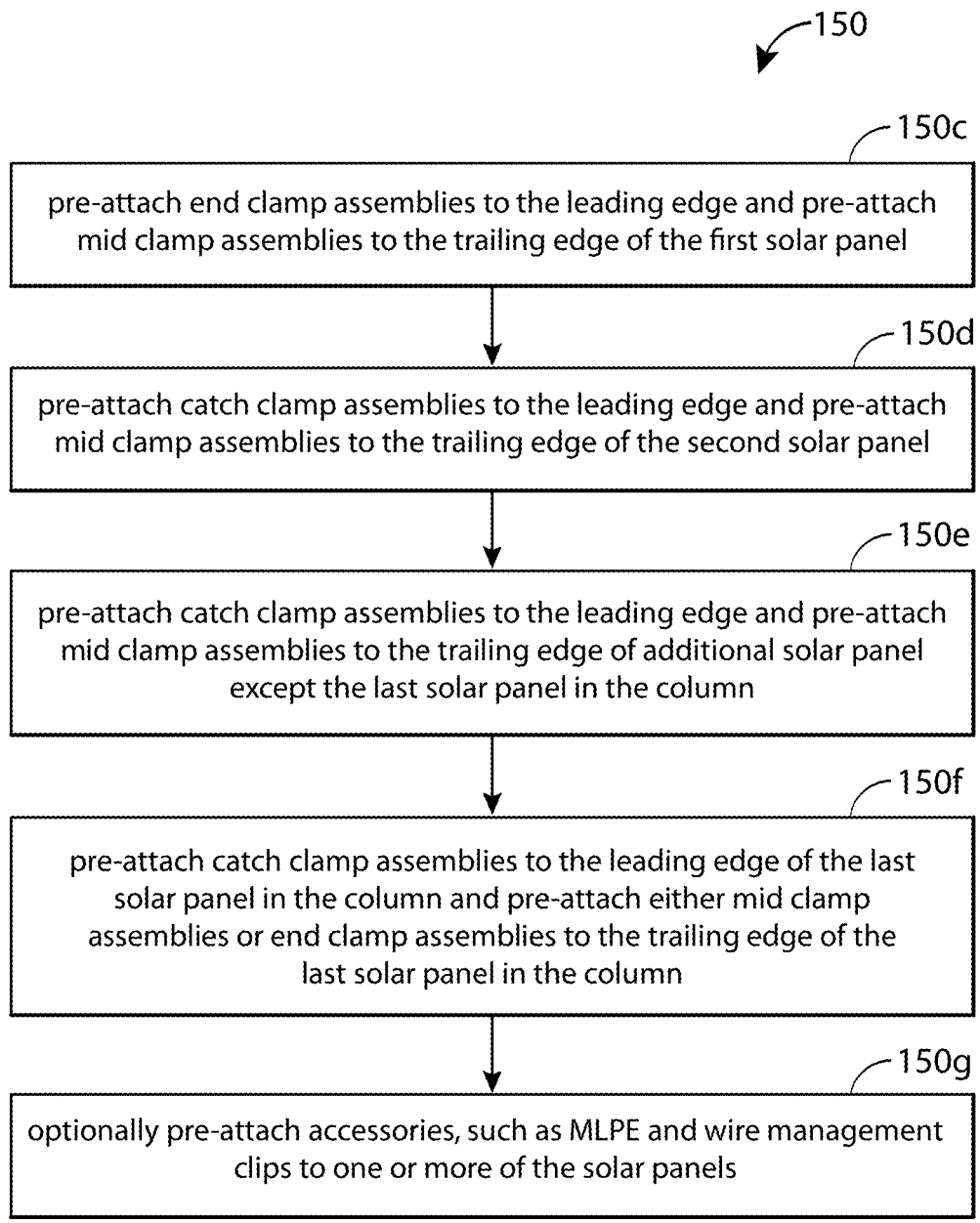
FIG. 11 illustrates a flow chart similar to FIG. 10 with the addition of pre-attaching accessories such as wire management clips or module level power electronics.

The installer can optionally pre-attach accessories such as an MLPE or one or more wire management clips to the solar panel frame. FIG. 11 depicts an alternative version of step 150 from FIG. 9, where in step 150g, the installer can optionally pre-attach accessories such as an MLPE or wire management clips to one or more of the solar panels. The other steps in FIG. 11, step 150c, step 150d, step 150e, and step 150f remain as described in FIG. 10.

Figure 12:
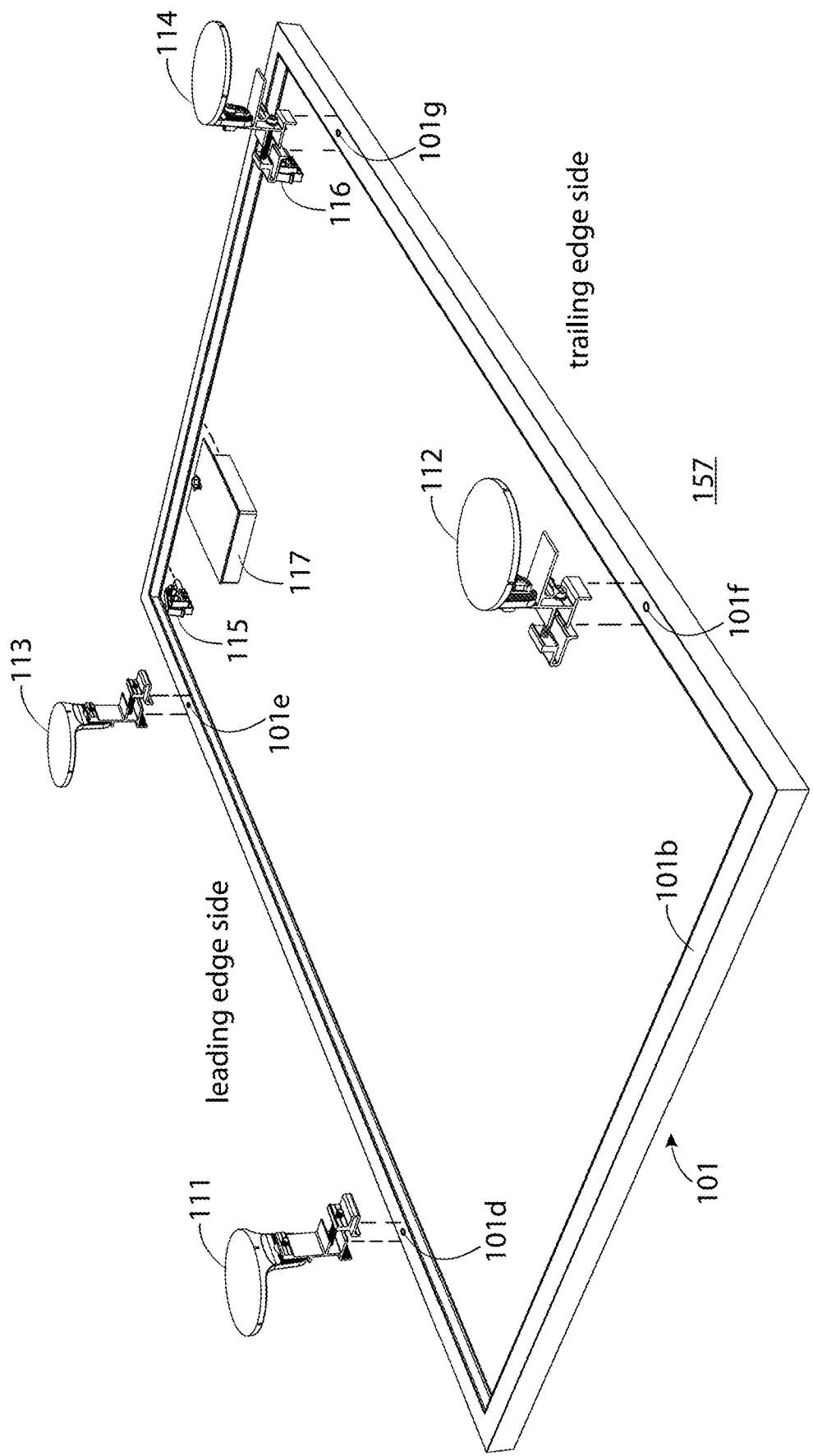
FIGS. 12 and 13 illustrates, in perspective view, a sequence for attaching solar panel clamp assemblies and accessories using the methods of FIGS. 10, 11, 22, and 32.
Figure 13:
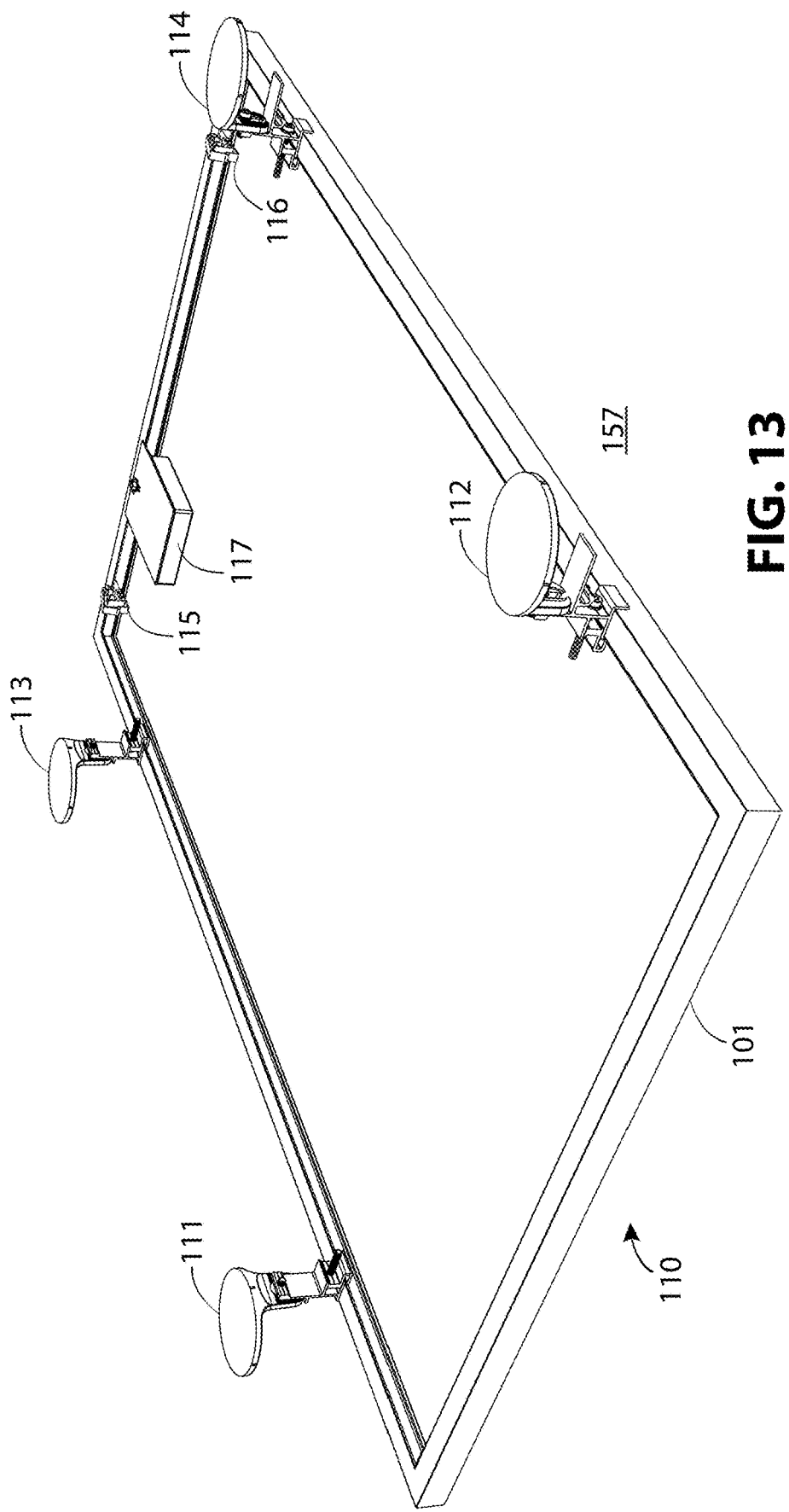

FIGS. 12 and 13 illustrate an example of step 150c of FIG. 10. FIG. 12, illustrates solar panel clamp assemblies attaching to the first solar panel 101. These solar panel assemblies include the end clamp assemblies 111, 113 and mid clamp assemblies 112, 114 attaching to the leading edge and trailing edge, respectively, of the return flange 101b of first solar panel 101. FIG. 13 illustrates the completed assembly, the first solar panel assembly 110, which includes the first solar panel 101, the end clamp assemblies 111, 113 and the mid clamp assemblies 112, 114. FIGS. 14 and 15 illustrate an example of step 150d of FIG. 10. In FIG. 14, the catch clamp assemblies 121, 123 are in the process of attaching to the leading edge of the second solar panel 102. Solar panel clamp assemblies, i.e., mid clamp assemblies 122, 124, are in the process of attaching to the trailing edge of the second solar panel 102. FIG. 15 shows the resulting completed assembly, second solar panel assembly 120, which includes the second solar panel 102, catch clamp assemblies 121, 123, and mid clamp assemblies 122, 124. FIGS. 16 and 17 illustrate an example of step 150f of FIG. 10. In FIG. 16, catch clamp assemblies 131, 133 are in the process of attaching to the leading edge of the last solar panel in the column, which in FIG. 16 is the third solar panel 103. Solar panel clamp assemblies, i.e., the end clamp assemblies 132, 134, are in the process of attaching to the trailing edge. FIG. 17, shows the resulting completed assembly, the third solar panel assembly 130. The third solar panel assembly 130 includes the third solar panel 103, the catch clamp assemblies 131, 133, and the end clamp assemblies 132, 134.

Figure 18:
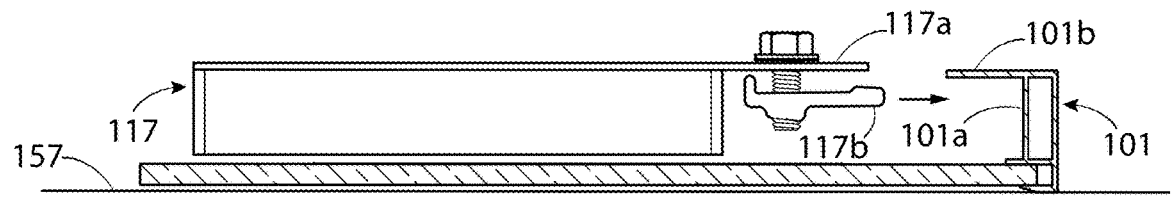
FIGS. 18 and 19 illustrate a sequence for attaching module-level power electronics to a solar panel resting face down on a work surface.
Figure 19:
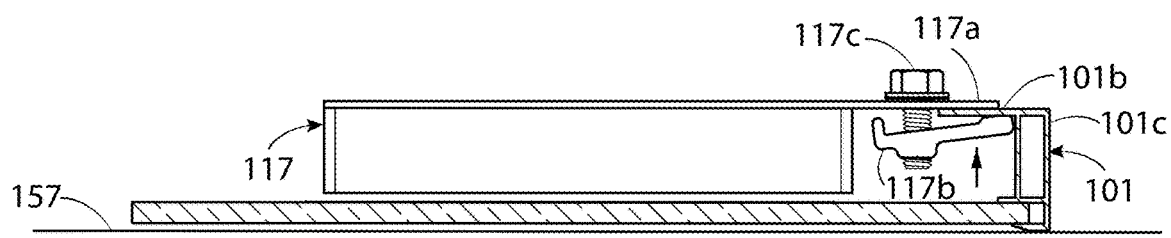
Figure 20:
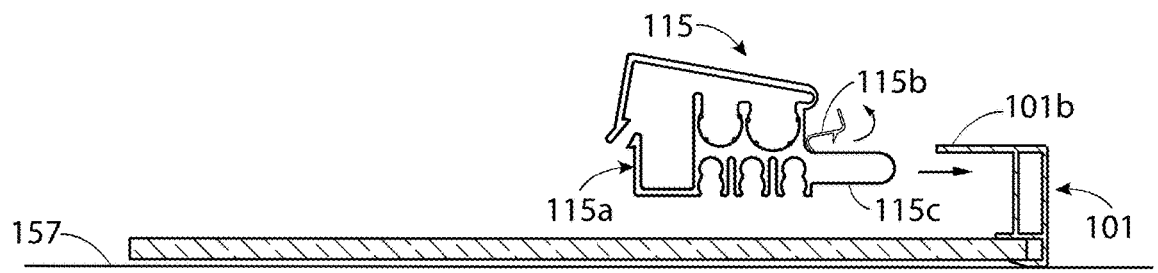
FIGS. 20 and 21 illustrate a sequence for attaching wire management clips to a solar panel resting face down on a work surface.
Figure 21:
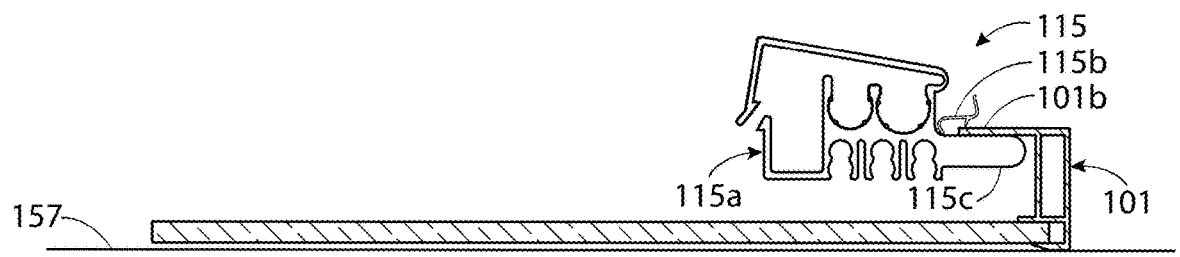

FIGS. 18-21 illustrate an example of step 150g in FIG. 11. In FIGS. 18 and 19, the MLPE 117 is attached to the return flange 101b and the solar panel frame 101c of the first solar panel 101. In FIGS. 20 and 21, a wire management clip 115 is attached to the return flange 101b of the first solar panel 101. In FIG. 18, the installer slides the mounting plate 117a of the MLPE 117 over the outside-facing surface of the return flange 101b. The installer slides the swivel clamp body jaw 117b under the inside-facing surface of the return flange 101b. The installer may optionally rotate the swivel clamp body jaw 117b. In FIG. 19, with the return flange 101b positioned between the swivel clamp body jaw 117b and the mounting plate 117a, the installer tightens the threaded fastener 117c to secure the MLPE 117 to the first solar panel 101.

Referring to FIGS. 20 and 21, the wire management clip 115, as illustrated, includes a wire clip body 115a and a spring clip 115b. In FIG. 20 the installer pulls back the spring clip 115b and slides it over the outside face of the return flange 101b, while sliding the panel retainer 115c under the inside-facing surface of the return flange 101b. In FIG. 21, the installer releases the spring clip 115b, which clamps the panel retainer 115c to the return flange 101b. FIGS. 12 and 13 also illustrate the process of attaching the wire management clips 115, 116, and the MLPE 117. FIGS. 14 and 15 show the process of attaching wire management clips 125, 126, and the MLPE 127. FIGS. 16 and 17 show the process of attaching the wire management clips 135, 136, and the MLPE 137.

Figure 22:
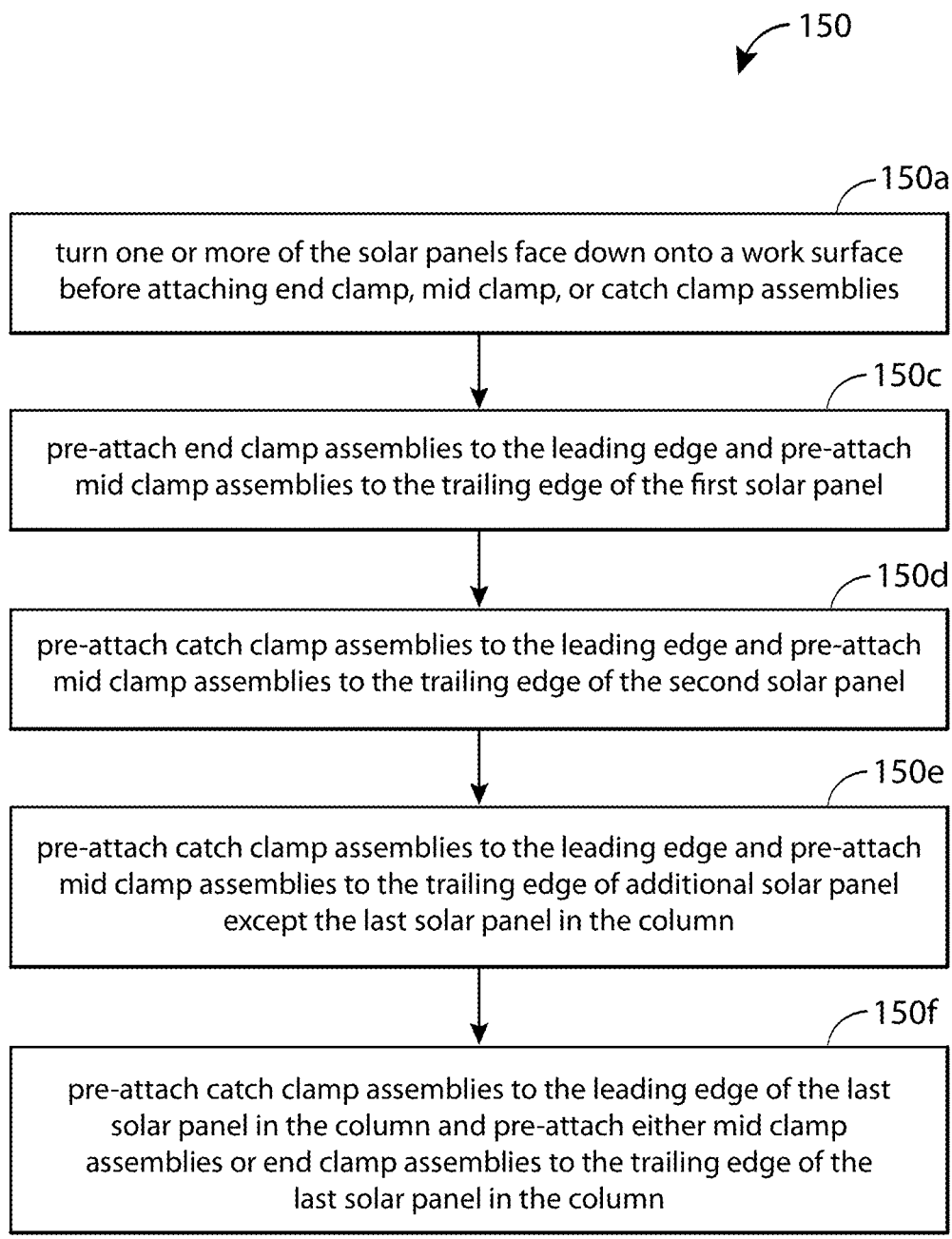
FIG. 22 illustrates a flow chart similar to FIG. 10 where the installer turns over or more of the solar panels face down onto a work surface before attaching end clamp, mid clamp, or catch clamp assemblies.
Figure 23:
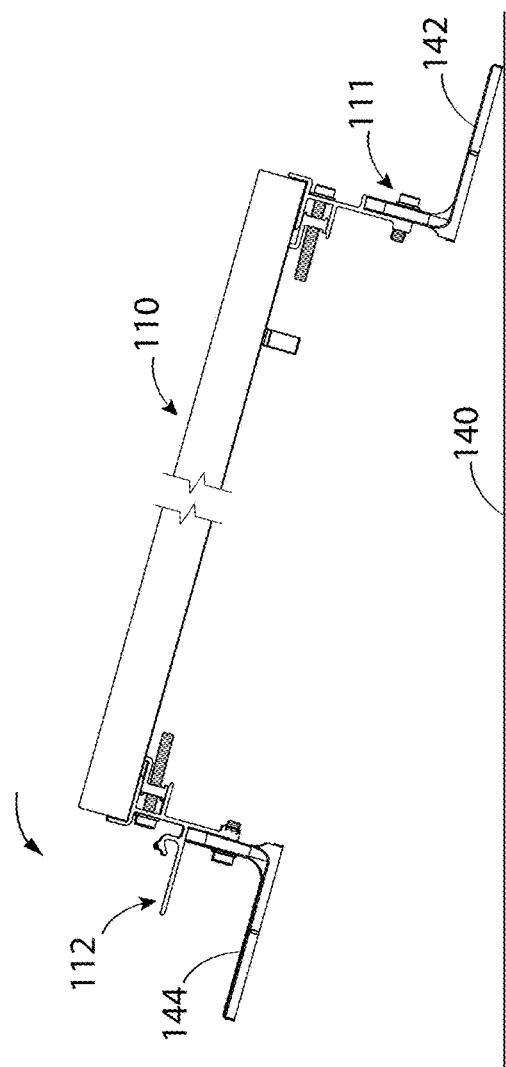
FIGS. 23 and 24 illustrates, in side view, a sequence for attaching a first solar panel assembly to a building structure.

The mid clamp, end clamp, catch clamp assemblies are structured to allow the installer to install them while the solar panels are face down or on their side. FIG. 22 shows an alternative version of step 150 of FIG. 9 with the addition of step 150a. The other steps of FIG. 22, step 150c, step 150d, step 150e, and step 150f are the same as in FIG. 10. Referring to FIG. 22, in step 150a, the installer places or turns the solar panels face down and rests the front of the solar panel onto a work surface before installing the end clamp, mid clamp, and catch clamp assemblies. As an example, the first solar panel 101 in FIGS. 12 and 13, the second solar panel 102 in FIGS. 14 and 15, and the third solar panel 103, in FIGS. 16 and 17, are positioned face down against a work surface 157 at the job site. The first solar panel 101 in FIGS. 18-21 are positioned face down against the work surface 157 at the job site. The work surface 157 can be the ground, a work bench, or the building or roof surface, for example roof 140 of FIG. 4.

Figure 24:
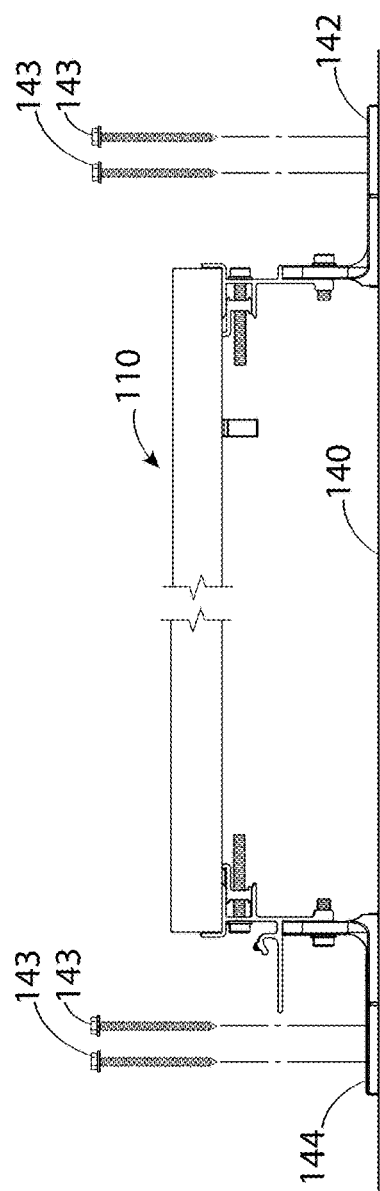

Referring to FIG. 9, in step 151, the installer places the first solar panel assembly on the building surface and secures it. An example of this illustrated in FIGS. 23 and 24. The installer places the L-foot 142 of an end clamp assembly 111 of the first solar panel assembly 110 on the roof 140. The first solar panel assembly 110 is then rotated to place the L-foot 144 of the mid clamp assembly 112 onto the roof 140. The installer could also place the panel straight down. The installer could slide it into place. In FIG. 24, the installer secures the first solar panel assembly 110 to the roof 140 using multiple instances of threaded fastener 143 through the L-foot 142 and the L-foot 144.

Figure 25:
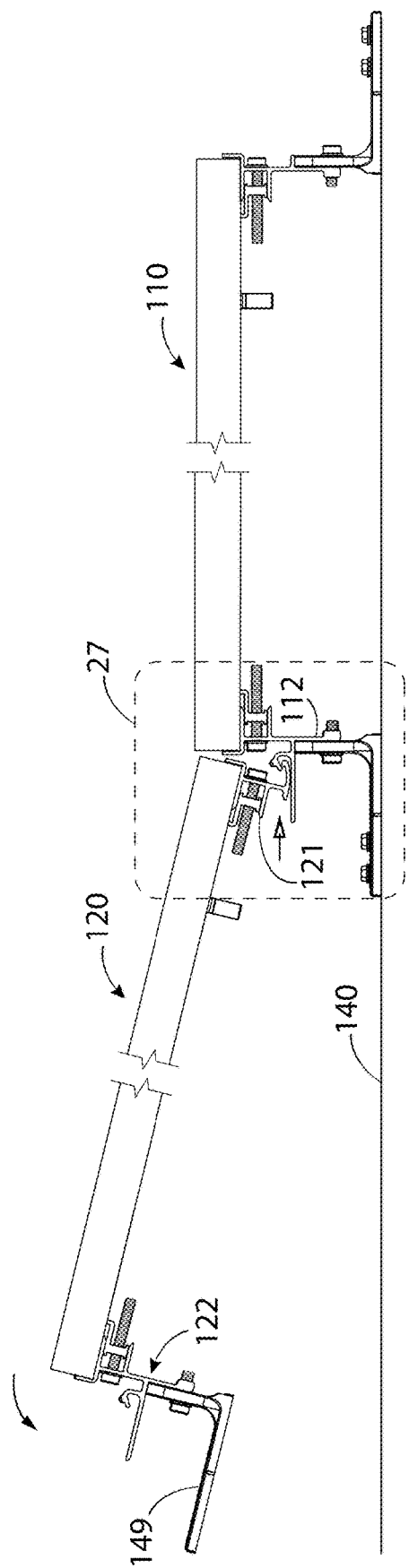
FIGS. 25 and 26 illustrate a sequence of attaching a second solar panel assembly to the first solar panel assembly and to the building structure.
Figure 26:
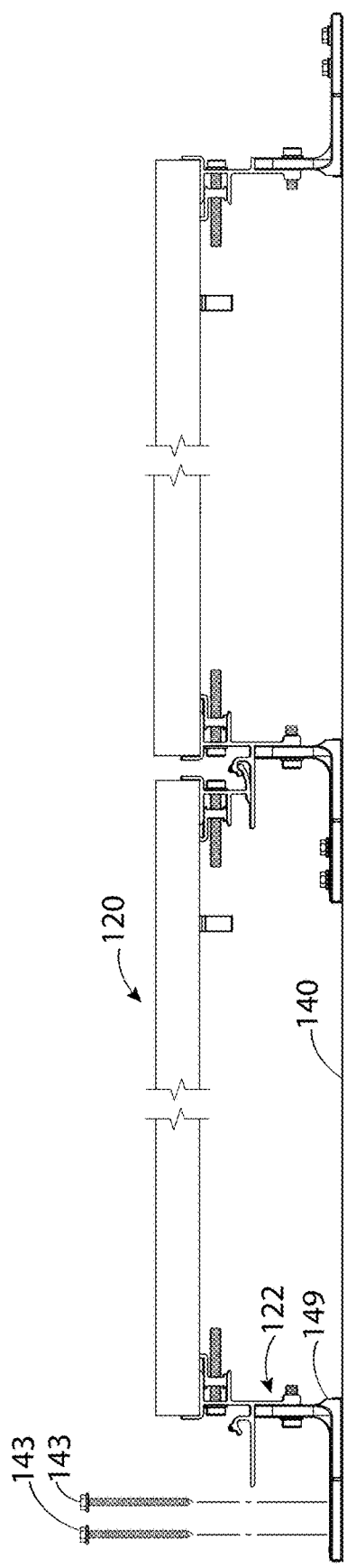
Figure 27:
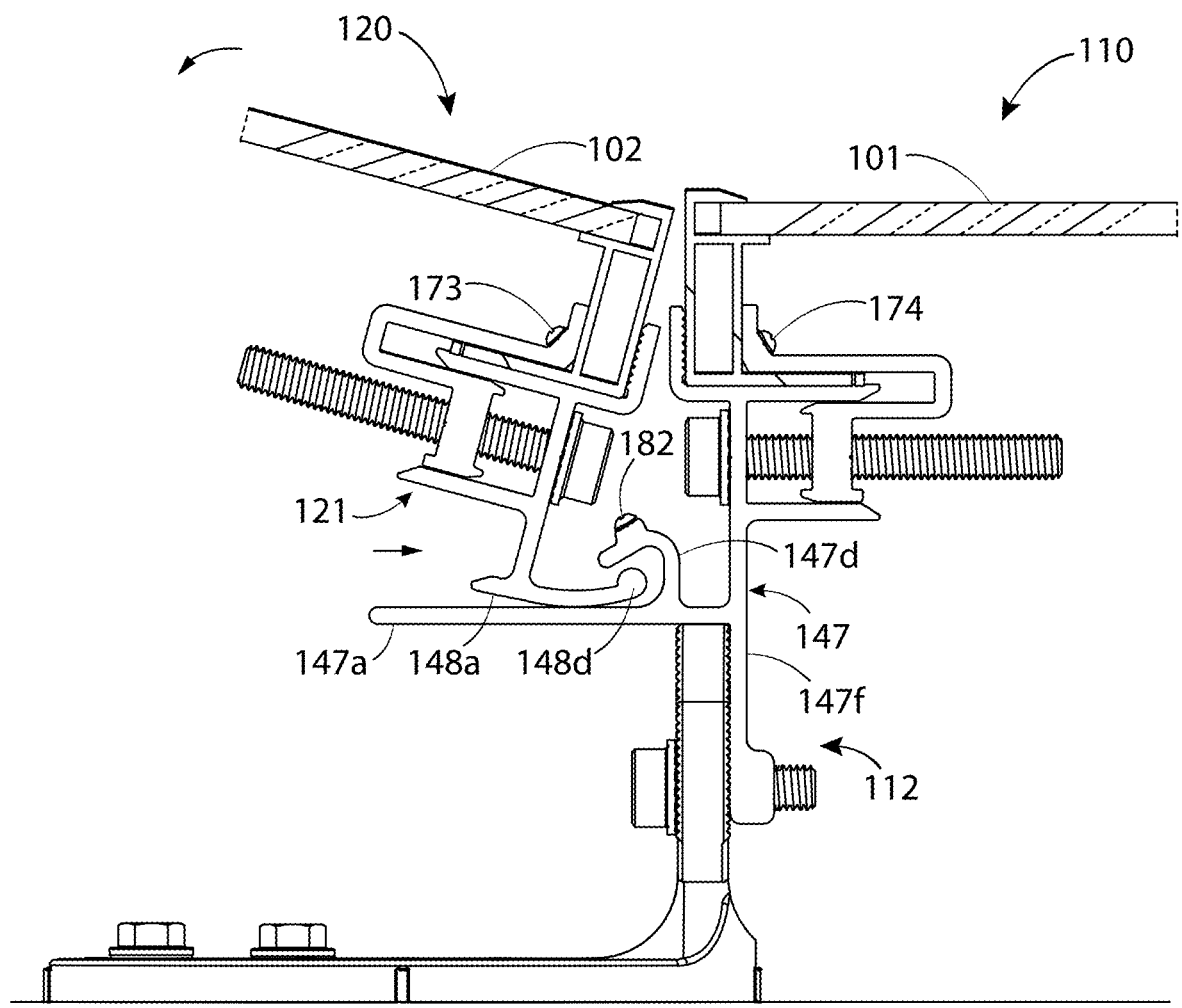
FIG. 27 illustrates an enlarged view of part of FIG. 25, showing the catch clamp assembly attaching to the solar panel mid clamp assembly.

Referring to FIG. 9, in step 152, the installer secures the second solar panel assembly to the first solar panel assembly. The installer does this by engaging the catch clamp assemblies on the leading edge of the second solar panel assembly with correspondingly-positioned mid clamp assemblies on the trailing edge of the first solar panel assembly. This is shown, by example in FIGS. 25 and 27. In FIG. 25, with the first solar panel assembly 110 attached to the roof 140, the installer engages the catch clamp assembly 121 of the second solar panel assembly 120 with the mid clamp assembly 112 of the first solar panel assembly 110. The installer then pivots the second solar panel assembly 120 until the L-foot 149 of the mid clamp assembly 122 rests against the roof 140. Referring to FIG. 27, the open end 148*d* of the hook arm 148*a* of the catch clamp assembly 121 engages the hook receiver 147*d* of the mid clamp bracket 147 of the mid clamp assembly 112. At the same time the bottom of the hook arm 148*a*, acting as a seating platform pivots against the panel hook platform 147*a* of the mid clamp bracket 147 because of its generally curved-shaped seating surface. Here, the generally curve-shaped seating surface includes a downward-facing generally convex shape. The open end 148*d* is illustrated as a ball hook catch. The hook receiver 147*d*, as illustrated, includes a generally concave-shaped interior and is so shaped to create a rotational stop for the open end 148*d*. For example, the end portion of the hook receiver is angled sufficiently at an acute angle to prevent the open end 148*d* and hook arm from rotating further counter-clockwise. The hook receiver 147*d* includes an end portion extending toward the panel hook platform 147*a*. The hook arm 148*a*, the open end 148*d*, and the hook receiver 147*d* could, as an alternative, be structured as a tongue and groove, a tab and slot, or a hook and slot. For example, a slot-shaped opening in the pedestal 147*f* could replace the hook receiver 147*d*. The open end 148*d* could be shaped for the slot-shaped opening to capture and retain it. For example, the open end 148*d* could be shaped like a tab or a hook.

Bonding screws help create electrical continuity between the solar panel frames and the racking system. For example, in FIG. 27, the sharp tip of threaded fastener 173 electrically bonds the catch clamp assembly 121 to the second solar panel 102. The sharp tip of threaded fastener 174 electrically bonds the mid clamp assembly 112 to the first solar panel 101. The electrical bonding between the two solar panel assemblies, the first solar panel assembly 110 and the second solar panel assembly 120 is completed by threaded fastener 182. The sharp tip of threaded fastener 182, presses against the open end 148*d*, here as a ball hook catch, to electrically bond the catch clamp assembly 121 to the mid clamp assembly 112.

Referring to FIG. 9, in step 153, the installer then secures the mid clamp assembly on the trailing edge of the second solar panel to the building surface. As an example, in FIG. 26, with the mid clamp assembly 122 resting against the roof 140, the installer secures the L-foot 149 of the mid clamp assembly 122 using multiple instances of threaded fastener 143. The mid clamp assembly 122 is attached to the trailing edge of second solar panel assembly 120. Referring to FIG. 9, in step 154 and step 155, the installer repeats the procedure for the rest of the panels in that column of the solar panel array. In this example, the column is column 107 of solar panel array 100, illustrated in FIG. 1.

Figure 28:
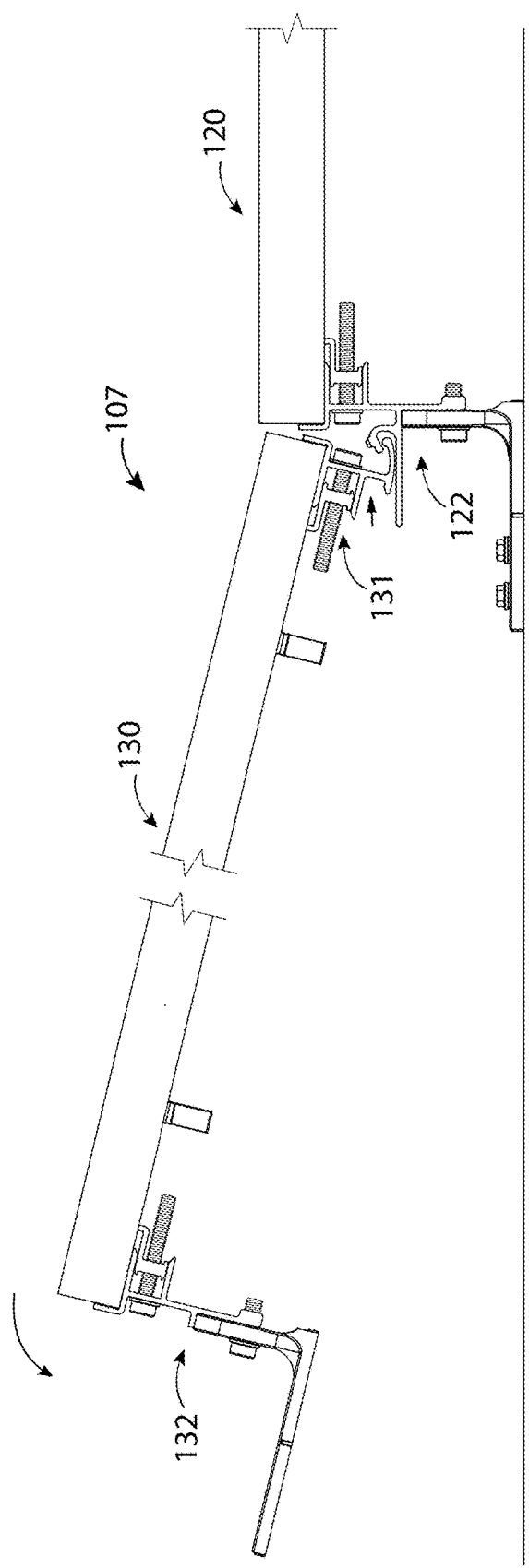
FIGS. 28 and 29 illustrate a sequence of attaching a third solar panel assembly to the second solar panel assembly and to the building structure.
Figure 29:
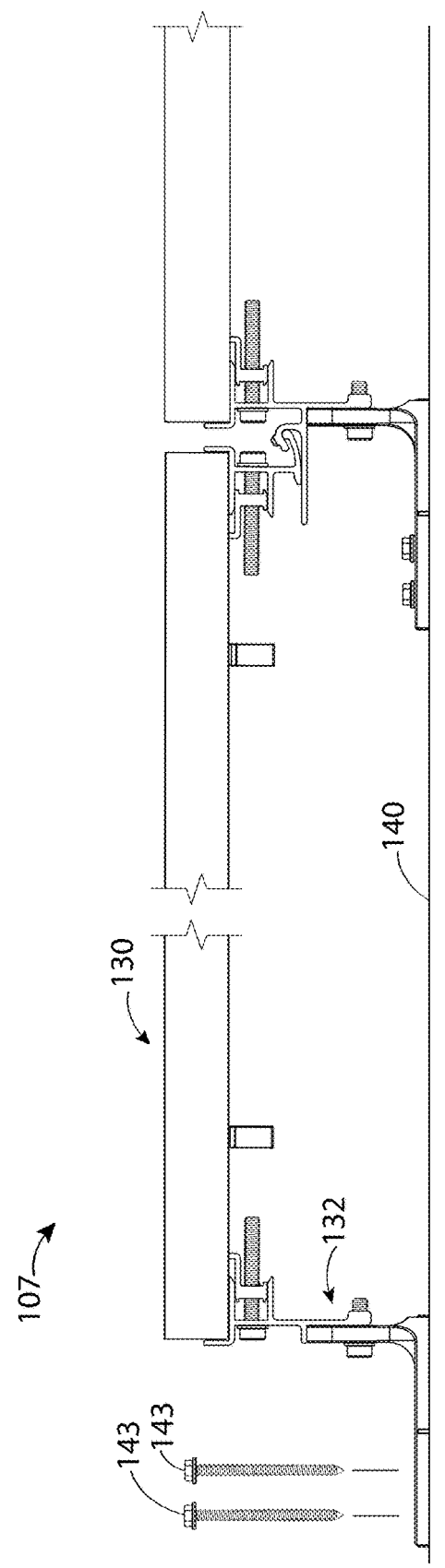

The last solar panel in the column can use mid clamp or end clamp assemblies on their trailing edge. As an example, in FIGS. 28 and 29, the last solar panel assembly in column 107, which in FIGS. 28 and 29 is the third solar panel assembly 130, has the end clamp assembly 132 on its trailing edge. In FIG. 28, the catch clamp assembly 131 engages the mid clamp assembly 122 of the second solar panel assembly 120. This is similar to what was described above for FIGS. 25 and 27. In FIG. 29, the end clamp assembly 132 is secured to the roof 140 by threaded fasteners; for example, by multiple instances of threaded fastener 143.

Figure 30:
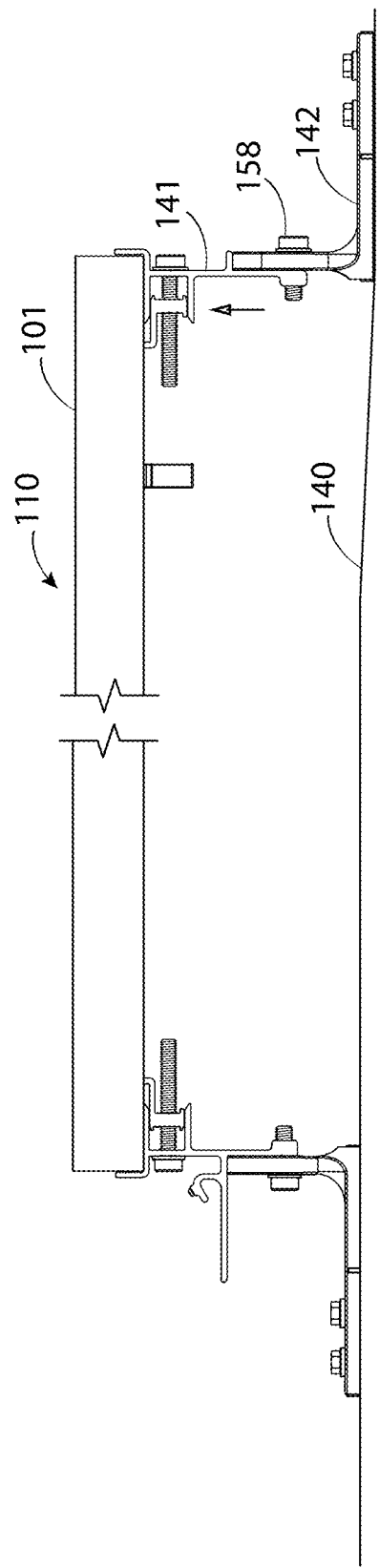
FIG. 30 illustrates, in side view, adjusting of the distance of the solar panel assembly from the building structure.

The end clamp and mid clamp assemblies can optionally be height adjusted to compensate for uneven building or roof surfaces. For example, FIG. 30 illustrates height adjustment for the first solar panel assembly 110. The same principle applies to the second and subsequent solar panel assemblies. With threaded fastener 158 loosened, the end clamp bracket assembly 141 can move relative to the L-foot 142, which causes the first solar panel 101 to move up and down in reference to the roof 140.

The following are some of the advantages of the methods discussed. First, the installer pre-attaches the mid clamp assemblies, end clamp assemblies, and catch clamp assemblies to the solar panels at the job site. The installer pre-attaches the solar panel clamp assemblies and catch clamp assemblies to the solar panels and then simply places the resulting solar panel assemblies on the roof or building surface. Solar panel assemblies within a column will naturally align with the previous solar panel assemblies. This eliminates complex pre-measurements required for typical rail-less systems where brackets are pre-attached to a roof and solar panels are then attached to the roof-attached brackets.

Second, because an installer can assemble the solar panel assemblies in columns, the installer can easily and quickly align subsequent columns to the previous column.

Third, the installer can attach the second and subsequent solar panel assemblies to their adjacent solar panel assembly without tools. The catch clamp assembly can engage the mid clamp assembly of the adjacent solar panel assembly by a catch and catch receiver. From FIG. 27, the catch can be the hook arm 148*a* with open end 148*d*. The catch receiver can be hook receiver 147*d*. In general, the catch and catch receiver can also be a hook and slot, tab and slot, tongue and groove, or similar mechanism. A seating platform extending from the catch clamp allows the installer to pivot the solar panel assembly while engaging the catch and catch receiver. The seating platform is a generally curved-shaped seating surface and can have a downward-facing generally convex shape.

Fourth, the installation of the solar panel clamp assemblies (i.e., the mid clamp and end clamp assemblies) can be carried out without positionally adjusting the them lengthwise or widthwise with respect to their respective solar panels.

Fifth, the installer can consistently position and align mid clamp assemblies, catch clamp assemblies, and end clamp assemblies along the solar panel frame without measurement. This saves time, labor, and measurement error. How this is achieved is discussed below.

Figure 31:
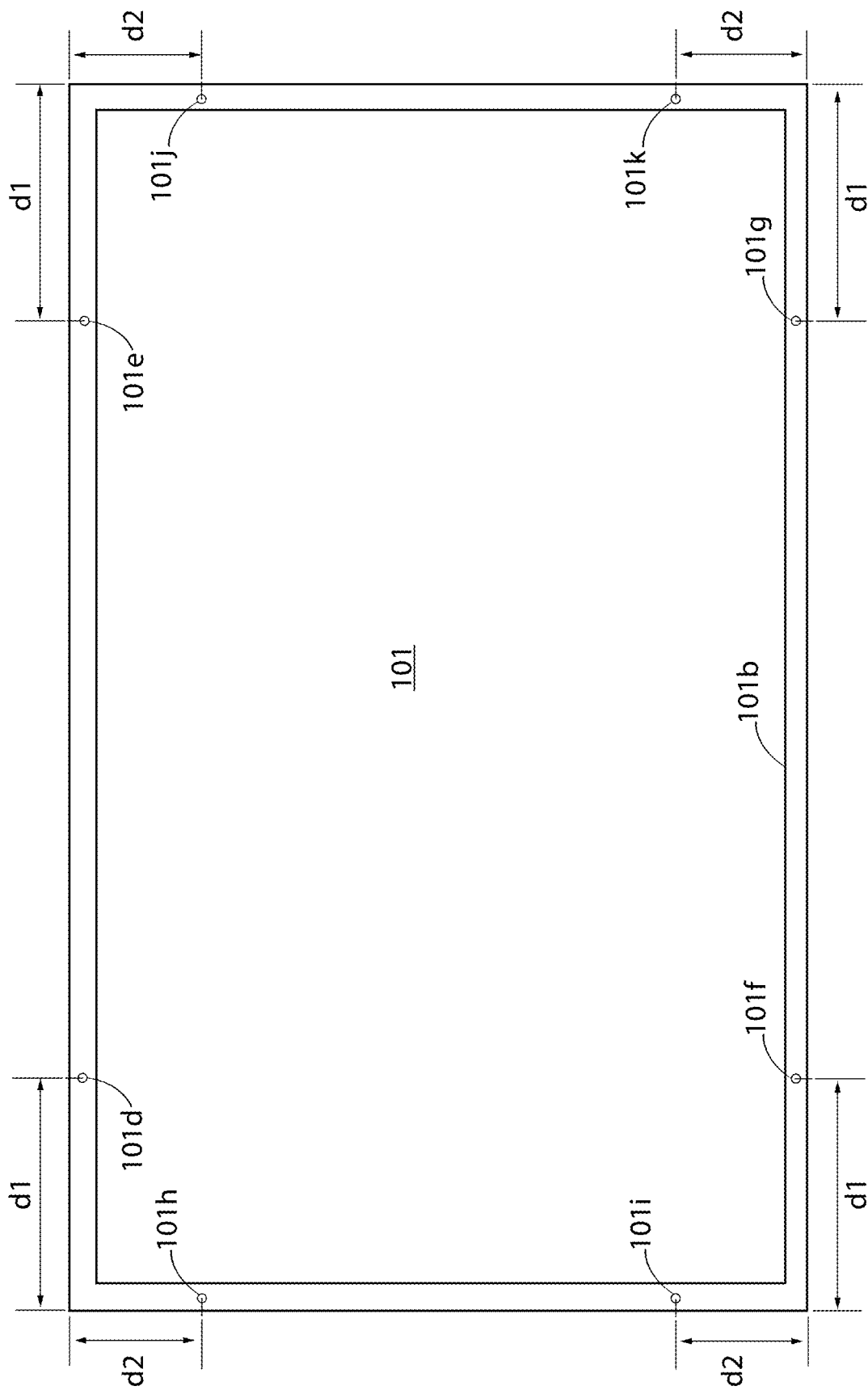
FIG. 31 illustrates a bottom view of the solar panel showing typical placement of mounting holes pre-drilled by the solar panel manufacturer.

Solar panel manufacturers generally place manufacturer-provided mounting holes along the lengthwise sections of the return flange of the solar panel frames. They optionally place manufacturer-provided mounting holes along the widthwise sections. The manufacturer-provided mounting holes are consistently positioned within the same solar panel manufacturer and model. For example, FIG. 31 illustrates the first solar panel 101. Manufacturer-provided mounting holes 101*d*, 101*e*, 101*f*, 101*g* are positioned along the lengthwise sections of the return flange 101*b* a distance d1 from their closest widthwise sides. Manufacturer-provided mounting holes 101*h*, 101*i*, 101*j*, 101*k* are positioned along the widthwise sections of the return flange 101*b* a distance d2 from their closest lengthwise sides. The inventor observed these manufacturer-provided mounting holes could align the solar panel clamp assemblies and catch clamp assemblies consistently within a solar panel array if the installer used the same solar panel manufacturer and model throughout the column. This has the advantage of allowing the installer to make sure that mid clamp assemblies align with catch clamp assemblies without measurement. This also assures that the installer can consistently position the mid clamp assemblies or end clamp assemblies mounted on the outside of the solar panel array.

Figure 32:
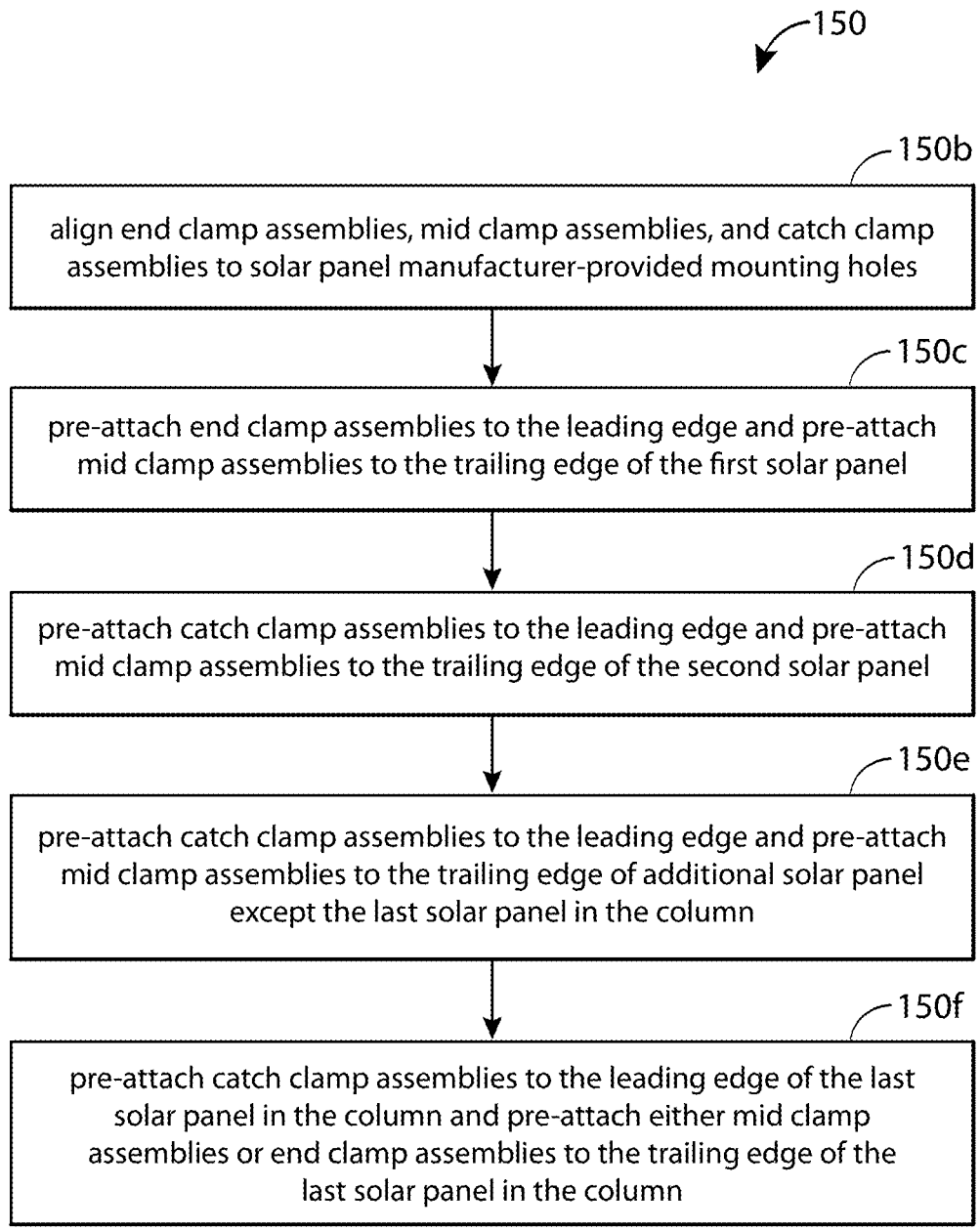
FIG. 32 illustrates a flow chart similar to FIG. 10 where the solar panel clamp assemblies are aligned to manufacturer-provided mounting holes before attachment to the solar panel.

FIG. 32, depicts an alternative version of step 150 from FIG. 9, where in step 150*b*, the installer can optionally align the end clamp, mid clamp, and catch clamp assemblies to the manufacturer-provided mounting holes in the return flange provided by solar panel manufacturer. The other steps, step 150*c*, step 150*d*, step 150*e*, and step 150*f* remain as described. FIG. 12 illustrates the end clamp assemblies 111, 113 and the mid clamp assemblies 112, 114, aligned to the manufacturer-provided mounting holes 101*d*, 101*e*, 101*f*, 101*g*, respectively. The manufacturer-provided mounting holes are positioned in the return flange 101*b*. FIG. 14 illustrates the catch clamp assemblies 121, 123 and the mid clamp assemblies 122, 124 aligned to the manufacturer-provided mounting holes 102*d*, 102*e*, 102*f*, 102*g*, respectively, positioned in the return flange 102*b*. FIG. 16 illustrates the catch clamp assemblies 131, 133 and the end clamp assemblies 132, 134 aligned to the mounting holes 103*d*, 103*e*, 103*f*, 103*g*, respectively, positioned in the return flange 103*b*.

FIGS. 33-37 and FIGS. 38-42 illustrate sequences of attaching an end clamp assembly and mid clamp assembly, respectively, to a solar panel resting face down on a work surface. FIGS. 43-46 and FIGS. 47-50 illustrate alternative sequences of attaching an end clamp assembly and a mid clamp assembly, respectively, to a solar panel resting face down on a work surface. FIGS. 51-53 illustrate an assembly sequence for attaching catch clamps to the second solar panel 102. In FIGS. 35-37, 40-42, 43-46, 47-50, and 51-53, the solar panels are shown resting face down against the work surface 157 at the job site.

Figure 33:
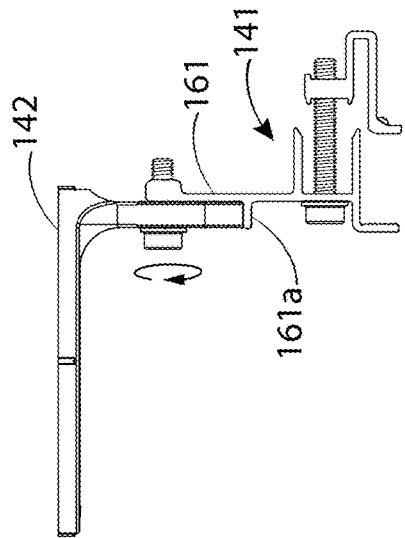
FIGS. 33-37 illustrate a sequence of attaching a solar panel end clamp assembly to a solar panel resting face down on a work surface.
Figure 34:
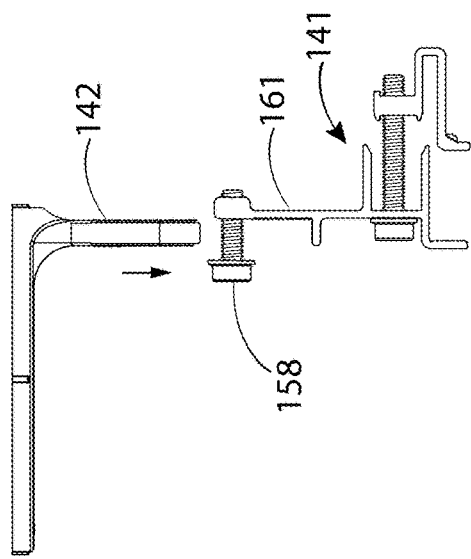
Figure 35:
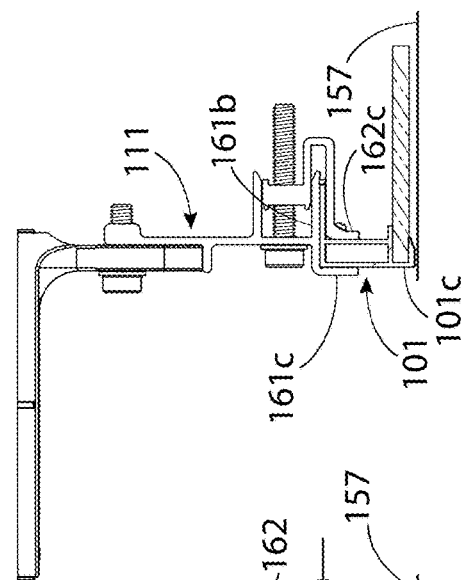
Figure 36:
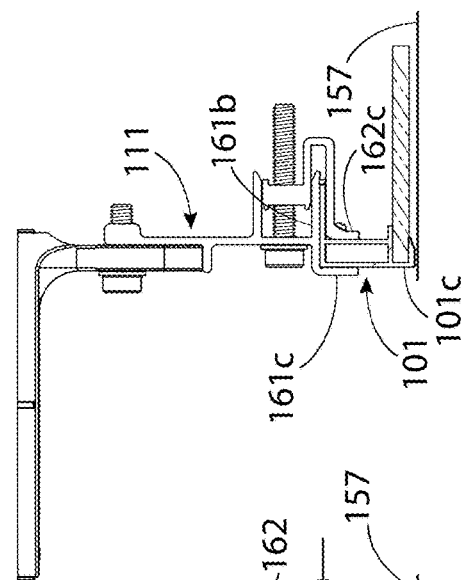
Figure 37:
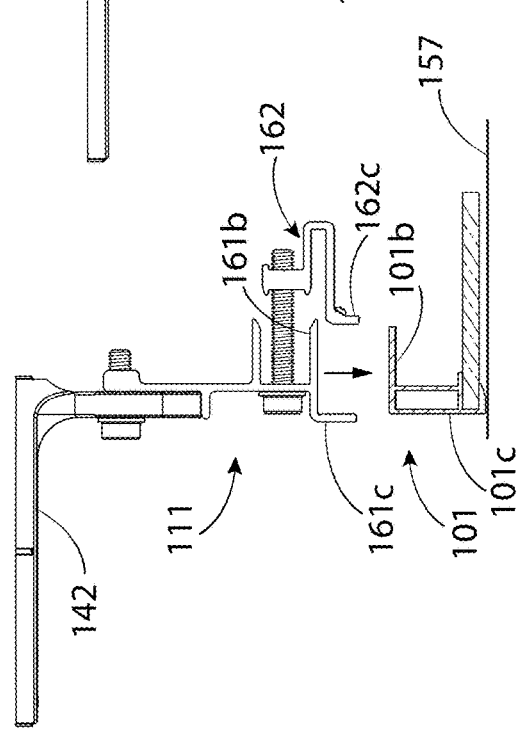

Now we will discuss the sequence of attaching the end clamp to the solar panel in FIGS. 33-37. Referring to FIGS. 35-37, in this example we depict attaching the end clamp assembly 111 to the first solar panel 101. In FIG. 33, the L-foot 142 is slid over the threaded fastener 158. The threaded fastener 158 is threadedly secured to the end clamp bracket 161 of the end clamp bracket assembly 141. Referring to FIG. 34, to assure consistent height between the end clamp and mid clamp assemblies without measurement, the top of the L-foot 142 can rest against the height-adjustment stop 161*a* of the end clamp bracket 161, before securing the L-foot 142 to the end clamp bracket assembly 141. In FIGS. 35 and 36, with the clamp jaw face 162*c* of the clamp jaw 162 positioned sufficiently away from the panel stop 161*c* to clear the return flange 101*b*, the installer positions the panel stop 161*c* against the outside face of the solar panel frame 101*c*. And the installer positions the solar panel platform 161*b* against the return flange 101*b*. With the panel stop 161*c* and the solar panel platform 161*b* in position, in FIG. 37, the installer tightens the clamp jaw face 162*c* against the inside face of the solar panel frame 101*c*.

Figure 38:
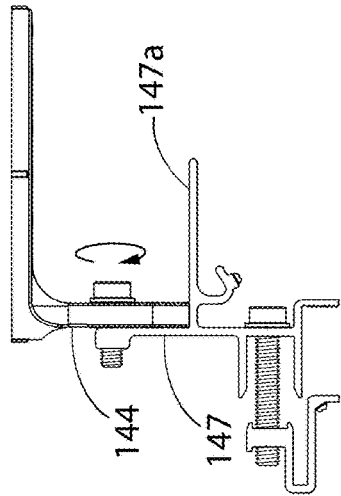
FIGS. 38-42 illustrate a sequence of attaching a solar panel mid clamp assembly to a solar panel resting face down on a work surface.
Figure 39:
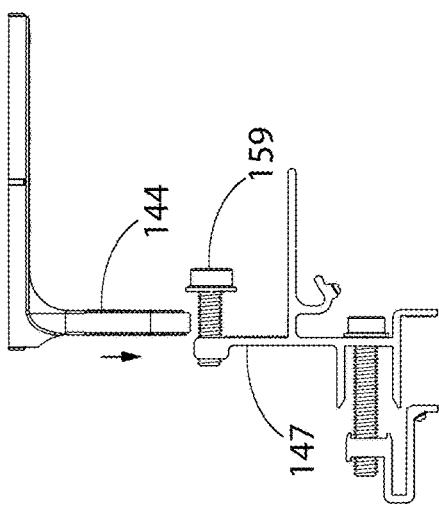
Figure 40:
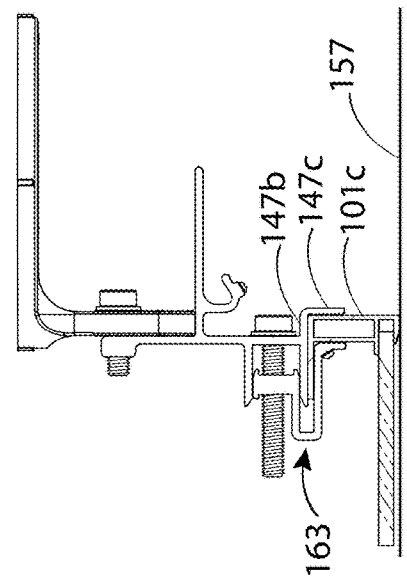
Figure 41:
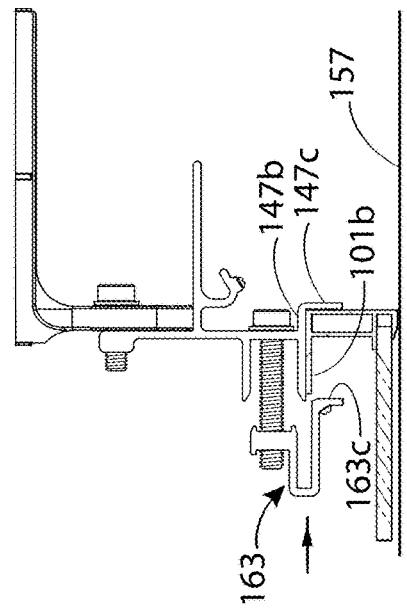
Figure 42:
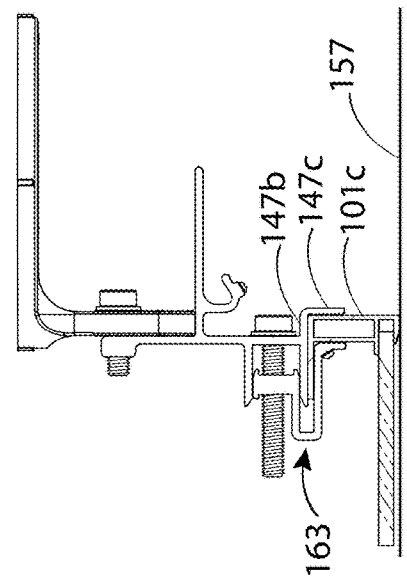

The sequence of attaching the mid clamps to the solar panel is similar to the sequence described in the last paragraph. In FIG. 38, the L-foot 144 is slid over the threaded fastener 159 secured to mid clamp bracket 147. Referring to FIG. 39, to assure consistent height between end clamp and mid clamp assemblies, the top of the L-foot 144 can rest against the bottom of the panel hook platform 147*a* before securing the L-foot 144 to the mid clamp bracket 147. In FIGS. 40 and 41, with the clamp jaw face 163*c* of the clamp jaw 163 positioned sufficiently away from the panel stop 147*c* to clear the return flange 101*b*, the installer positions the panel stop 147*c* against the outside face of the solar panel frame. And the installer positions the solar panel platform 147*b* against the return flange 101*b*. With the panel stop 147*c* and the solar panel platform 147*b* in position, in FIG. 42, the installer tightens the clamp jaw 163 against the inside face of the solar panel frame 101*c*.

The installer may opt to secure end clamp bracket assemblies to the solar panel before securing the L-feet. FIGS. 43-46 illustrates an example of this sequence. In FIGS. 43 and 44, with the clamp jaw face 162*c* positioned sufficiently away from the panel stop 161*c* to clear the return flange 101*b*, the installer positions the panel stop 161*c* against the outside face of the solar panel frame 101*c*. And the installer positions the solar panel platform 161*b* against the return flange 101*b*. With panel stop 161*c* and solar panel platform 161*b* in position, in FIG. 45, the installer tightens the clamp jaw 162 against the inside face of the solar panel frame 101*c* and slides the L-foot 142 over the threaded fastener 158 to the desired position. The L-foot 142 is slid against the height-adjustment stop 161*a*. In FIG. 46, the installer secures the L-foot 142 to the end clamp bracket assembly 141 by tightening the threaded fastener 158.

The sequence for the mid clamp, illustrated in FIGS. 47-50 is similar to what was described in the last paragraph. In FIGS. 47 and 48, with the clamp jaw face 163*c* positioned sufficiently away from the panel stop 147*c* to clear the return flange 101*b*, the installer positions the panel stop 147*c* against the outside face of the solar panel frame 101*c*. And the installer positions the solar panel platform 147*b* against the return flange 102*b*. With the panel stop 147*c* and the solar panel platform 147*b* in position, in FIG. 49, the installer tightens the clamp jaw 163 against the inside face of the solar panel frame 101*c*. The installer slides the L-foot 144 over the threaded fastener 159 to the desired position. Referring to FIG. 50, the L-foot 144 is slid against the bottom of the panel hook platform 147*a*. The installer secures the L-foot 144 to the mid clamp bracket 147 by tightening the threaded fastener 159.

The installer can pre-attach the catch clamp assemblies similarly to what was described directly above. FIGS. 51-53 illustrate an example of a sequence of pre-attaching the catch clamp assemblies to the second solar panel 102. In FIGS. 51 and 52, with the clamp jaw face 164*c* of the clamp jaw 164 positioned sufficiently away from the panel stop 148*c* to clear the return flange 102*b*, the installer positions the panel stop 148*c* against the outside face of the solar panel frame 102c. And the installer positions the solar panel platform 148b against the return flange 102b. With panel stop 148c and solar panel platform 148b in position, in FIG. 53, the installer tightens the clamp jaw 164 against the inside face of the solar panel frame 102c using the threaded fastener 165.

The installer can repeat the assembly process described above for other columns in the solar panel array. For example, column 108 of FIG. 1. The installer or reader can follow the same assembly procedure for assembling the columns in portrait-oriented solar panel arrays. This is another advantage of the described apparatus, devices, and methods.

After assembling the solar panel array, the installer can optionally install a skirt around the perimeter of the array. As discussed, FIGS. 1 and 7 show examples of solar panel arrays surrounded by skirt assemblies. We will use the solar panel array 100 of FIG. 1 for our example. With the solar panel array 100 secured to the roof, as in FIG. 2, FIGS. 54-56 show the sequence of attaching skirt bracket assemblies to the first solar panel 101. For simplicity, FIGS. 54-56 do not show the end clamps, mid clamps, and catch clamps. FIGS. 54-56 use the skirt bracket assembly 118 from FIG. 2. Referring to FIGS. 54 and 55, with the clamp jaw face 166c of the clamp jaw 166 positioned sufficiently away from the panel stop 167c of the skirt bracket 167 to clear the return flange 101b, the installer positions the panel stop 167c against the outside face of the solar panel frame 101c. And the installer positions the solar panel platform 167b against the return flange 101b. With the panel stop 167c and the solar panel platform 167b in position, in FIG. 56, the installer tightens the clamp jaw 166 against the inside face of the solar panel frame 101c using threaded fastener 168. The installer then repeats this sequence for both skirt bracket assemblies and skirt splice assemblies. Skirt bracket assemblies support skirt sections. Skirt splice assemblies support the ends of two adjacent skirt sections.

Figure 57:
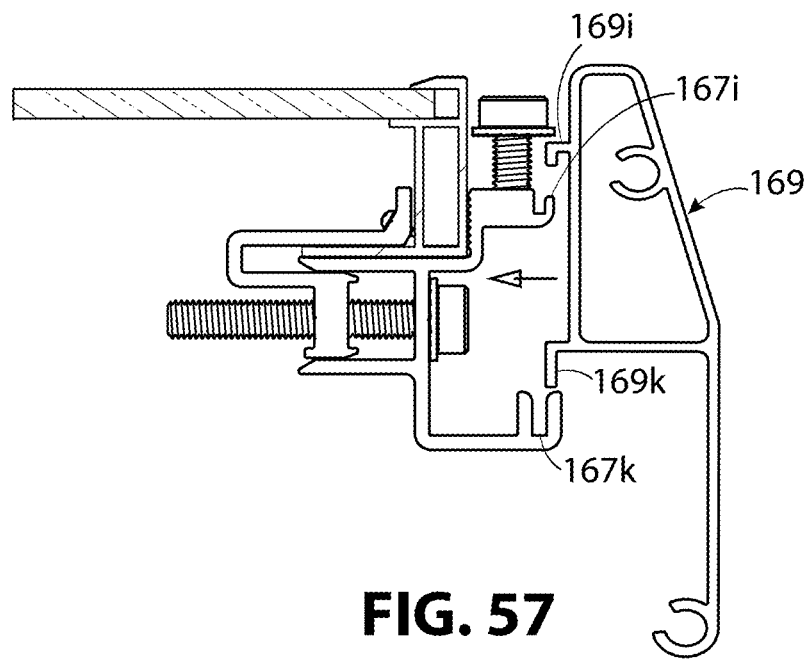
FIGS. 57 and 58 illustrate attaching a solar panel skirt to a skirt clamp and solar panel.
Figure 58:
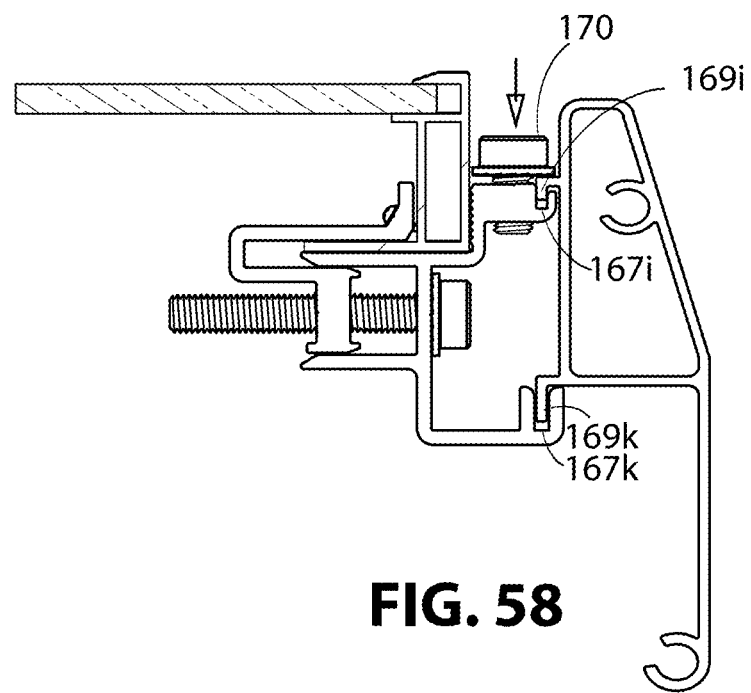

With the skirt bracket assemblies and skirt splice assemblies installed, the installer secures the skirt sections to skirt bracket and skirt splice assemblies. In FIG. 57, the installer positions a skirt section 169, so the upper tab 169i and the lower tab 169k of the skirt section 169 engage the upper slot 167i and the lower slot 167k, respectively, of the skirt bracket 167. In FIG. 58, the installer tightens a threaded fastener 170 to clamp the upper tab 169i to the upper slot 167i and to secure the lower tab 169k to the lower slot 167k.

Components

FIGS. 59-61, 62-64, 65-67, 68-70, and 71-73 discuss the catch clamp assembly 121, the mid clamp assembly 112, the end clamp assembly 111, the skirt splice assembly 119, and the skirt bracket assembly 118, respectively, from the previous examples in more detail. These assemblies, as illustrated, share a common clamping mechanism that includes a clamp jaw and a bracket: clamp jaw 164 and panel hook bracket 148, clamp jaw 163 and mid clamp bracket 147, clamp jaw 162 and end clamp bracket 161, clamp jaw 171 and skirt splice bracket 172, clamp jaw 166 and skirt bracket 167, in FIGS. 59-61, 62-64, 65-67, 68-70, and 71-73, respectively.

In the following two paragraphs, when components or elements are expressed as a list of five numbers, unless otherwise indicated, the first element in the list refers to FIGS. 59-61, the second element to FIGS. 62-64, the third element to FIGS. 65-67, the fourth element to FIGS. 68-70, and the fifth element to FIGS. 71-73. For example, clamp jaw 164, 163, 162, 171, 166 refers to clamp jaw 164 in FIGS. 59-61, clamp jaw 163 in FIGS. 62-64, clamp jaw 162 in FIGS. 65-67, clamp jaw 171 in FIGS. 68-70, and clamp jaw 166 in FIGS. 71-73.

The clamp jaw 164, 163, 162, 171, 166 includes a c-shaped portion that includes an upper arm 164a, 163a, 162a, 171a, 166a, a lower arm 164b, 163b, 162b, 171b, 166b, spaced apart by an elbow 164e, 163e, 162e, 171e, 166e. A clamp jaw face 164c, 163c, 162c, 171c, 166c projects upward from the end of the upper arm 164a, 163a, 162a, 171a, 166a. A clamp jaw base 164d, 163d, 162d, 171d, 166d projects downward from the end of the lower arm 164b, 163b, 162b, 171b, 166b. A threaded aperture 164f, 163f, 162f, 171f, 166f (FIGS. 59, 62, 65, 68, and 71, respectively), projects through the clamp jaw base 164d, 163d, 162d, 171d, 166d. A threaded fastener 173, 174, 175, 176, 177 with a sharp or sharpened tip, such as a self-tapping screw or a sheet metal screw, threadedly engages and projects through an aperture 164g, 163g, 162g, 171g, 166g (FIGS. 59, 62, 65, 68, and 71, respectively), in the end of the clamp jaw face 164c, 163c, 162c, 171c, 166c. Note that clamp jaw base 171d is hidden from view in FIG. 69.

Figure 59:
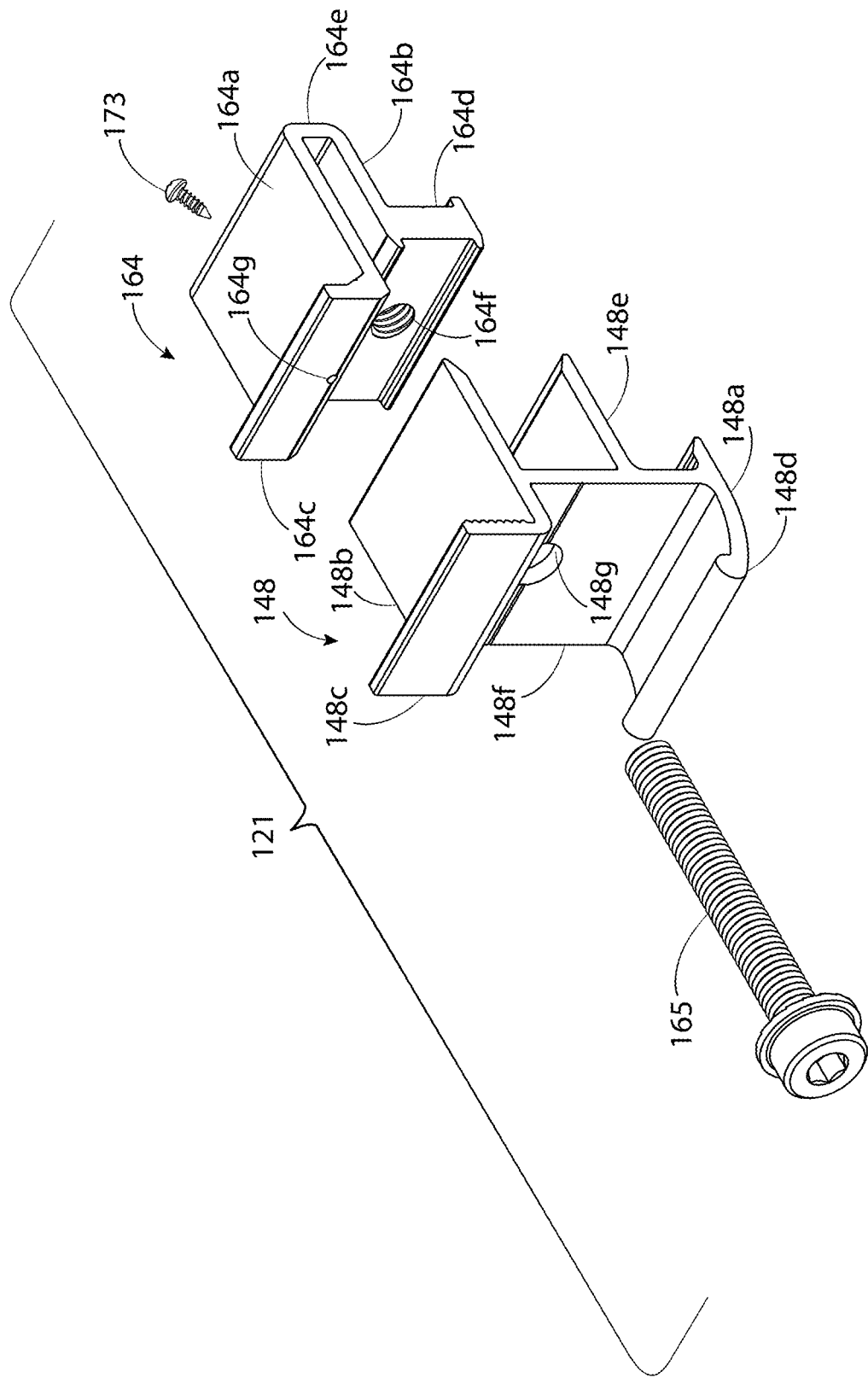
FIGS. 59, 60, and 61 illustrate in exploded isometric view, isometric view, and side view, respectively, of a catch clamp assembly.
Figure 60:
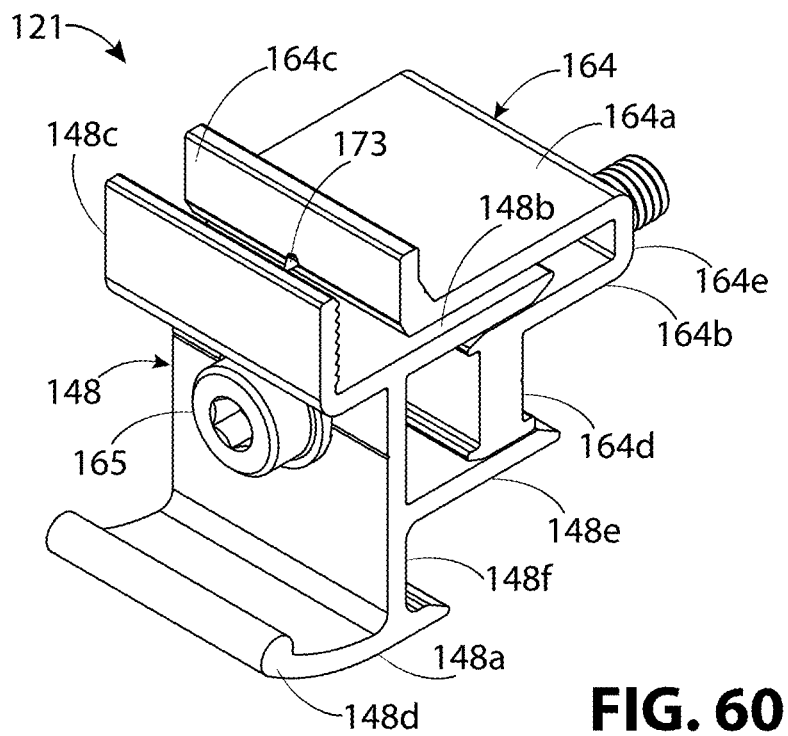
Figure 61:
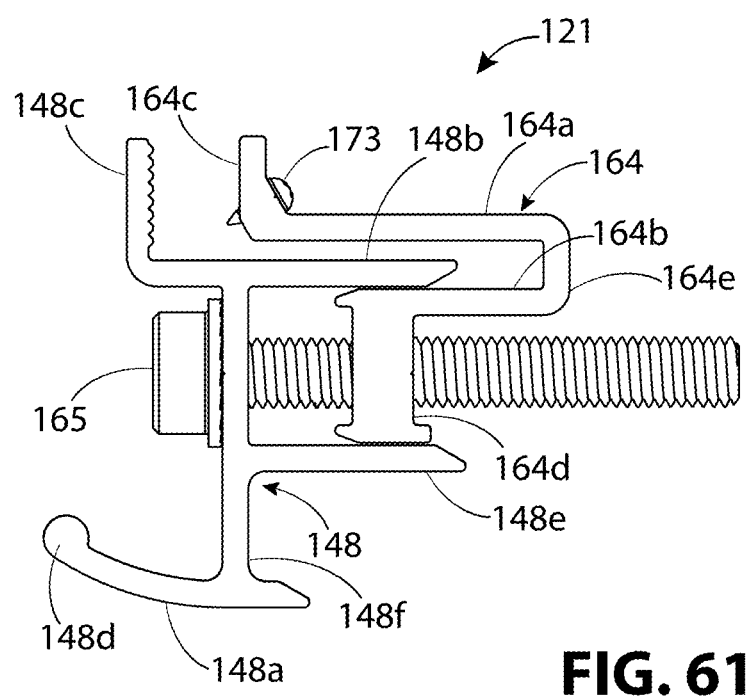

In FIGS. 59-61, the panel hook bracket 148 includes panel stop 148c, a solar panel platform 148b, a clamp jaw platform 148e, and a pedestal 148f. In FIGS. 62-64, the mid clamp bracket 147 includes panel stop 147c, a solar panel platform 147b, a clamp jaw platform 147e, and a pedestal 147f. In FIGS. 65-67, the end clamp bracket 161 includes panel stop 161c, a solar panel platform 161b, a clamp jaw platform 161e, and a pedestal 161f. In FIGS. 68-70, the skirt splice bracket 172 includes panel stop 172c, a solar panel platform 172b, a clamp jaw platform 172e, and a pedestal 172f. In FIGS. 71-73, the skirt bracket 167 includes panel stop 167c, a solar panel platform 167b, a clamp jaw platform 167e, and a pedestal 167f. The clamp jaw platform 148e, 147e, 161e, 172e, 167e projects away from the pedestal 148f, 147f, 161f, 172f, 167f. The pedestal 148f, 147f, 161f, 172f, 167f terminates into the solar panel platform 148b, 147b, 161b, 172b, 167b. The solar panel platform 148b, 147b, 161b, 172b, 167b forms the top of the pedestal 148f, 147f, 161f, 172f, 167f. The panel stop 148c, 147c, 161c, 172c, 167c projects upward from one end of the solar panel platform 148b, 147b, 161b, 172b, 167b. The clamp jaw face 164c, 163c, 162c, 171c, 166c is adjustably spaced apart from a panel stop 148c, 147c, 161c, 172c, 167c by a threaded fastener 165, 178, 179, 180, 181, that engages an aperture 148g, 147g, 161g, 172g, 167g (FIGS. 59, 62, 65, 68, and 71, respectively) in the pedestal 148f, 147f, 161f, 172f, 167f and threadedly engages a threaded aperture 164f, 163f, 162f, 171f, 166f (FIGS. 59, 62, 65, 69, and 71) in the clamp jaw base 164d, 163d, 162d, 171d, 166d. As the threaded fastener 165, 178, 179, 180, 181 is tightened or loosened, the clamp jaw base 164d, 163d, 162d, 171d, 166d moves between the solar panel platform 148b, 147b, 161b, 172b, 167b and the clamp jaw platform 148e, 147e, 161e, 172e, 167e, which changes the distance between the clamp jaw face 164c, 163c, 162c, 171c, 166c and the panel stop as the upper arm 164a, 163a, 162a, 171a, 166a and lower arm 164b, 163b, 162b, 171b, 166b move along the solar panel platform 148b, 147b, 161b, 172b, 167b.

Referring to FIGS. 59-61, the catch clamp assembly 121 includes a seating platform structured as a hook arm 148a with an open end 148d and a generally curve-shaped seating surface. The hook arm 148a is shown as a downward-facing generally convex shape. This downward-facing generally convex shape allows the hook arm 148a to pivot against the panel hook platform 147a (FIGS. 62-64). In FIGS. 59-61, the hook arm 148a extends from the bottom of the pedestal 147f. As discussed, the open end 148d is illustrated as a ball hook catch. The open end 148d can be other shapes that pair with a corresponding shape on the mid clamp assembly to create a catch and catch receiver pair. Examples of catch and catch receiver pairs include a hook and hook receiver, a hook and slot, a tab and slot, or a tongue and groove pair.

Figure 62:
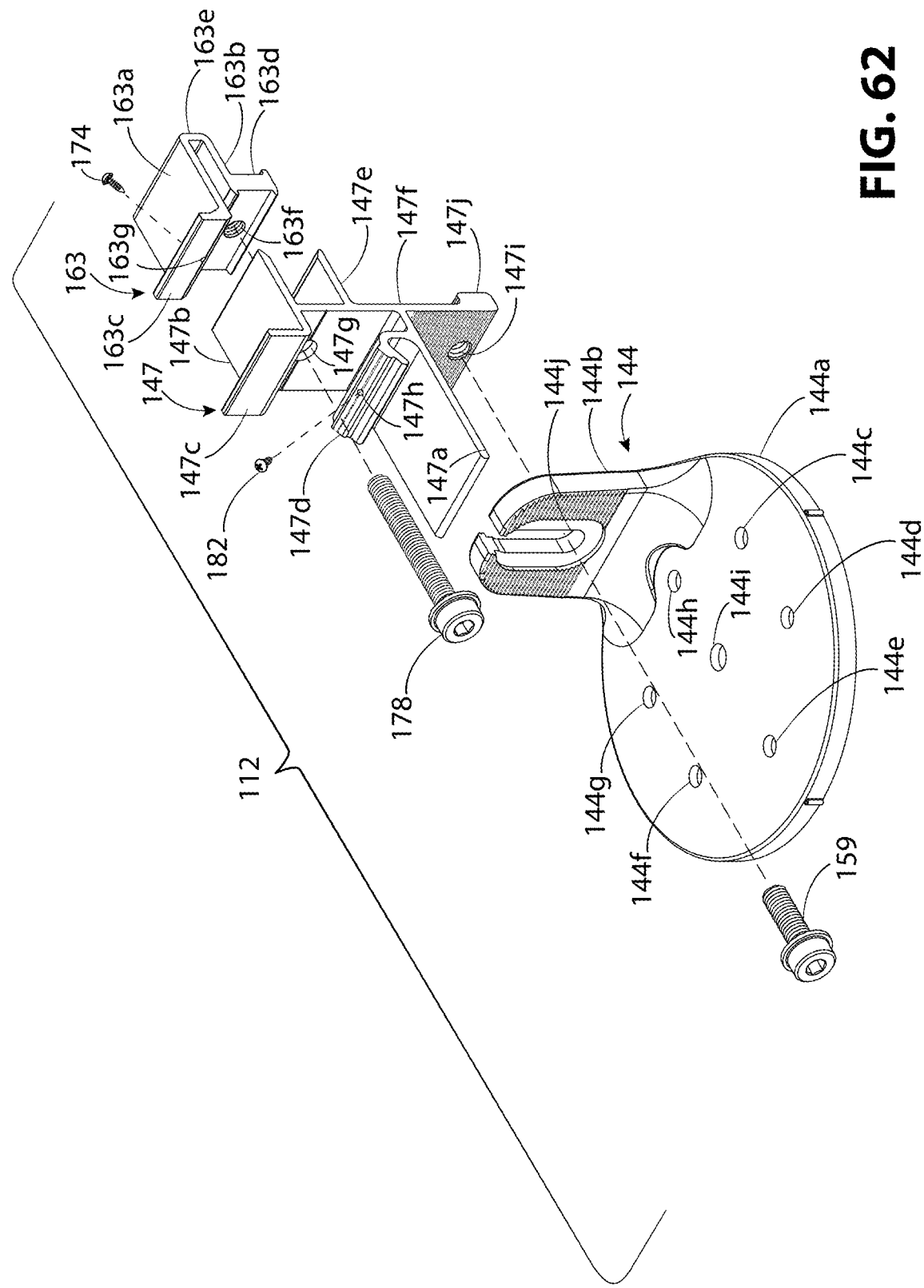
FIGS. 62, 63, and 64 illustrate in exploded isometric view, isometric view, and side view, respectively, of a solar panel mid clamp assembly.
Figure 63:
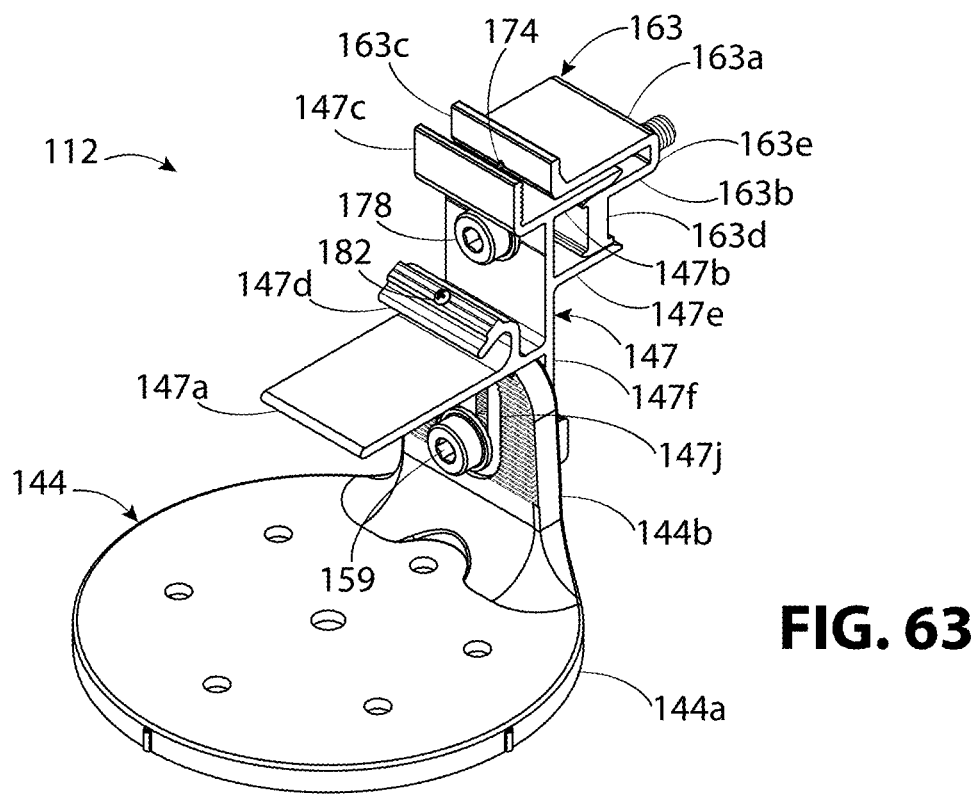
Figure 64:
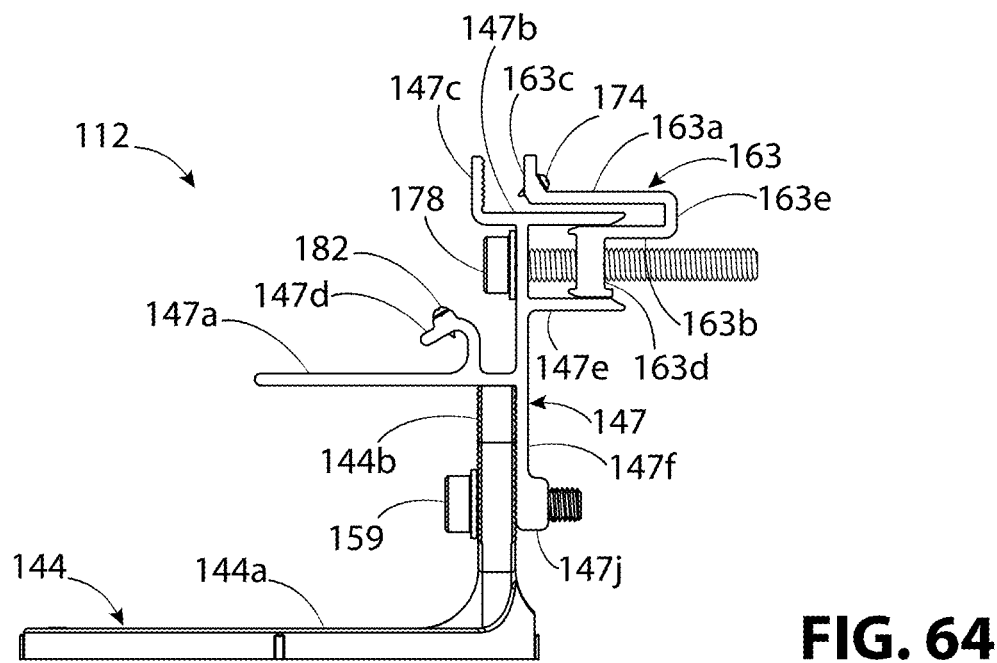

Referring to FIGS. 62-64, the panel hook platform 147a extends from the pedestal 147f below and in the opposite direction as the solar panel platform 147b. The hook receiver 147d extends from the panel hook platform 147a with its open end extending back toward the panel hook platform 147a to capture and secure the open end 148d, i.e., the ball hook catch, of the hook arm 148a from FIGS. 59-61. Threaded fastener 182 extends through aperture 147h (FIG. 62). The threaded fastener 182 includes a sharpened tip which lets it electrically bond with the open end 148d of the hook arm 148a from FIGS. 59-61.

Continuing to refer to FIGS. 62-64, the L-foot 144 supports the solar panel assembly on the building structure. The L-foot 144 includes an L-foot base 144a and an L-foot riser 144b. Referring to FIG. 62, the L-foot 144 includes one or more apertures, here shown as apertures 144c, 144d, 144e, 144f, 144g, 144h, 144i that allow threaded fasteners, such as lag bolts, or deck screws, to threadedly engage the building structure. Referring to FIGS. 62 and 63, the L-foot riser 144b includes a slot-shaped opening 144j that is open at the top to allow the L-foot 144 to slide over the threaded fastener 159. For example, in FIG. 49, we discussed an assembly sequence where the L-foot 144 is slid over the threaded fastener 159. Referring to FIG. 62, the threaded fastener 159 engages threaded aperture 147i in the mid clamp bracket 147. The threaded aperture 147i can optionally extend into an abutment 147j to extend the threading and improve holding strength. The threaded fastener 159 and the abutment 147j is also illustrated in FIG. 64.

Figure 65:
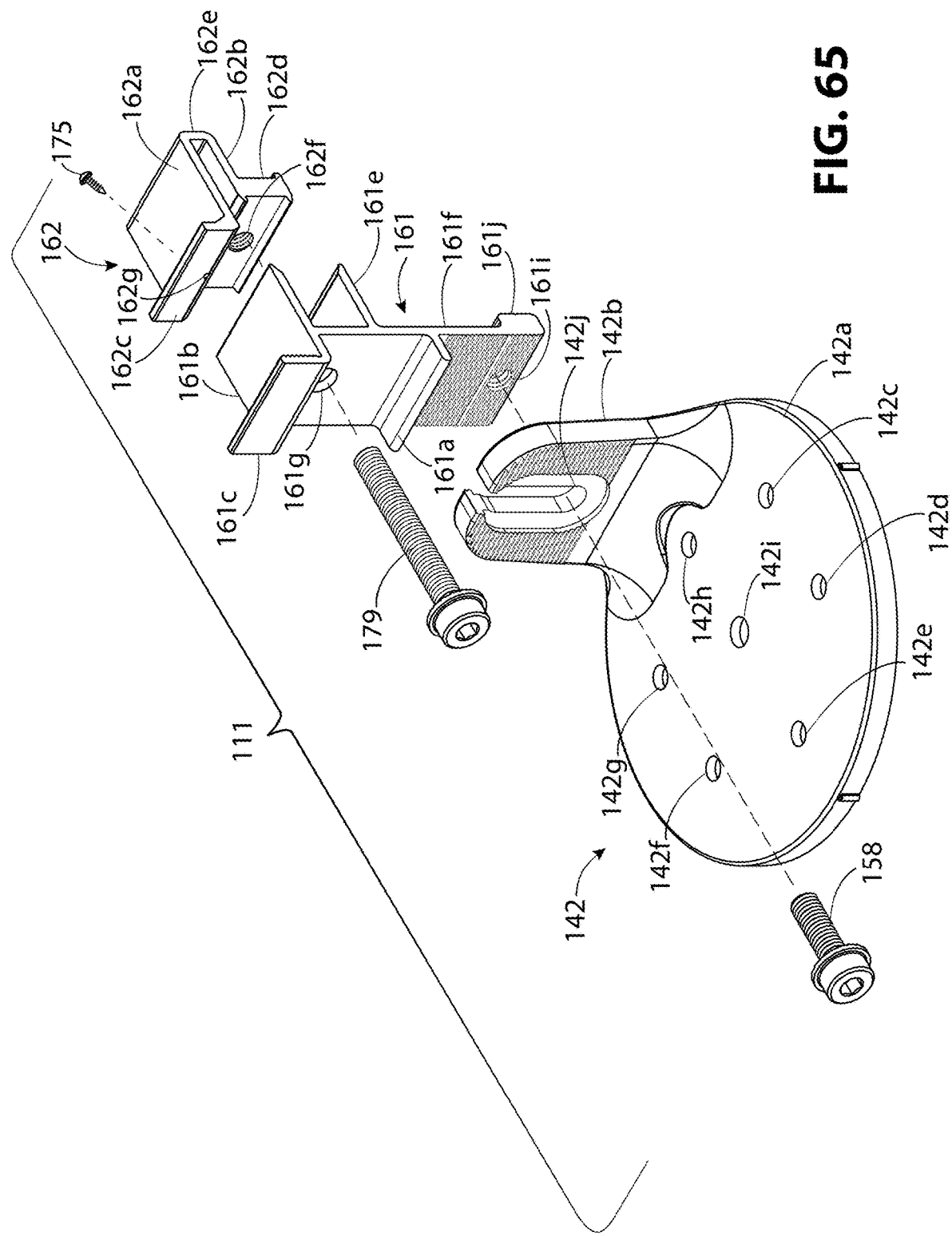
FIGS. 65, 66, and 67 illustrate in exploded isometric view, isometric view, and side view, respectively, of a solar panel end clamp assembly.
Figure 66:
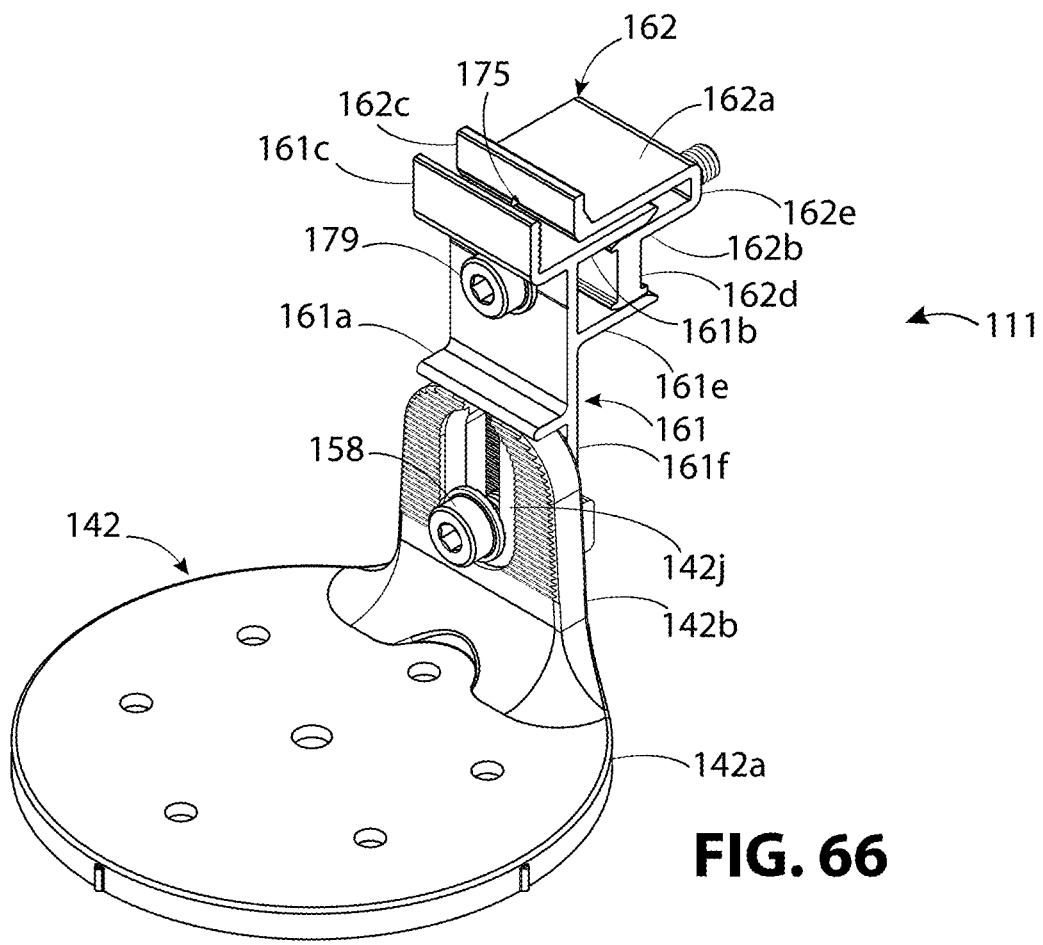
Figure 67:
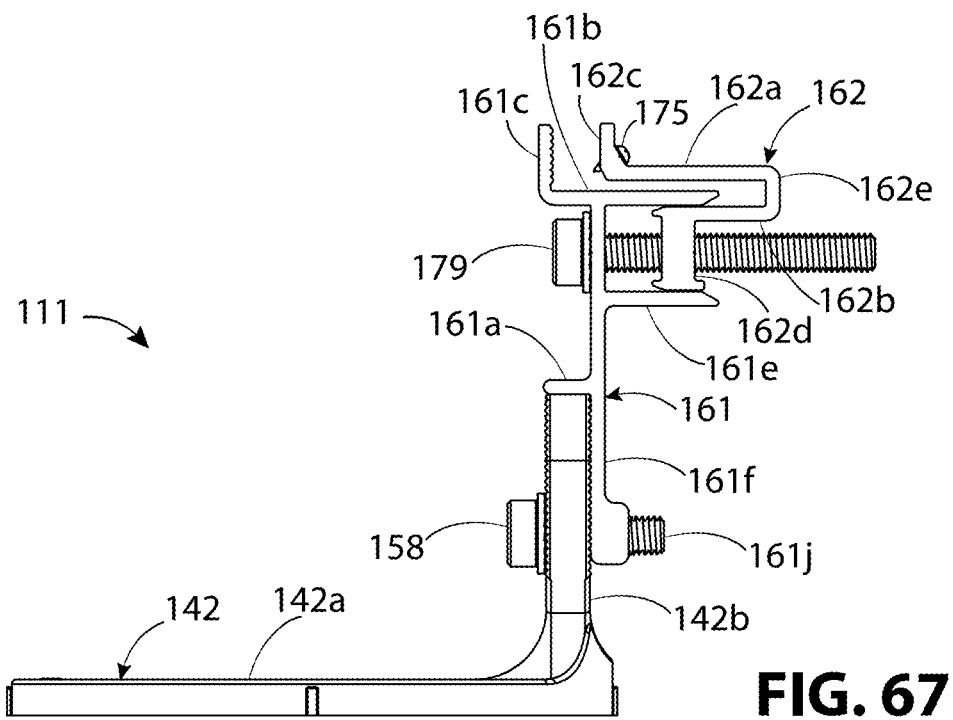

Referring to FIGS. 65-67, the height-adjustment stop 161a extends from the pedestal 161f below and in the opposite direction as the clamp jaw platform 161e. The L-foot 142 supports the solar panel assembly on the building structure. The L-foot 142 includes an L-foot base 142a and an L-foot riser 142b. Referring to FIG. 65, the L-foot 142 includes one or more apertures, here shown as apertures 142c, 142d, 142e, 142f, 142g, 142h, 142i that allow threaded fasteners, such as lag bolts, or deck screws, to threadedly engage the building structure. Referring to FIGS. 65 and 66, the L-foot riser 142b includes a slot-shaped opening 142j that is open at the top to allow the L-foot 142 to slide over the threaded fastener 158. For example, in FIG. 45, we discussed an assembly sequence where the L-foot 142 is slid over the threaded fastener 158. Referring to FIG. 65, the threaded fastener 158 engages threaded aperture 161i in the end clamp bracket 161. The threaded aperture 161i can optionally extend into an abutment 161j to extend the threading and improve holding strength. The threaded fastener 158 and the abutment 161j is also illustrated in FIG. 67.

Referring to FIGS. 68-70, and 71-73, the skirt splice assembly 119 and skirt bracket assembly 118, respectively, include similar structures. Comparing the two, the splice skirt clamp is longer widthwise and has two clamping fasteners instead of one to secure the ends of two skirt sections to the solar panel.

Figure 68:
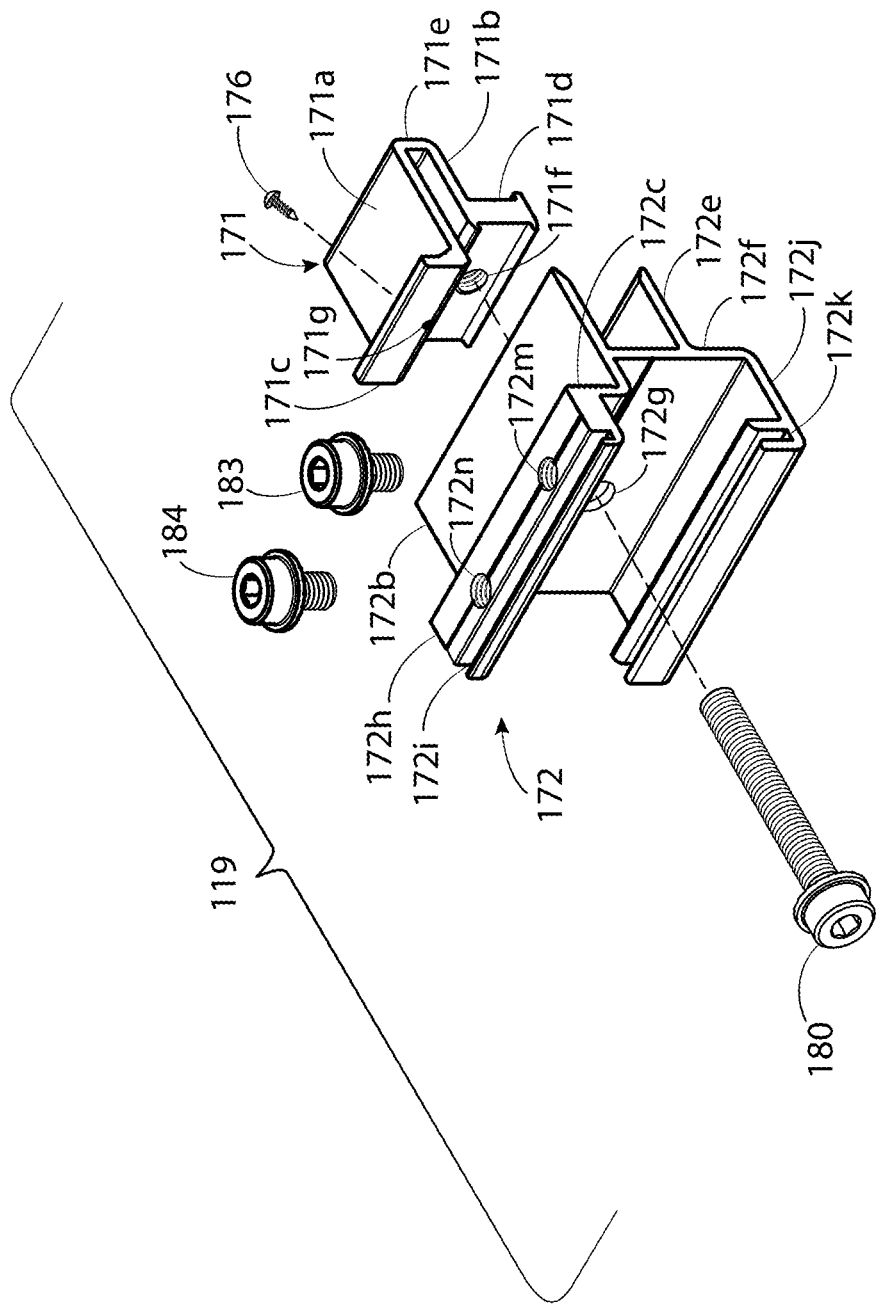
FIGS. 68, 69, and 70 illustrate in exploded isometric view, isometric view, and side view, respectively, of a solar panel skirt splice clamp assembly.
Figure 69:
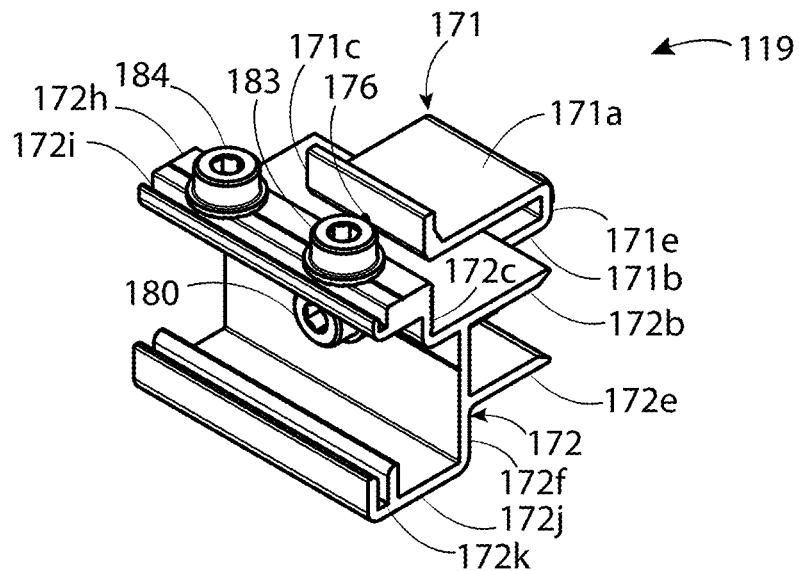
Figure 70:
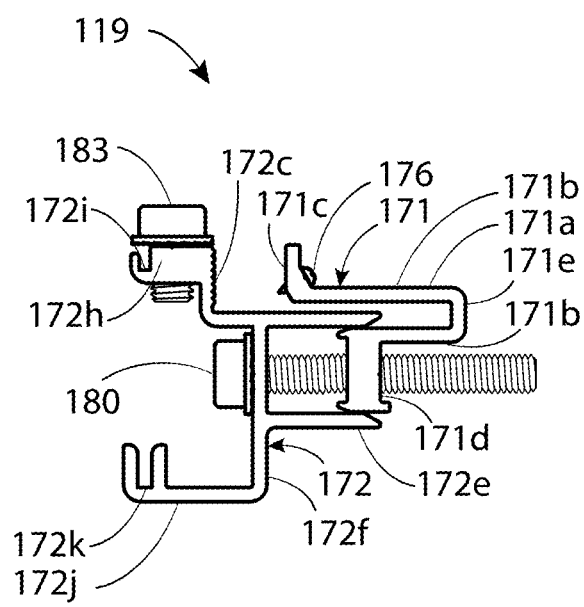

Referring to FIGS. 68-70, the skirt splice bracket 172 includes an upper arm 172h that extends away from the panel stop 172c in the opposite direction as clamp jaw platform 172e, and ending in an upper slot 172i. A lower arm 172j extends away from the pedestal 172f in the same direction as the upper arm 172h, ending in a lower slot 172k. Referring to FIG. 68, threaded fasteners 183, 184 threadedly engage threaded apertures 172m, 172n, respectively. Threaded fasteners 183, 184 are also illustrated in FIG. 69. Threaded fastener 183 is illustrated in FIG. 70.

Figure 71:
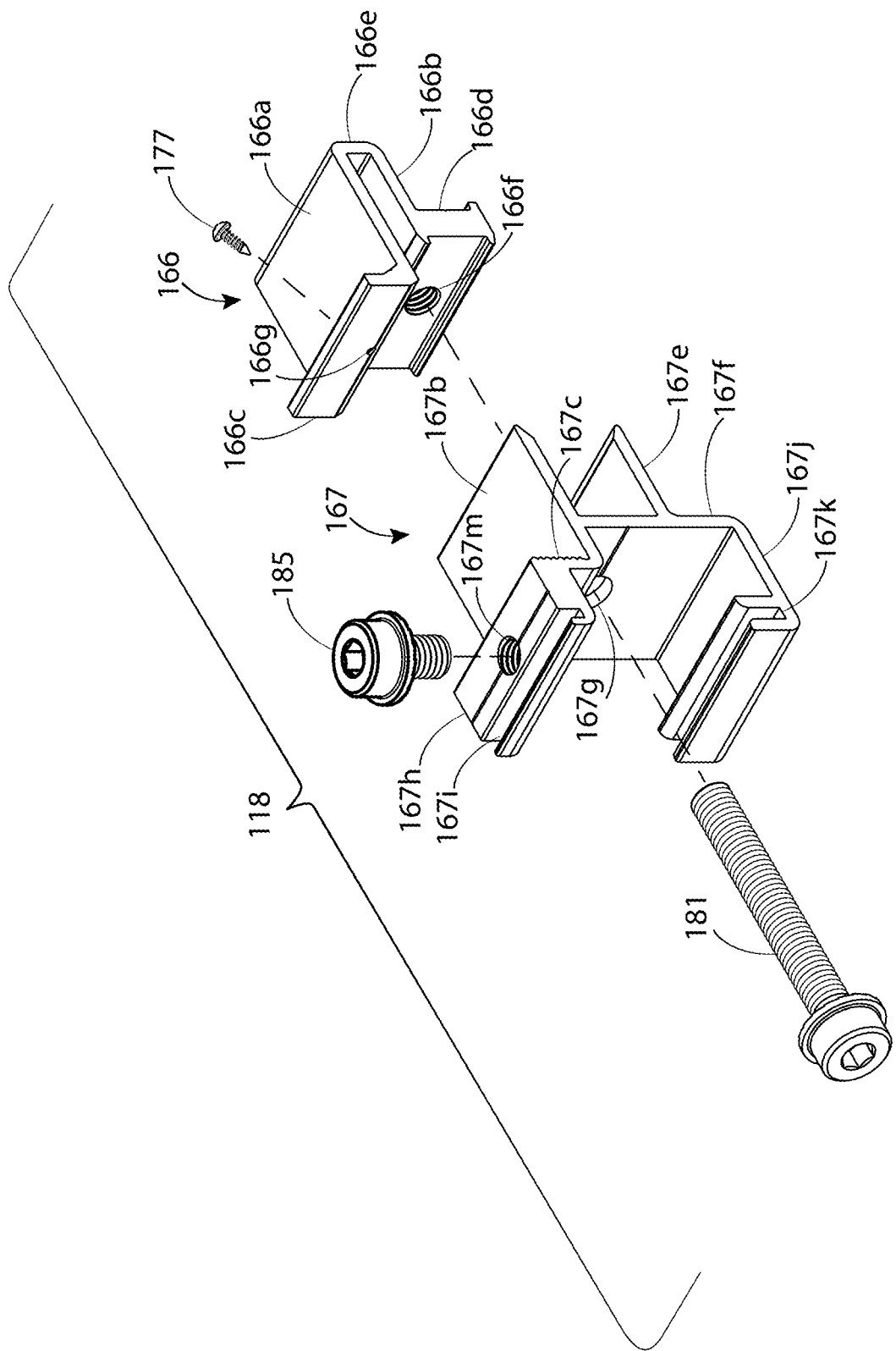
FIGS. 71, 72, and 73 illustrate in exploded isometric view, isometric view, and side view, respectively, of a solar panel splice clamp assembly.
Figure 72:
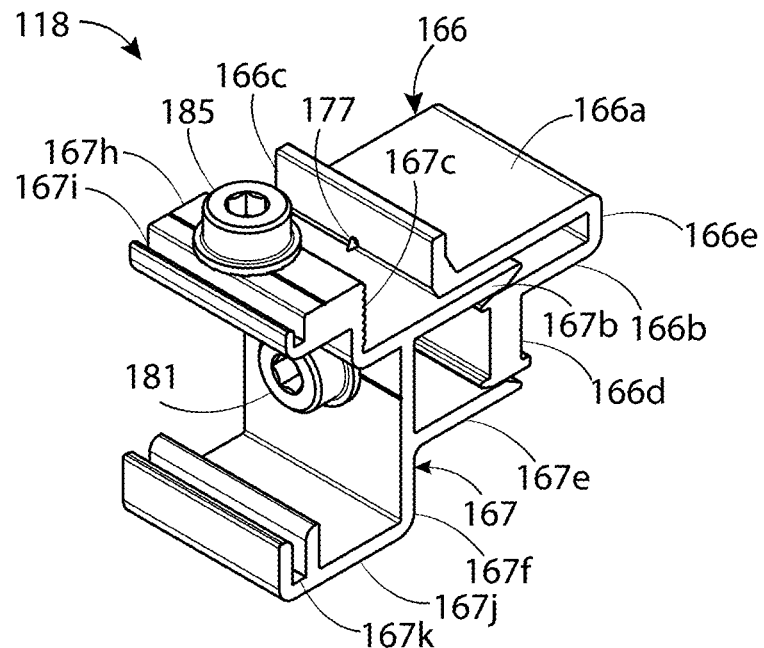
Figure 73:
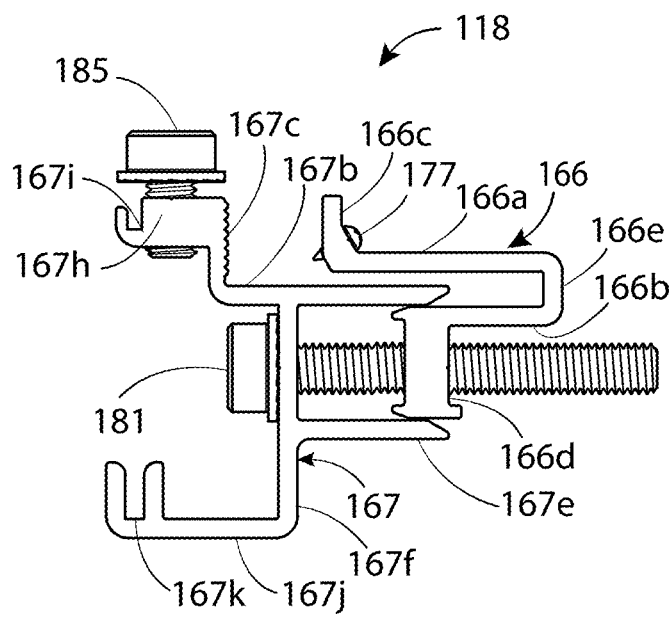

Referring to FIGS. 71-73, the skirt bracket 167 includes an upper arm 167h that extends away from the panel stop 167c in the opposite direction as the clamp jaw platform 167e, ending in an upper slot 167i. A lower arm 167j extends away from the pedestal 167f in the same direction as the upper arm 167h, ending in a lower slot 167k. Referring to FIG. 71, threaded fastener 185 threadedly engage threaded aperture 167m. Threaded fastener 185 is also illustrated in FIGS. 72 and 73.

Figure 74:
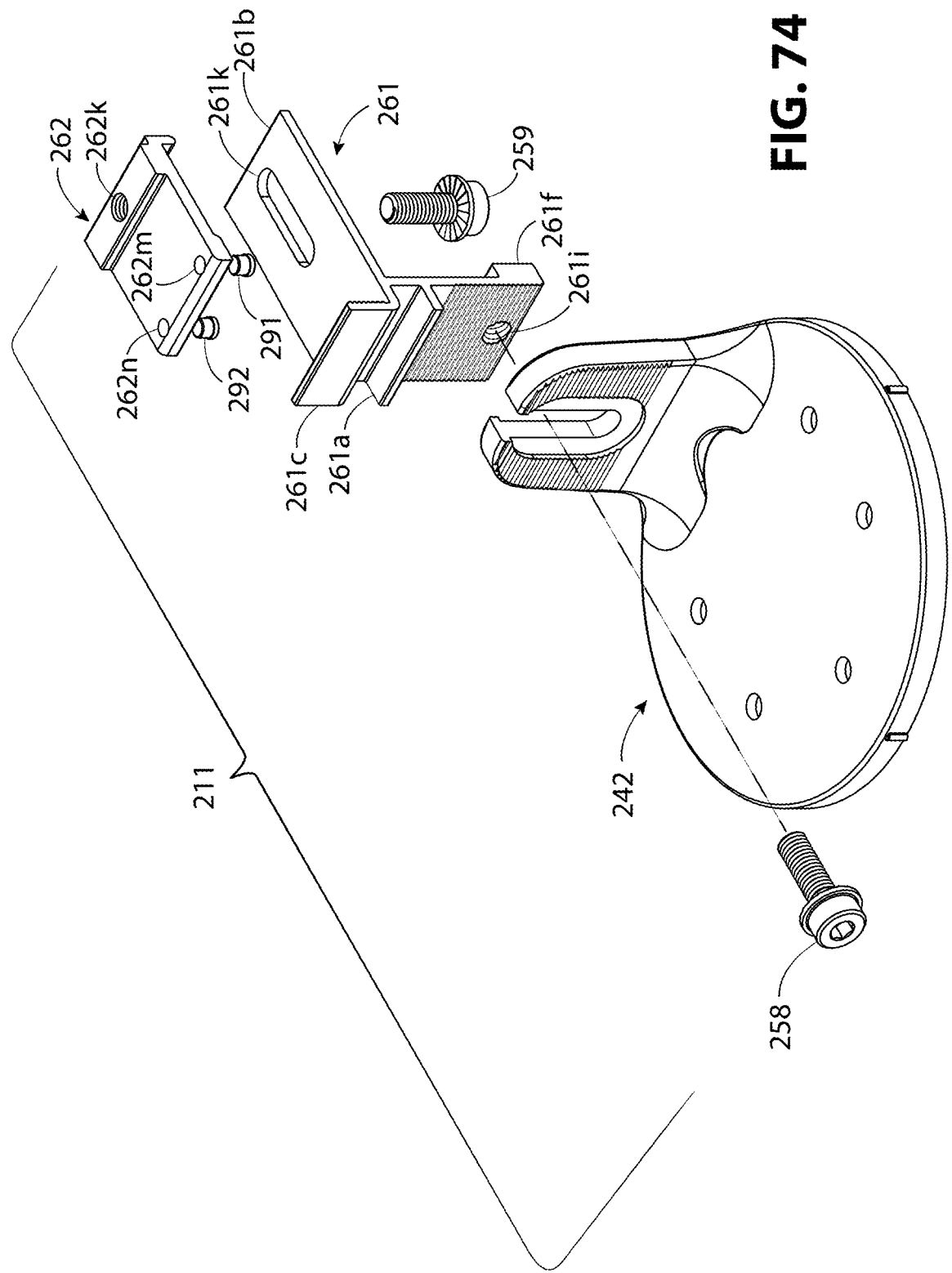
FIGS. 74, 75, and 76 illustrate in exploded isometric view, isometric view, and side view, respectively, of an alternative solar panel end clamp assembly.
Figure 75:
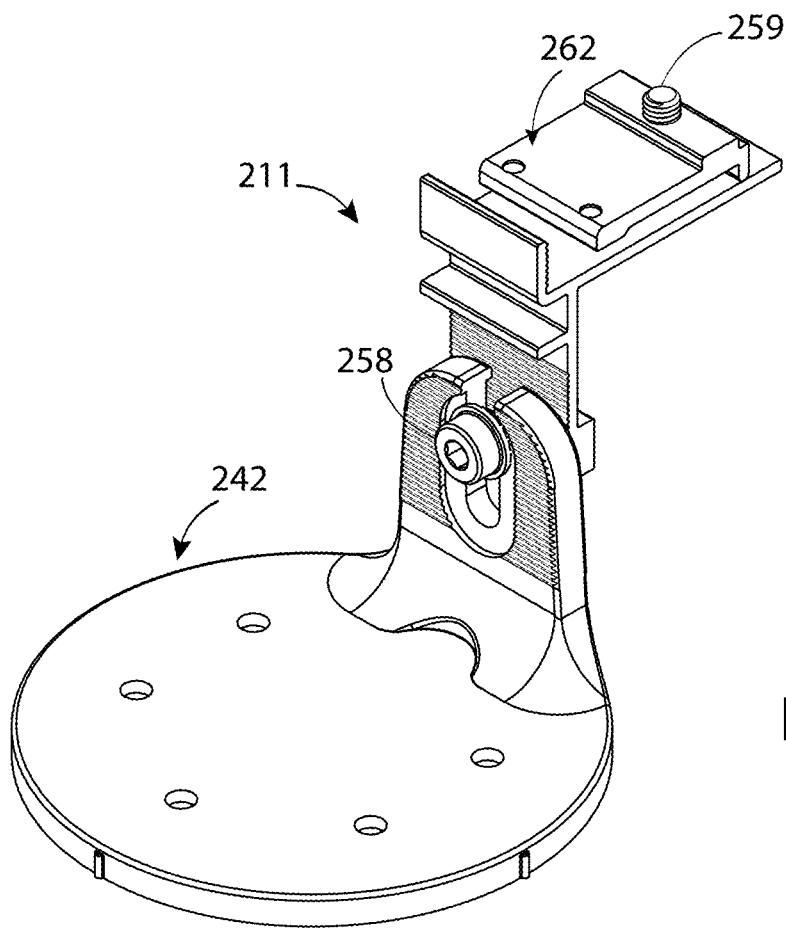
Figure 76:
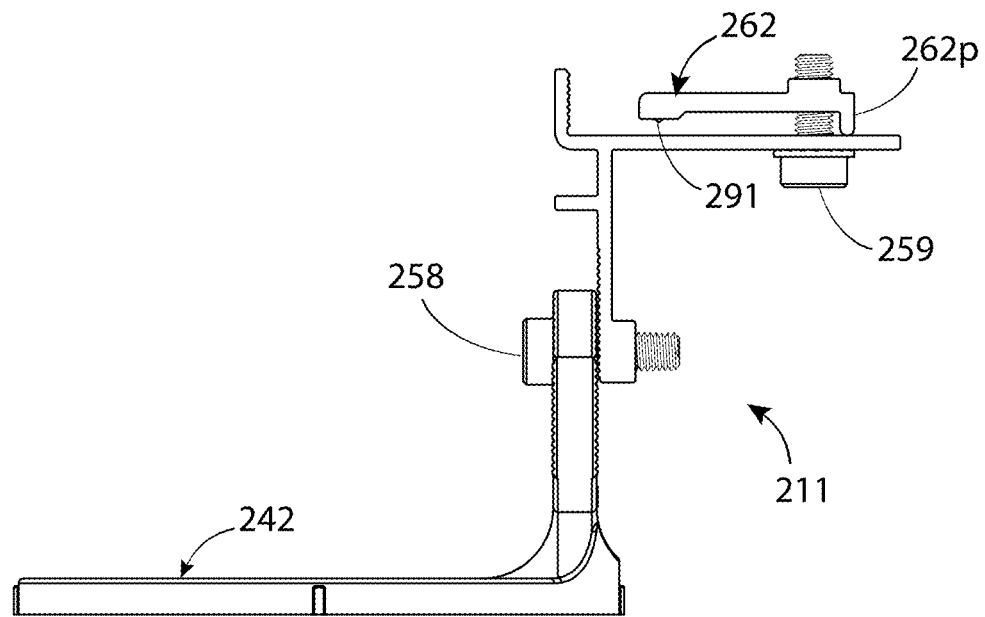
Figure 77:
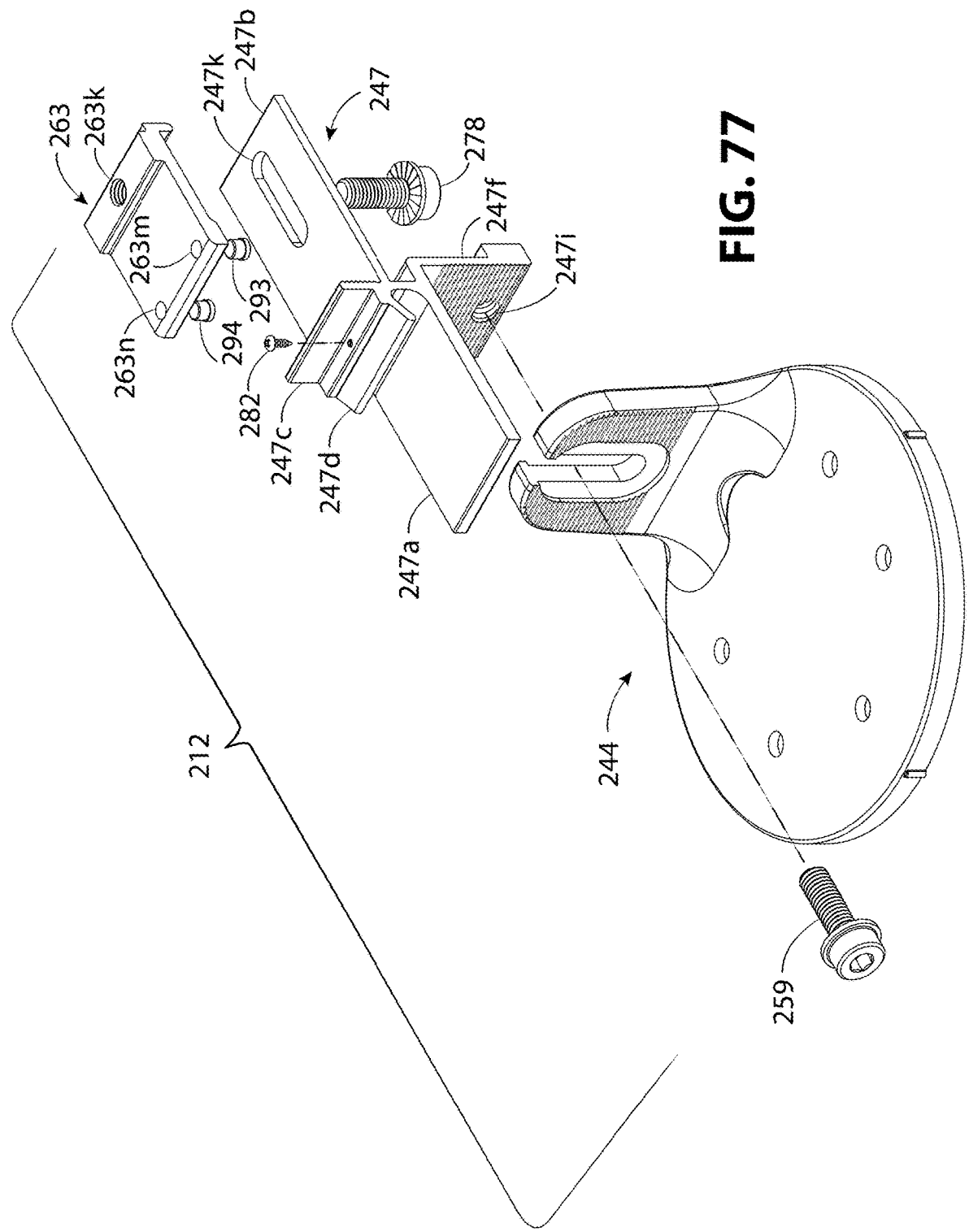
FIGS. 77, 78, and 79 illustrate in exploded isometric view, isometric view, and side view, respectively, of an alternative solar panel mid clamp assembly.
Figure 78:
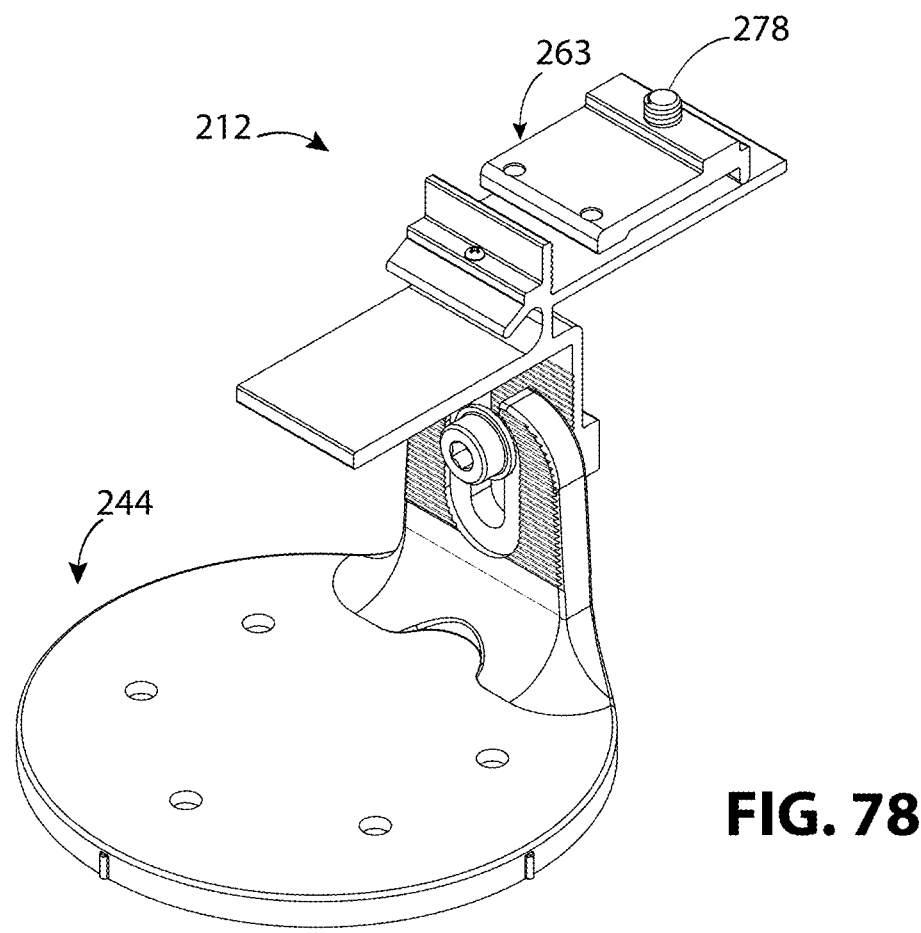
Figure 79:
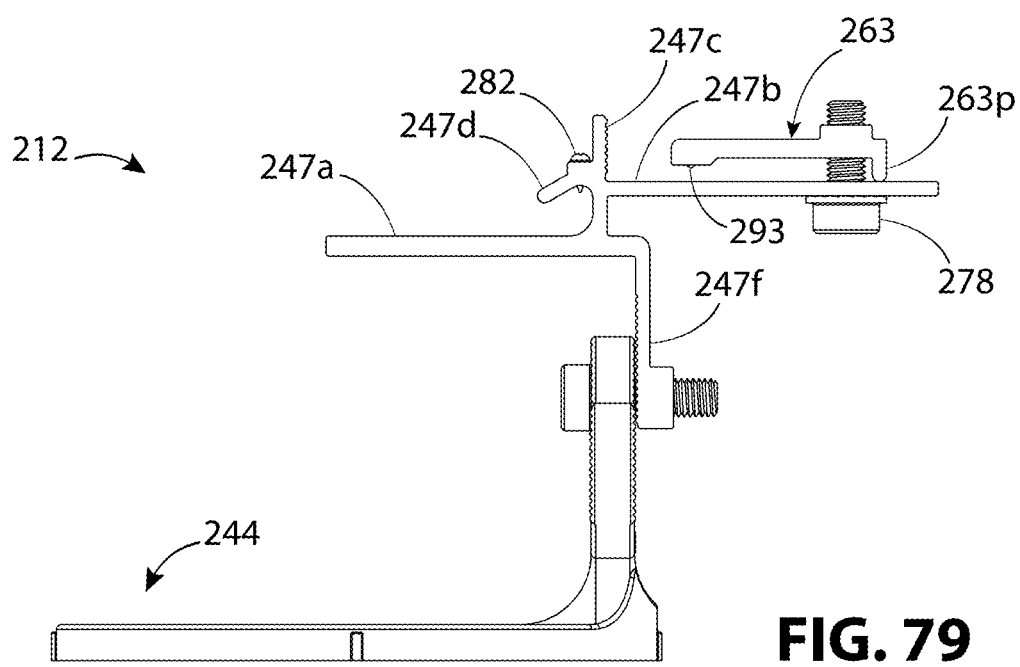
Figure 80:
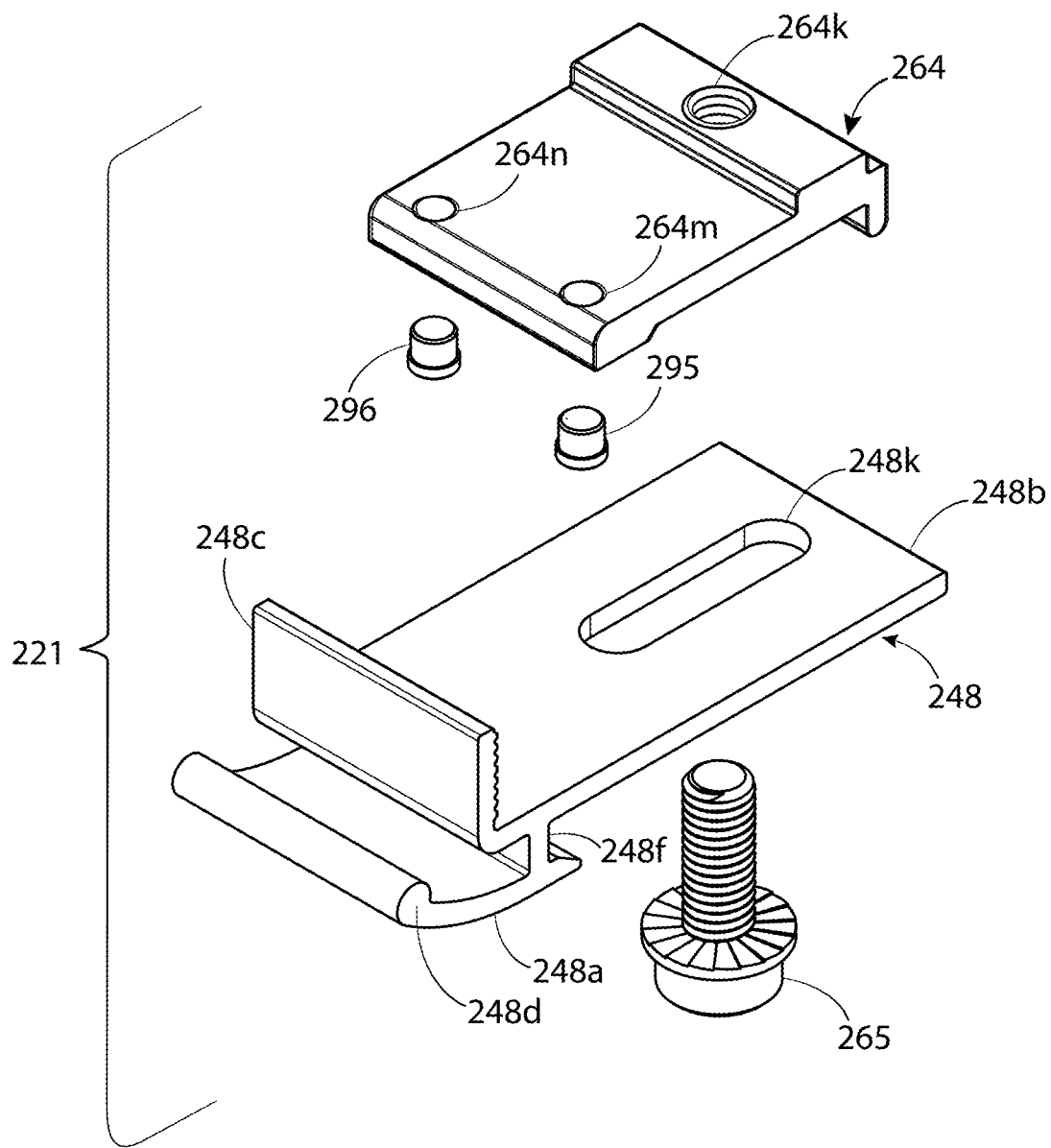
FIGS. 80, 81, and 82 illustrate in exploded isometric view, isometric view, and side view, respectively, of an alternative catch clamp assembly.
Figure 81:
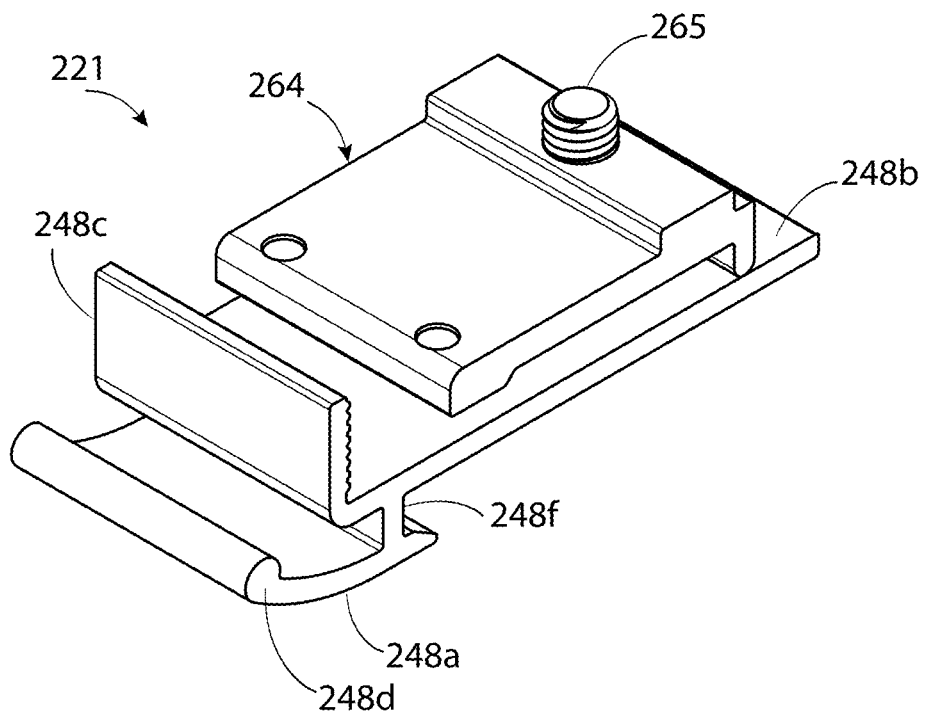
Figure 82:
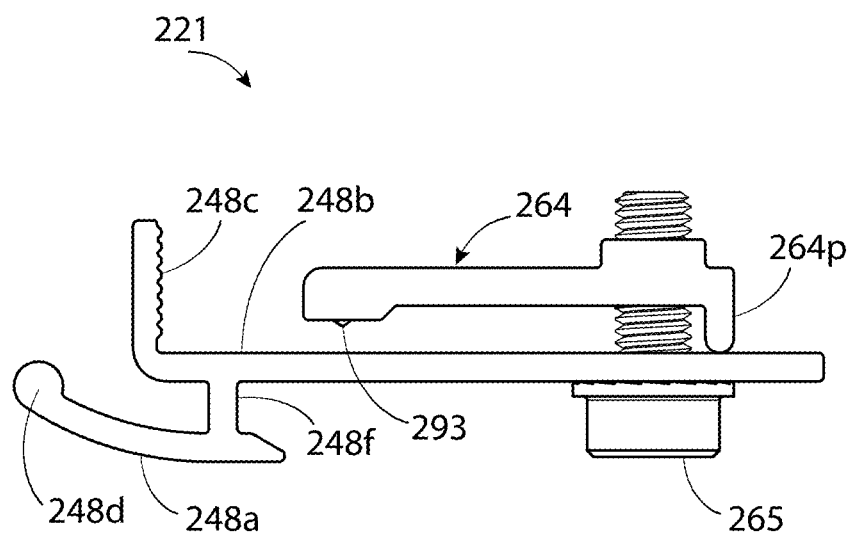

FIGS. 74-76, FIGS. 77-79, and FIGS. 80-82 illustrate examples of alternative versions of the end clamp assembly 211, mid clamp assembly 212, and catch clamp assembly 221, respectively. While similar to end clamp assembly 111, mid clamp assembly 112, and catch clamp assembly 121, of FIGS. 65, 62, and 59, respectively, these assemblies use a different clamping mechanism. Referring to FIGS. 74-76, FIGS. 77-79, and FIGS. 80-82, these assemblies use swivel jaw bodies 262, 263, 264, respectively, in place of the clamp jaws 164, 163, 162 of FIGS. 59, 62, and 65, respectively. Referring to FIG. 74, threaded fastener 259 threadedly engages threaded aperture 262k through slot-shaped aperture 261k in the panel platform 261b of the end clamp bracket 261. Bonding pins 291, 292, seat in apertures 262m, 262n, respectively. The bonding pins are typically press fit and can be formed from spring steel or other electrically-conductive material with sharp or sharpened ends. FIGS. 75 and 76 show threaded fastener 259 engaging swivel jaw body 262. FIG. 76 shows the sharpened end of bonding pin 291 and a pivot 262p extending downward from the main body of the swivel jaw body 262. Referring to FIG. 77, the relationship between the threaded fastener 278, threaded aperture 263k, slot-shaped aperture 247k, the panel platform 247b, mid clamp bracket 247, bonding pin 293, bonding pin 294, aperture 263m, and aperture 263n is as described above in FIG. 74 for similarly-named parts. Threaded fastener 278 is also in FIGS. 78 and 79. FIG. 79 shows the sharpened end of bonding pin 293 and a pivot 263p extending downward from the main body of the swivel jaw body 263. Referring to FIG. 80, the relationship between the threaded fastener 265, threaded aperture 264k, slot-shaped aperture 248k, the panel platform 248b, catch clamp bracket 248, bonding pin 295, bonding pin 296, aperture 264m, and aperture 264n is as described above in FIG. 74 for similarly-named parts. Threaded fastener 265 is also in FIGS. 81 and 82. FIG. 82 shows the sharpened end of bonding pin 293 and a pivot 264p extending downward from the main body of the swivel jaw body 264.

The end clamp assembly 211 of FIGS. 74-76, and the mid clamp assembly 212 of FIGS. 77-79 include the L-foot 242 and the L-foot 244, respectively. The L-foot 242 and the L-foot 244 are as previously described. In FIG. 74, the threaded fastener 258 threadedly engages a threaded aperture 261i in the pedestal 261f of the end clamp bracket 261. The panel stop 261c, and height-adjustment stop 261a are as previously described. In FIG. 77, the threaded fastener 259 threadedly engages a threaded aperture 247i in the pedestal 247f of the mid clamp bracket 247. In FIGS. 77 and 79, the panel stop 247c extends upward from the panel platform 247b and the panel hook platform 247a extends away from the panel stop 247c and pedestal 247f as described. The hook receiver 247d extends from the pedestal 247f and the panel hook platform 247a. Threaded fastener 282, with a sharpened end, engages the hook receiver 247d with a portion of the threaded fastener 282 passing through the hook receiver 247d.

Referring to FIGS. 80-82, the hook arm 248a extends from the pedestal 248f and the panel platform 248b and terminates in an open end 248d. The open end 248d is shown as a ball hook catch, but could be a hook and slot, tab and slot, tongue and groove or other combination with a similar function. The panel stop 248c extends upward from the panel platform 248b.

FIGS. 83-87 show an example of an assembly sequence for the alternative version of the end clamp assembly. In this example, we depict attaching the end clamp assembly 211 to the first solar panel 101. A part of the first solar panel 101, which is shown resting face down on a work surface 157 is illustrated in FIGS. 85-87. In FIG. 83, the L-foot 242 is slid over the threaded fastener 258. The threaded fastener 258 is threadedly secured to the end clamp bracket 261. Referring to FIG. 84, to assure consistent height between end clamp and mid clamp assemblies, the top of the L-foot 242 can optionally rest against the height-adjustment stop 261a before securing the L-foot 242 to the end clamp bracket 261 using threaded fastener 258. In the example, the installer opted not to do that. In FIG. 85 the swivel jaw body 262 is rotated to clear the return flange 101b. In FIG. 86, the installer positions the panel stop 261c against the outside face of the solar panel frame 101c and the panel platform 261b against the return flange 101b. With the panel stop 261c and the panel platform 261b in position, the installer rotates the swivel jaw body 262 so it faces the solar panel frame 101c. In FIG. 87, the installer pushes the swivel jaw body 262 against the inside face of the solar panel frame 101c and then tightens the threaded fastener 259.

Figure 90:
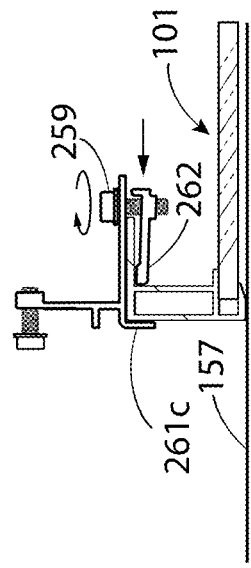
FIGS. 88-92 illustrate an alternative sequence of attaching a solar panel end clamp assembly of FIGS. 74-76 to a solar panel resting face down on a work surface.
Figure 89:
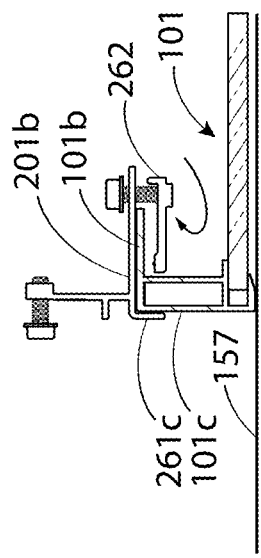
Figure 88:
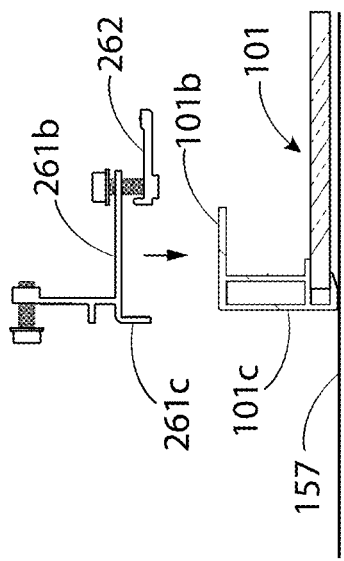
Figure 92:
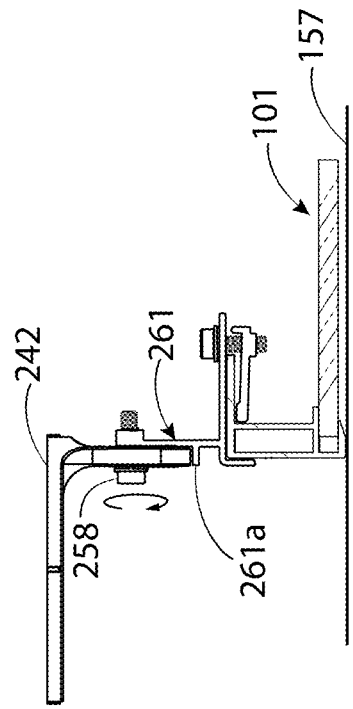
Figure 91:
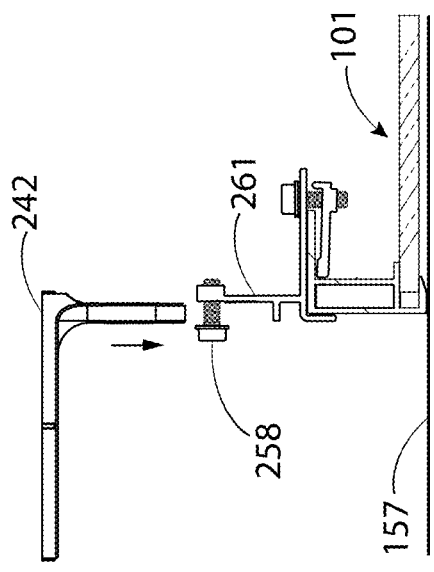

FIGS. 88-92 illustrate an alternative example of an assembly sequence for the end clamp assembly where the installer opts to secure end clamp bracket assemblies to a solar panel before securing the L-feet. The first solar panel 101 is resting face down on a work surface 157. FIGS. 88-92 illustrate an example of this sequence. In FIG. 88, with the swivel jaw body 262 rotated to clear the return flange 101b, the installer positions the panel stop 261c against the outside face of the solar panel frame 101c and the panel platform 261b against the return flange 101b. In FIG. 89, with the panel stop 261c and the panel platform 261b in position, the installer rotates the swivel jaw body 262 so it faces the solar panel frame 101c. In FIG. 90, the installer pushes the swivel jaw body 262 against the inside face of the solar panel frame 101c and then tightens the threaded fastener 259. In FIG. 91, with the end clamp bracket 261 secured to the first solar panel 101, the installer slides the L-foot 242 over the threaded fastener 258. In FIG. 92, the installer optionally slides the top of the L-foot 242 against the height-adjustment stop 261a of the end clamp bracket 261 and tightens the threaded fastener 258.

The installer can repeat the procedure in FIGS. 83-87 or FIGS. 88-92 for the mid clamp assembly 212, except using the panel hook platform 247a as a stop for the L-foot. The installer can repeat the procedure in FIGS. 88-90 for the catch clamp assembly 221.

Conclusion

Described are solar panel systems, devices, and methods for mounting the solar panel system to roofs and similar surfaces. Examples of devices, components, and configurations are provided to help the reader in understanding the described general principles. The following are examples of how different components, structures, and features can be varied while still adhering to the general principles.

In the discussion for FIG. 27, the hook arm 148a, the open end 148d, and the hook receiver 147d could, as an alternative, be structured as tongue and groove, a hook and slot, or a tab and slot. As an example, the open end 148d of FIG. 27 could be structured like the lower tab 169k of FIG. 57. The hook receiver 147d of FIG. 27 could be structured like the lower slot 167k of FIG. 57. As an alternative, instead of structuring the hook receiver 147d of FIG. 27 like the lower slot 167k of FIG. 57, in FIG. 27, the hook receiver 147d could be a slot-shaped aperture in the pedestal 147f. As an example of a tongue and groove, a groove could be formed in place of the hook receiver 147d or in the wall of the pedestal 147f. The open end 148d could be shaped like a tongue with a complementary shape to the groove.

The alternative mid clamp and catch clamp interface discussed in the paragraph above for mid clamp assembly 112 and catch clamp assembly 121 in FIG. 27 can also be applied to the mid clamp assembly 212 of FIG. 77 and catch clamp assembly 221 of FIG. 80. These components include features that can be interchanged. Referring to FIG. 80, the open end 248d can be structured like the lower tab 169k of FIG. 57. The hook receiver 247d in FIG. 77 could be like the lower slot 167k of FIG. 57 or as an alternative, like a slot-shaped aperture in pedestal 247f of FIG. 77. As a tongue and groove structure, a groove could be formed in place of the hook receiver 247d or in the wall of the pedestal 247f of FIG. 77. The open end 248d of FIG. 80 could be shaped like a tongue to be captured in the groove.

FIG. 77 illustrates the hook receiver 247d extending from the pedestal 247f. This principle can be applied to the mid clamp assembly 112 of FIGS. 62-64 and elsewhere in this disclosure. For example, referring to FIG. 64, the hook receiver 147d could extend directly from the pedestal 147f with its end extending downward toward the panel hook platform 147a.

One purpose of the pedestal in the catch clamp is to position the height of the solar panel so its top surface is co-planar with the adjacent solar panels. The height of the pedestal of the catch clamp can be such that the top surfaces of the solar panel platform of the catch clamp and the mid clamp of the adjacent solar panel are co-planar. It may be possible to eliminate the pedestal of the catch clamp and still align top surfaces of the solar panels in the same plane by changing the mid clamp assembly. It may also be possible to eliminate the pedestal of the catch clamp if co-planar alignment is unnecessary. Modifying the hook arm could eliminate the pedestal 148f in FIGS. 60-62 and elsewhere, and the pedestal 248f of FIGS. 80-82. As an example, in FIG. 61, the hook arm 148a can extend directly downward from the clamp jaw platform 148e and be sized and shaped to space the seating surface of the hook arm 148a away from the solar panel platform 148b as if the pedestal 148f were there. For example, the hook arm 148a could extend from the clamp jaw platform 148e at nearly a 90-degree angle and gradually flatten out to provide a seating surface.

The threaded fasteners illustrated throughout this disclosure are suggestive of what could be used. For example, the threaded fastener 165 of FIG. 60, threaded fasteners 159, 178 of FIG. 63, threaded fasteners 158, 179 of FIG. 66, threaded fasteners 180, 183, 184 of FIG. 69, threaded fasteners 181, 185 of FIG. 72, threaded fasteners 258, 259 of FIG. 74, and threaded fasteners 259, 278 of FIG. 77 are illustrated as socket head cap screws with hexagonal sockets. This screw head style allows the installer to use a power tool such as an electric drill or impact driver. Other screw head styles could be used. One example includes a hex-head cap screw, also known as a hex-head bolt or hex-head screw. Other examples include pan-head screws, button-head screws, or round head screws. These can include hexagonal sockets, Phillips head sockets, slotted sockets, hi-torque sockets, square sockets, Robertson head sockets, or Torx head sockets. They can also include various custom or off-the-shelf security head screws. Any screw or bolt can be used that can perform the function specified in the specification, provide enough holding strength to perform to the typical environmental conditions expected for a solar panel array installation.

The solar panel system uses bonding devices, such as threaded fasteners with sharpened tips, for electrical continuity; for example, threaded fastener 182 and threaded fastener 174 of FIG. 62 and threaded fastener 173 of FIG. 60. These threaded fasteners are shown as pan-head self-tapping screws with Philips sockets. However, they can be any threaded fastener capable of creating electrical bonding between two electrically-conductive materials. For example, the threaded fasteners can be self-tapping screws, sheet metal screws, or self-drilling screws. Any head style can be used that allows the threaded fastener to tighten sufficiently to create an electrical bond. For example, the threaded fastener can be hex head, socket head, or pan-head. The socket can be Philips, Torx, hexagonal (i.e., Allen head), square, or Robertson.

In step 150 of FIG. 9 and its variations illustrated in FIGS. 10, 11, 22, and 32, the installer can pre-attach the solar panel end clamp assemblies, mid clamp assemblies, and catch clamp assemblies to one solar panel at a time or more than one solar panel before securing the resulting solar panel assemblies to the building surface. For example, referring to FIGS. 12 and 13, the installer can pre-attach the end clamp assemblies 111, 113 and mid clamp assemblies 112, 114 and then install the resulting first solar panel assembly 110 to the building surface before installing catch clamp assemblies 121, 123 and mid clamp assemblies 122, 124 in FIGS. 14 and 15. The installer may instead choose to pre-attach end clamp assemblies 111, 113 and mid clamp assemblies 112, 114 to the first solar panel 101 (FIGS. 12 and 13), and pre-attach the catch clamp assemblies 121, 123 and the mid clamp assemblies 122, 124 to the second solar panel 102 (FIGS. 14 and 15), before attaching the first solar panel assembly 110 to the roof.

The same principle applies to the assembly sequences illustrated in FIGS. 43-46 and the assembly sequences for FIGS. 47-50. The installer can follow the sequence for individual solar panels before securing the resulting solar panel assembly to the building surface. Alternatively, the installer can follow the sequence for more than one panel before securing any of the solar panel assemblies to the building surface. In addition, the installer may find it more efficient to follow the first two steps of the sequence and install the L-feet together, either per solar panel, or for more than one solar panel.

FIGS. 23-29 illustrate a method of assembling and securing solar panel assemblies within a column of a solar panel array. Here, it was for solar panel array 100 of FIG. 1 and for column 107 of FIG. 3. As discussed, this could also apply to portrait oriented solar panel arrays, such as the solar panel array 200 of FIG. 7. An installer could use the assembly method to assemble a solar panel array in rows, rather than columns in either portrait or landscape orientation. In this scenario, the end clamp, mid clamp, and catch clamp assemblies would be secured to the left and right sides of the solar panels rather than the top and bottom of the solar panel. The solar panel assemblies would be put together across the roof rather than up or down along the roof.

The assembly method shown started with end clamp assemblies on the leading edge of the first solar panel assembly in a column and ended with end clamp assemblies on the trailing edge of the last solar panel assembly in that column. To simplify installation logistics, it is within the scope of the assembly methods illustrated to substitute mid clamp assemblies wherever end clamp assemblies are used. In one scenario, end clamp assemblies could be used on the leading edge of the first solar panel assembly in a column but not the trailing edge of the last solar panel assembly in the column. In another scenario, the end clamp assemblies could be eliminated completely and mid clamp assemblies used in their place.

The catch clamp assemblies illustrated throughout this disclosure include a seating platform with a generally curve-shaped seating surface. This generally curve-shaped seating surface in FIG. 27, for example, is the hook arm 148a which is a generally convex-shaped seating surface with respect to the panel hook platform 147a. This allows the second solar panel assembly 120 to pivot about the hook arm 148a as the open end 148d engages the hook receiver 147d. The generally curve-shaped seating surface can be a continuous smooth curve, formed from piece-wise linear segments, formed from piece-wise curved segments, or formed from piece-wise curved segments and piece-wise linear segments. As an example, the hook arm 148a could form a generally curve-shaped seating surface that has a downward-facing generally convex shape where a portion of the seating surface is flat. This portion of the seating platform can be positioned to help resist movement once the open end 148d is engaged with the hook receiver 147d.

The mid clamp and end clamp assemblies throughout this disclosure are directly securable to building structures. FIGS. 4-6, 12-17, 23-30, 33-42, 45, 46, 49, 50, 62-67, 74-79, 83-87, 91, and 92 illustrate examples of L-feet for this purpose. The mid clamp assemblies and end clamp assemblies can use other building attachment brackets or roof attachment brackets in place of the illustrated L-feet. For example, the roof attachment bracket can be another style of L-foot. For example, the L-foot could include a slot-shaped aperture as opposed to a slot-shaped opening. The L-foot could have a rectangular base or a rectangular riser. The building attachment bracket could be a T-foot, a pedestal, a pedestal with a flange portion for attaching threaded fasteners to the building surface, and a slotted pedestal to allow for height adjustment. In place of a slot-shaped opening for height adjustment, the L-foot could include a serrated groove. The mid clamp or end clamp bracket could include a serrated tongue received by the serrated groove in the L-foot. Other equivalent structures could be substituted as long as they are capable of being secured to the roof or building structure with sufficient holding force to withstand normal environmental conditions for solar panel arrays, and are capable of being used in accordance with at least some variation of the disclosed assembly methods.

The variations described, the general principles taught, and undescribed variations, devices, and systems that encompass the general principles described in this disclosure, are within the scope of the claims.

The invention claimed is:
1. A system for securing solar panels to a building structure, comprising:

a first solar panel, the first solar panel includes a first solar panel frame, the first solar panel frame surrounds the first solar panel;

a second solar panel, the second solar panel includes a second solar panel frame, the second solar panel frame surrounds the second solar panel;

a catch clamp that includes a first solar panel bottom clamp and includes a first clamp jaw and a hook arm, the first clamp jaw removably clamps the catch clamp directly to a leading edge of the second solar panel frame, the hook arm includes a downward-facing generally convex shape with an open end that extends upward beyond the leading edge of the second solar panel frame toward a trailing edge of the first solar panel frame;

a solar panel clamp assembly that includes a second solar panel bottom clamp and is removably clamped directly to the trailing edge of the first solar panel frame, the solar panel clamp assembly includes a panel hook platform and a hook receiver positioned above the panel hook platform with an end portion extending downward toward the panel hook platform; and the panel hook platform and the hook receiver are arranged and the hook receiver is so shaped, that the hook arm is pivotable against the panel hook platform as the open end of the hook arm engages the hook receiver and pivotally secures the second solar panel to the first solar panel.

2. The system of claim 1, wherein:
the hook receiver includes a generally concave-shaped interior.

3. The system of claim 1, wherein:
the solar panel clamp assembly includes a first solar panel platform;
the catch clamp includes a second solar panel platform positioned above the hook arm; and
the first solar panel platform and the panel hook platform are spaced apart so that with the hook arm resting against the panel hook platform and engaged with the hook receiver, top surfaces of the first solar panel platform and the second solar panel platform are co-planar.

4. The system of claim 1, wherein:
the hook receiver and the open end are so shaped that the hook receiver creates a rotational stop for the open end.

5. The system of claim 1, wherein:
a ball hook catch extending from the open end, and the hook receiver is sized and shaped to receive the ball hook catch.

6. The system of claim 5, wherein:
the hook receiver and the ball hook catch are so shaped that the hook receiver creates a rotational stop for the ball hook catch.

\* \* \* \* \*